US007903887B2

(12) United States Patent
Sasaki et al.

(10) Patent No.: US 7,903,887 B2
(45) Date of Patent: Mar. 8, 2011

(54) IMAGE PROCESSING CIRCUIT AND LIQUID CRYSTAL DISPLAY APPARATUS

(75) Inventors: Hisashi Sasaki, Kawasaki (JP);
Hironori Minamizaki, Kawasaki (JP);
Haruhiko Okumura, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 889 days.

(21) Appl. No.: 11/749,827

(22) Filed: May 17, 2007

(65) Prior Publication Data

US 2007/0269118 A1 Nov. 22, 2007

(30) Foreign Application Priority Data

May 18, 2006 (JP) ................................. 2006-139309

(51) Int. Cl.
*G06K 9/36* (2006.01)
(52) U.S. Cl. ......... 382/232; 382/162; 382/166; 382/167; 348/453; 348/222.1
(58) Field of Classification Search .................. 382/162, 382/164, 165, 166, 167, 274, 232; 345/589, 345/597, 602, 604; 348/453, 222.1, 223.1, 348/224.1, 527, 292, 416.1
See application file for complete search history.

(56) References Cited

U.S. PATENT DOCUMENTS

| 5,524,067 | A | | 6/1996 | Miyake et al. | |
|---|---|---|---|---|---|
| 5,585,944 | A | * | 12/1996 | Rodriguez | 358/500 |
| 5,801,841 | A | | 9/1998 | Suzuki | |
| 5,930,394 | A | * | 7/1999 | Kondo et al. | 382/232 |
| 6,343,157 | B1 | | 1/2002 | Yada | |
| 7,536,054 | B2 | * | 5/2009 | Banno et al. | 382/232 |
| 7,751,633 | B1 | * | 7/2010 | Mukherjee | 382/239 |
| 2005/0018916 | A1 | * | 1/2005 | Kondo | 382/238 |

FOREIGN PATENT DOCUMENTS

| JP | 05-110869 | 4/1993 |
|---|---|---|
| JP | 09-098294 | 4/1997 |
| JP | 2006-094225 | 4/2006 |

OTHER PUBLICATIONS

Alsaka et al, Three Level Block Truncation Coding, IEEE Proceedings, 1990 Southeastcon, pp. 421.

(Continued)

*Primary Examiner* — Samir A. Ahmed
*Assistant Examiner* — Ali Bayat
(74) *Attorney, Agent, or Firm* — Turocy & Watson, LLP

(57) ABSTRACT

An image processing circuit has a color information converter configured to convert image data including a plurality of color information into luminance data and color difference data, an activity detector whether amount of activity predetermined according to differences between the luminance data in a plurality of pixels in each of pixel blocks and differences between the color difference data in the plurality of pixels exceeds a predetermined first threshold value for each pixel block including a plurality of pixels adjacent to each other, and a encoding unit configured to perform a first encoding process by generating m (m is an integer of three or larger) representative values corresponding to the luminance data and the color difference data in the plurality of pixels in the pixel block that the activity detector determines to exceed the first threshold value, and perform a second encoding process by generating n (n is an integer of two or more and the integer larger than m) representative values corresponding to the luminance data and the color difference data in the plurality of pixels in the pixel block that the activity detector determines not to exceed the first threshold value, to generate encoded data.

20 Claims, 51 Drawing Sheets

OTHER PUBLICATIONS

Efrati et al, Classified Block Truncation Coding-Vector quantization: An Edge Sensitive Image Compression Algorithm, Signal Processing Image Communication 3, Elsevier Science Publishers, 1991, pp. 275-283.

Mor et al, A Fast Nearly Optimum Equi-Spaced 3-Level Block Truncation Coding Algorithm, Signal Processing Image Communication 6, Elsevier Science, 1994, pp. 397-404.

Japanese Office Action for Japanese Patent Application No. 2006-139309 mailed on Dec. 17, 2010.

* cited by examiner

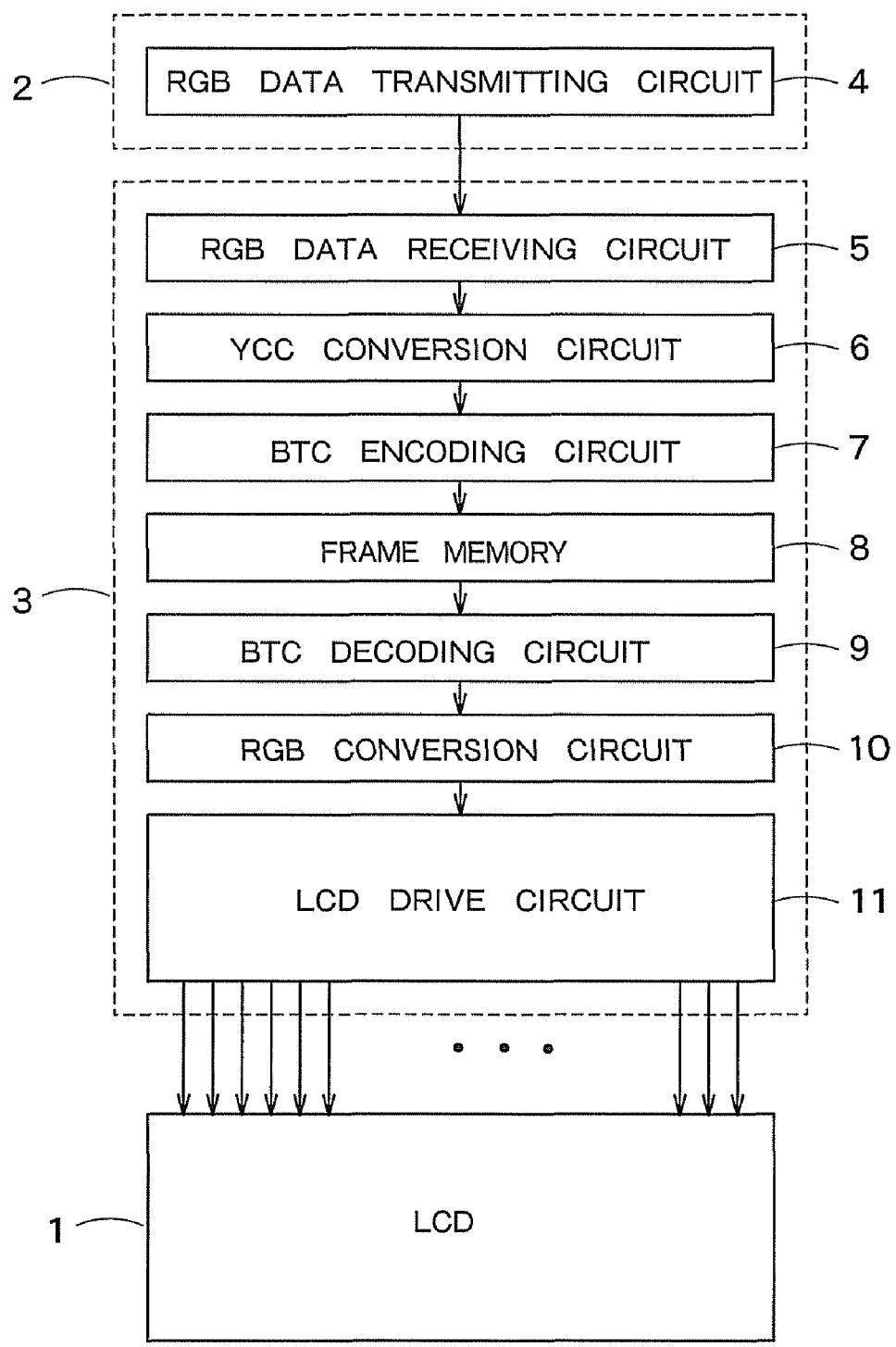
F I G. 1

| 01100011 | 10010011 | 111001100110000 |
|----------|----------|-----------------|
| DATAa2   | DATAb2   | BITMAPm2        |

| 1 | 1 | 1 | 1 |
|---|---|---|---|
| 0 | 0 | 1 | 1 |
| 0 | 0 | 1 | 1 |
| 0 | 0 | 0 | 0 |

8+8+16=32bit

FIG. 5

| 147 | 147 | 147 | 147 |
|-----|-----|-----|-----|
| 99  | 99  | 147 | 147 |
| 99  | 99  | 147 | 147 |
| 99  | 99  | 99  | 99  |

FIG. 6

| 000000 | 010000 | 111111 |

DATAa3      DATAb3      DATAc3

| 1222012200120001 |

BITMAPm3

FIG. 10

| 00000 | 01000 | 11111 |

DATAa3      DATAb3      DATAc3

| 1201 |

MAPm3

FIG. 11

| 000000 | 010000 | 111111 |   3×6
|--------|--------|--------|
| DATAa3 | DATAb3 | DATAc3 |

| 1222012200120001 |   2×16
|------------------|
| MAPm3 |

| 00000 | 01000 | 11111 |   3×5
|-------|-------|-------|
| DATAa3 | DATAb3 | DATAc3 |

| 1201 |   2×4
|------|
| MAPm3 |

| 00000 | 01000 | 11111 |   3×5
|-------|-------|-------|
| DATAa3 | DATAb3 | DATAc3 |

| 1201 |   2×4
|------|
| MAPm3 |

TOTAL : 96bit

F I G. 12

RGB : 8*3*4×4=384bit
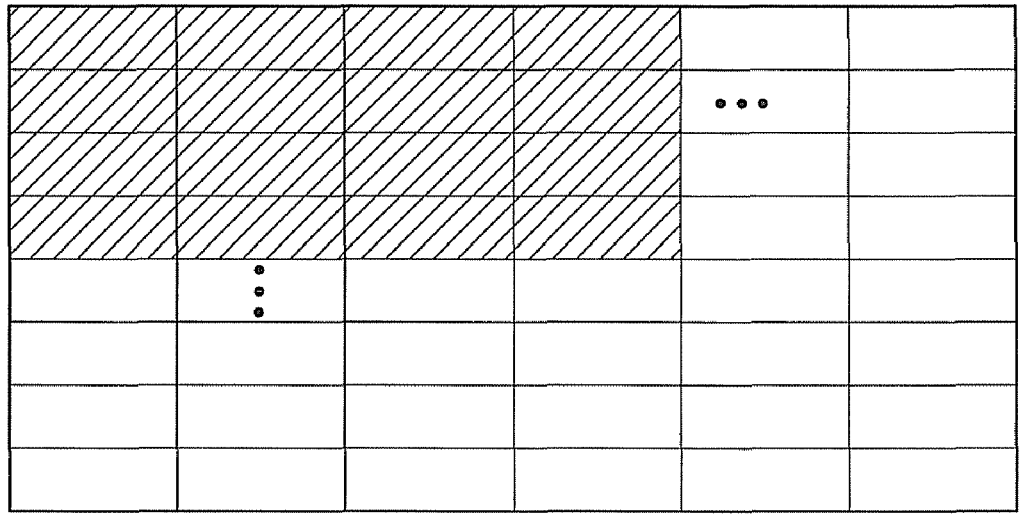
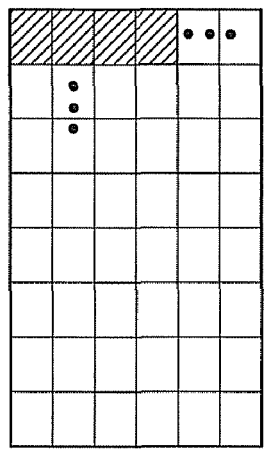 
$$\frac{97}{384} \sim \frac{1}{4}$$
YCC-BTC : 97bit
F I G. 14

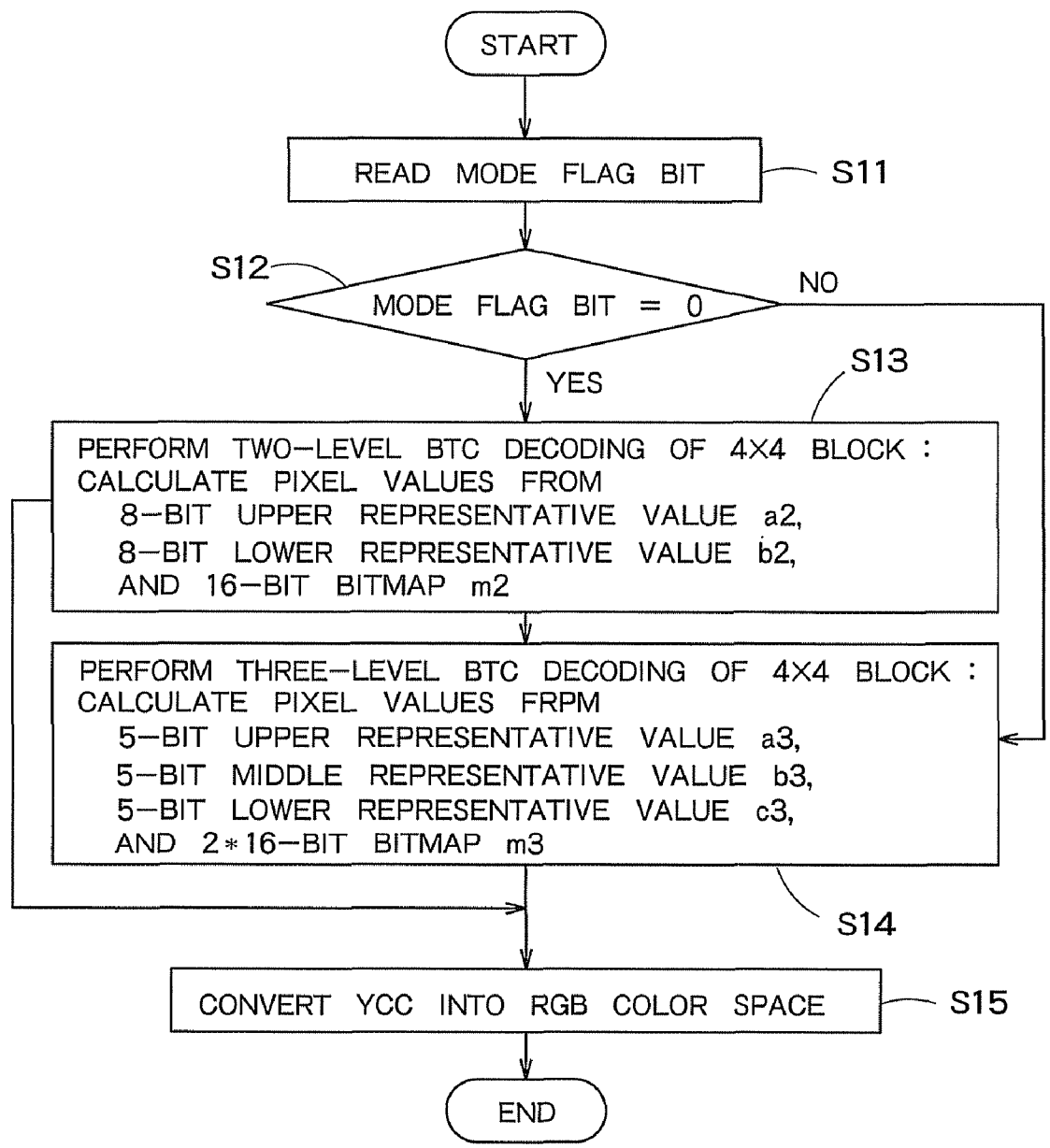
F I G. 15

| 0 | 01100011 | 10010011 | 1111001100110000 |

DATAa2　　　DATAb2　　　MAPm2

| 147 | 147 | 147 | 147 |
|---|---|---|---|
| 99 | 99 | 147 | 147 |
| 99 | 99 | 147 | 147 |
| 99 | 99 | 99 | 99 |

F I G. 16

| 1 | 000000 | 010000 | 111111 |

DATAa3　　　DATAb3　　　DATAc3

| 1222012200120001 |

MAPm3

| 128 | 252 | 252 | 252 |
|---|---|---|---|
| 0 | 128 | 252 | 252 |
| 0 | 0 | 128 | 252 |
| 0 | 0 | 0 | 128 |

F I G. 17

| 00000 | 01000 | 11111 |
DATAa4  DATAb4  DATAc4
| 1201 |
MAPm4
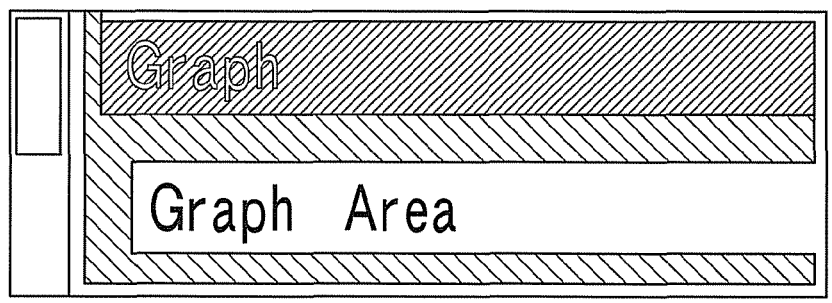
FIG. 18
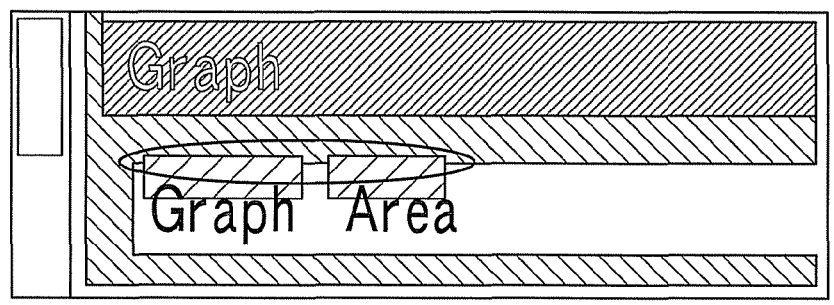
FIG. 19A
FIG. 19B Problem has been solved

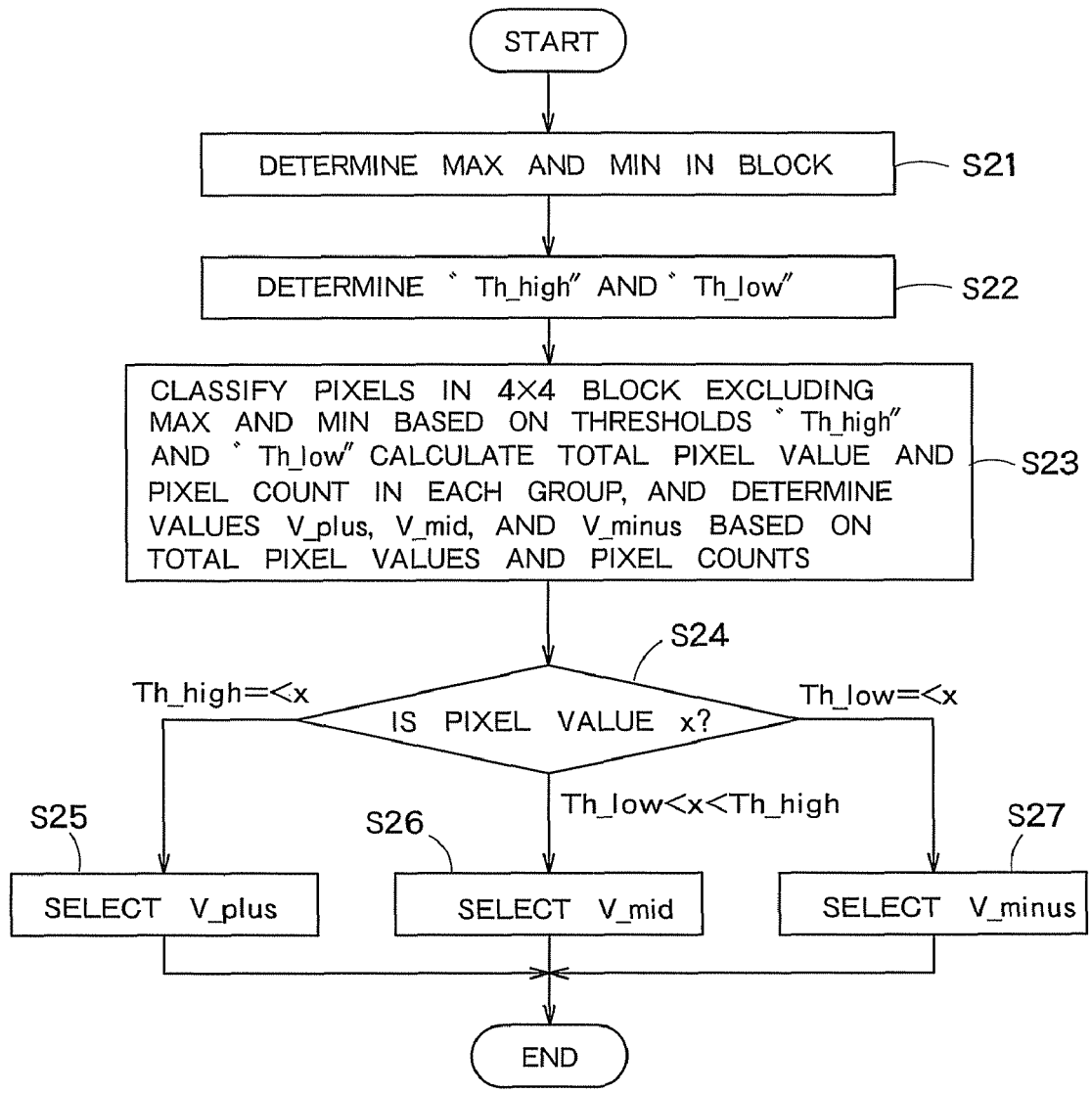
F I G. 22

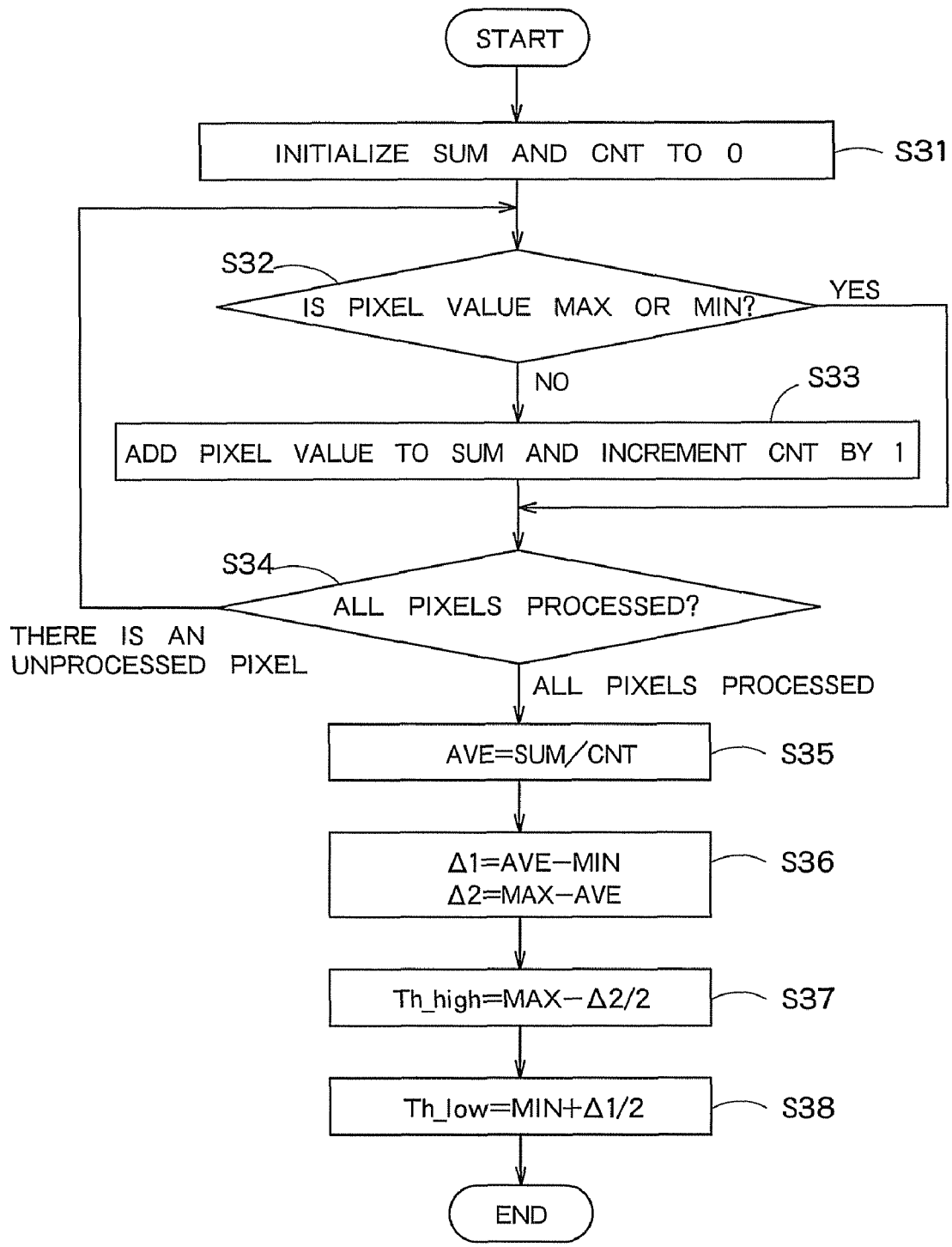
F I G. 23

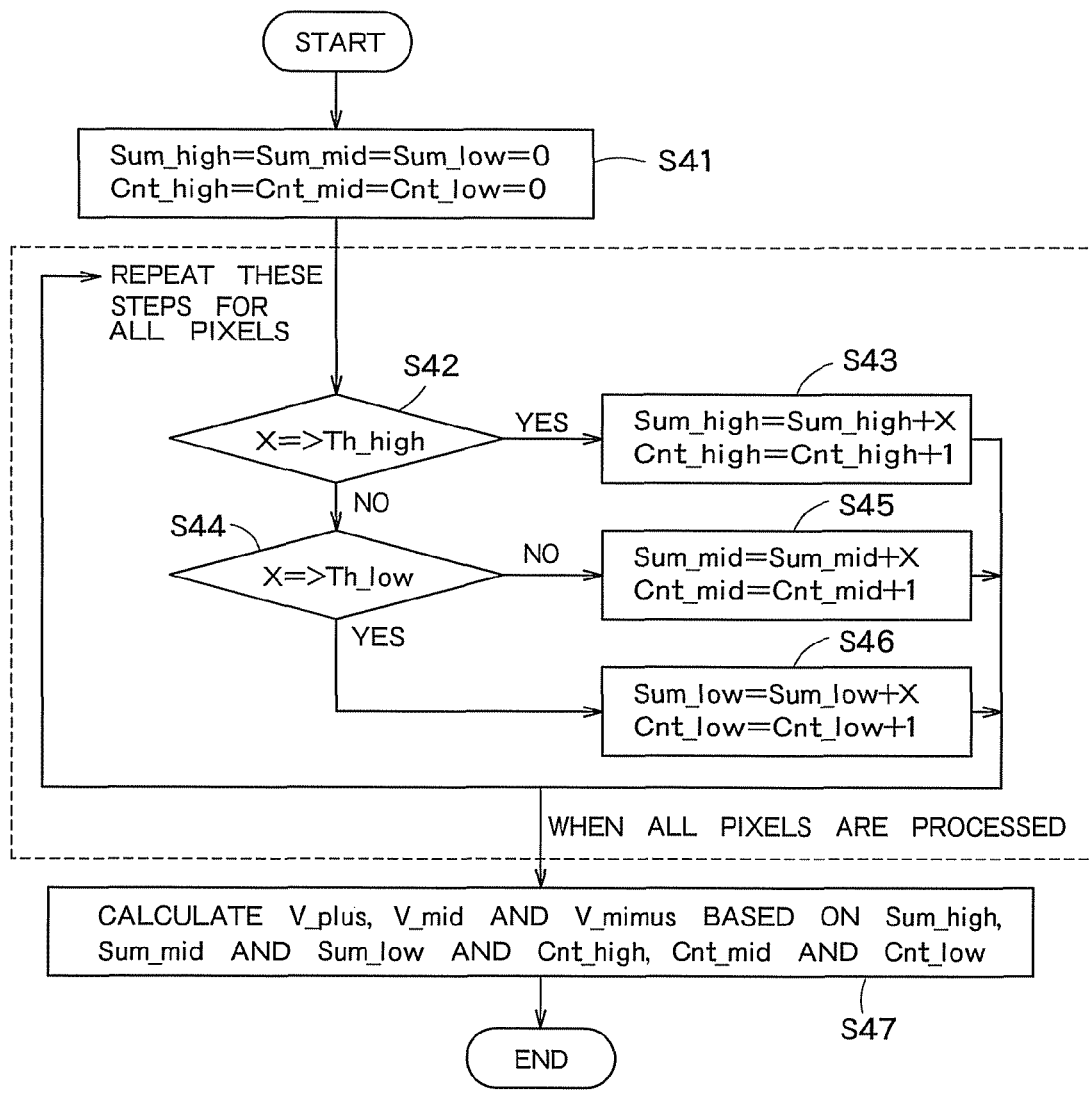
F I G. 24

VALUE OF Cnt_xxx :
0 INDICATES VALUE OF ZERO AND 1 INDICATES NON-ZERO

| Cnt_high | Cnt_mid | Cnt_low | OPERATION (INDEFINITE VALUE IF NOTHING IS SPECIFIED) |
|---|---|---|---|
| 0 | 0 | 0 | NONE |
| 0 | 0 | 1 | V_low=sum_mid/Cnt_mid |
| 0 | 1 | 0 | V_mid=sum_mid/Cnt_mid |
| 0 | 1 | 1 | V_mid=sum_mid/Cnt_mid<br>V_low=sum_mid/Cnt_mid |
| 1 | 0 | 0 | V_high=sum_high/Cnt_high |
| 1 | 0 | 1 | V_high=sum_high/Cnt_high<br>V_low=sum_mid/Cnt_mid |
| 1 | 1 | 0 | V_high=sum_high/Cnt_high<br>V_low=sum_mid/Cnt_mid |
| 1 | 1 | 1 | V_high=sum_high/Cnt_high<br>V_mid=sum_mid/Cnt_mid<br>V_low=sum_mid/Cnt_mid |

NUMBERS OF MOST SIGNIFICANT BITS OF V_high, V_mid AND V_low ARE SPECIFIED AND CONTROLLED

F I G. 25

COMPRESSION RATIOS AND DRIVER CHIP AREAS
(QVGA → VGA)

| MEMORY COMPRESSION CAPACITY | DRIVER 1<br><br>(6BIT QVGA)<br>0.32*4=1.28<br><br><br>0.68+1.28=1.96 | DRIVER 2<br><br>(QVGA RAM FOR THROUGH-MODE 6BIT VGA)<br>0.39*4=1.56<br><br>0.61+1.56=2.17 | DRIVER 3<br><br>(8BIT QVGA)<br>0.48*4=1.92<br><br><br>0.52+1.92=2.44 |
|---|---|---|---|
| 5 | 0.68+1.28/5/0.75=<br>1.02 | 0.61+1.56/5/0.75=<br>1.03 | 0.52+1.92/5=<br>0.92 |
| 4 | 0.68+1.28/4/0.75=<br>1.11 | 0.61+1.56/4/0.75=<br>1.13 | 0.52+1.92/4=<br>1.0 |
| 3 | 0.68+1.28/3/0.75=<br>1.25 | 0.61+1.56/3/0.75=<br>1.30 | 0.52+1.92/3=<br>1.16 |
| 2 | 0.68+1.28/2/0.75=<br>1.53 | 0.61+1.56/2/0.75=<br>1.65 | 0.52+1.92/2=<br>1.48 |

COL1    COL2    COL3    COL4

F I G. 26

COMPRESSION RATIOS AND DRIVER CHIP AREAS
(REDUCTION FOR QVGA)

| MEMORY COMPRESSION CAPACITY | DRIVER 1 (6BIT QVGA) 0.32 | DRIVER 2 (QVGA RAM FOR THROUGH-MODE 6BIT VGA) 0.39 | DRIVER 3 (8BIT QVGA) 0.48 |
|---|---|---|---|
| | 0.68+0.32=1.00 | 0.61+0.39=1.00 | 0.52+0.48=1.00 |
| 5 | 0.68+0.32/5/0.75=<br>0.77 | 0.61+0.39/5/0.75=<br>0.71 | 0.52+0.48/5=<br>0.62 |
| 4 | 0.68+0.32/4/0.75=<br>0.79 | 0.61+0.39/4/0.75=<br>0.74 | 0.52+0.48/4=<br>0.64 |
| 3 | 0.68+0.32/3/0.75=<br>0.82 | 0.61+0.39/3/0.75=<br>0.78 | 0.52+0.48/3=<br>0.68 |
| 2 | 0.68+0.32/2/0.75=<br>0.89 | 0.61+0.39/2/0.75=<br>0.87 | 0.52+0.48/2=<br>0.76 |

F I G. 27

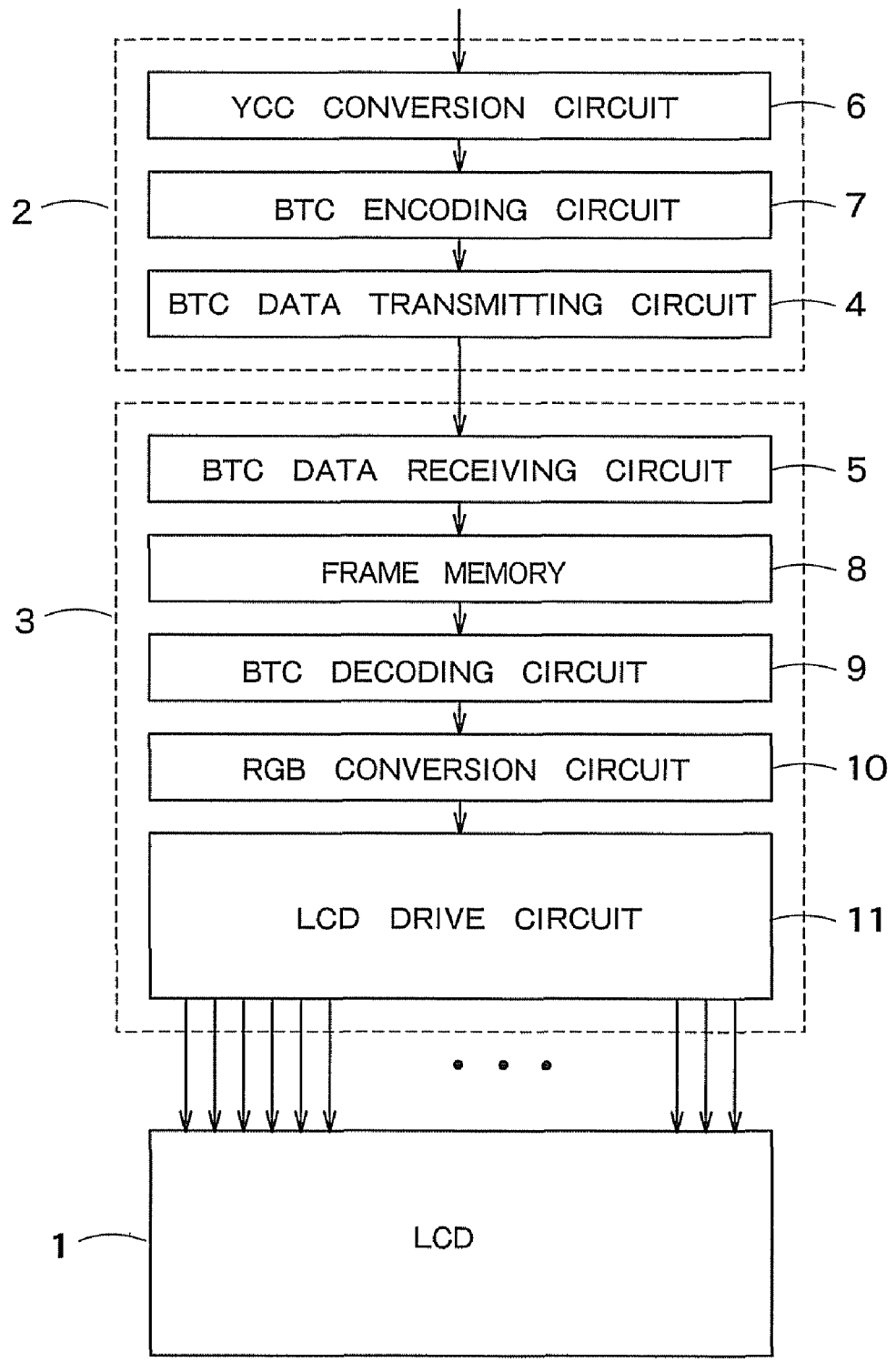
F I G. 28

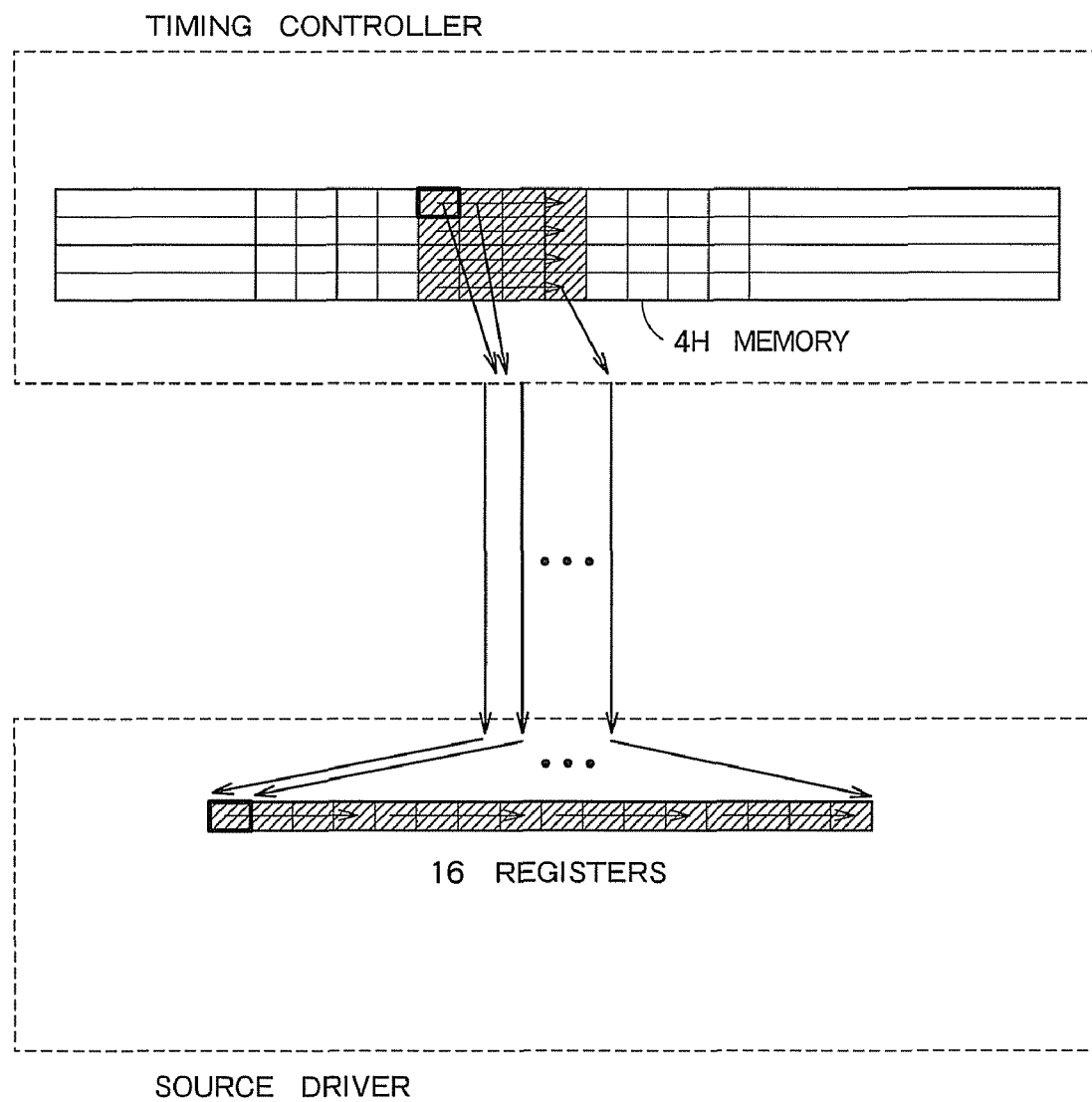
F I G. 29

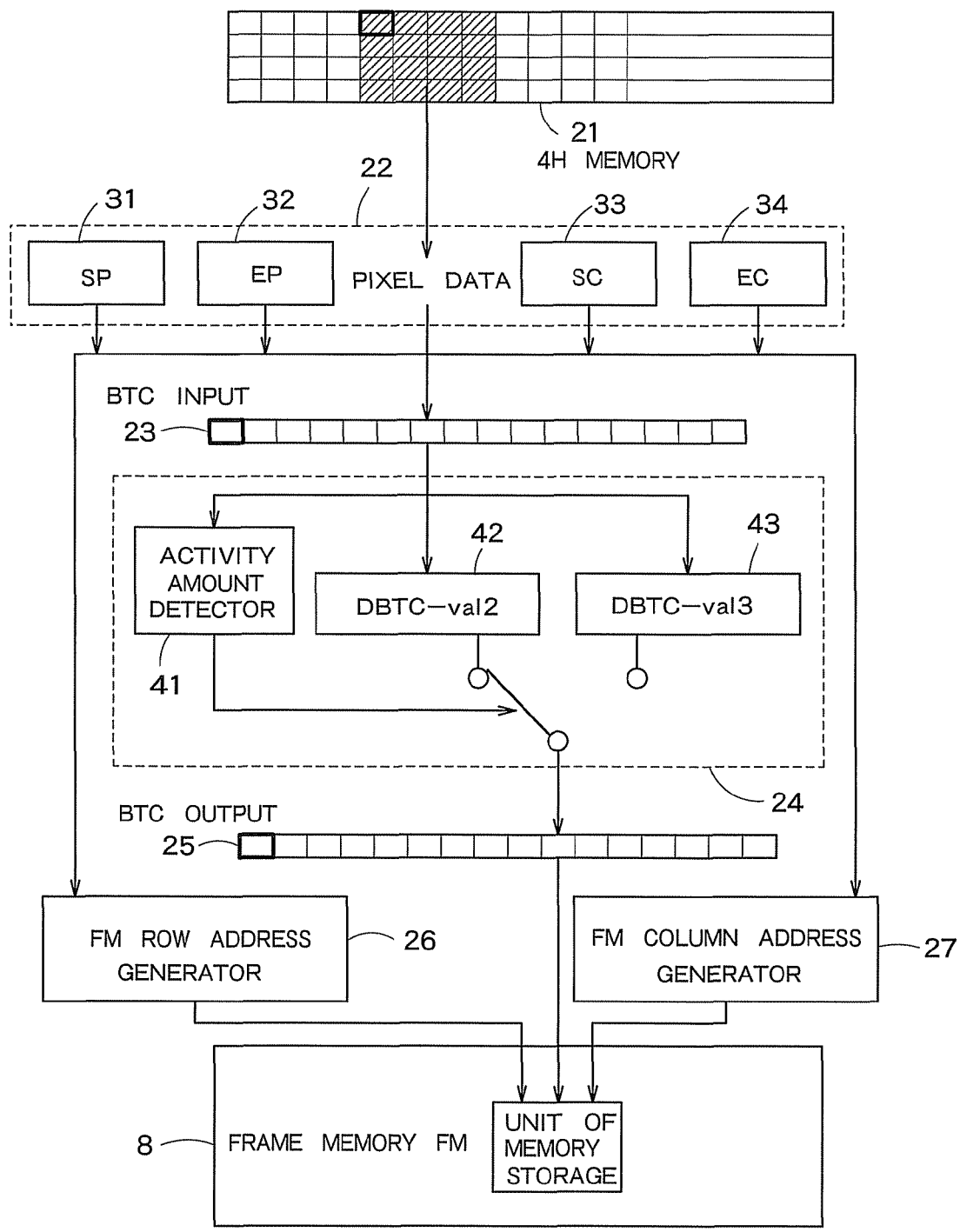
F I G. 30

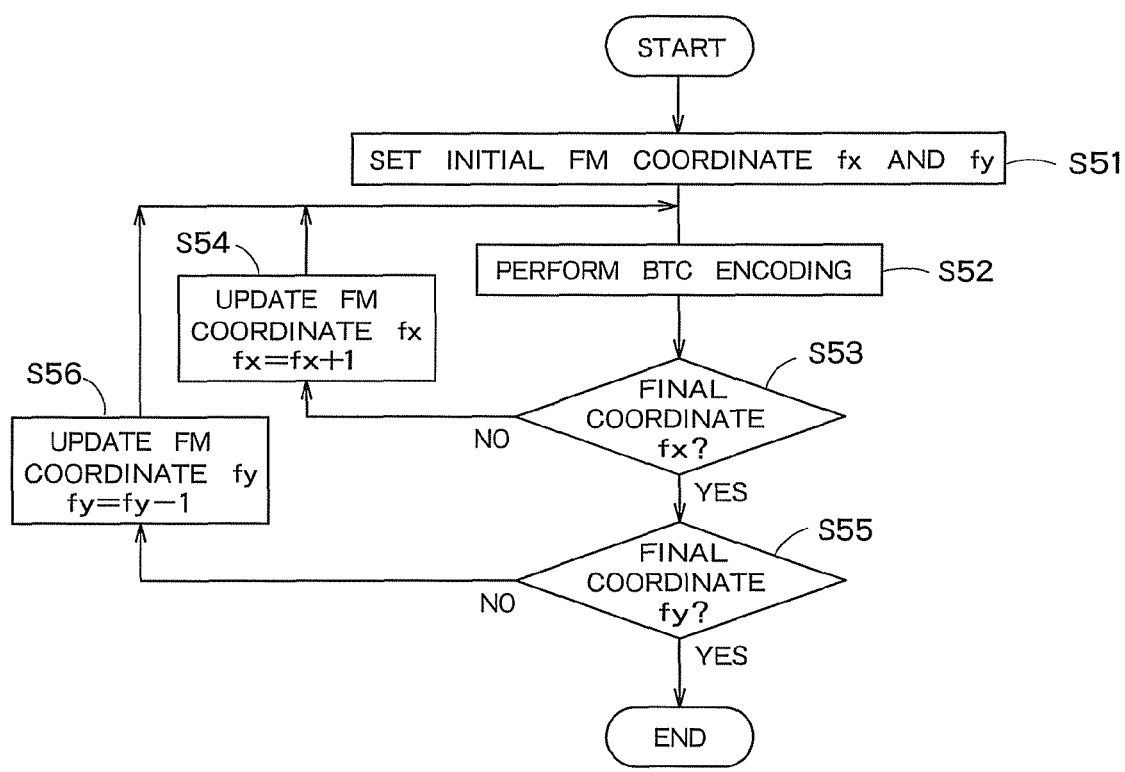
F I G. 33

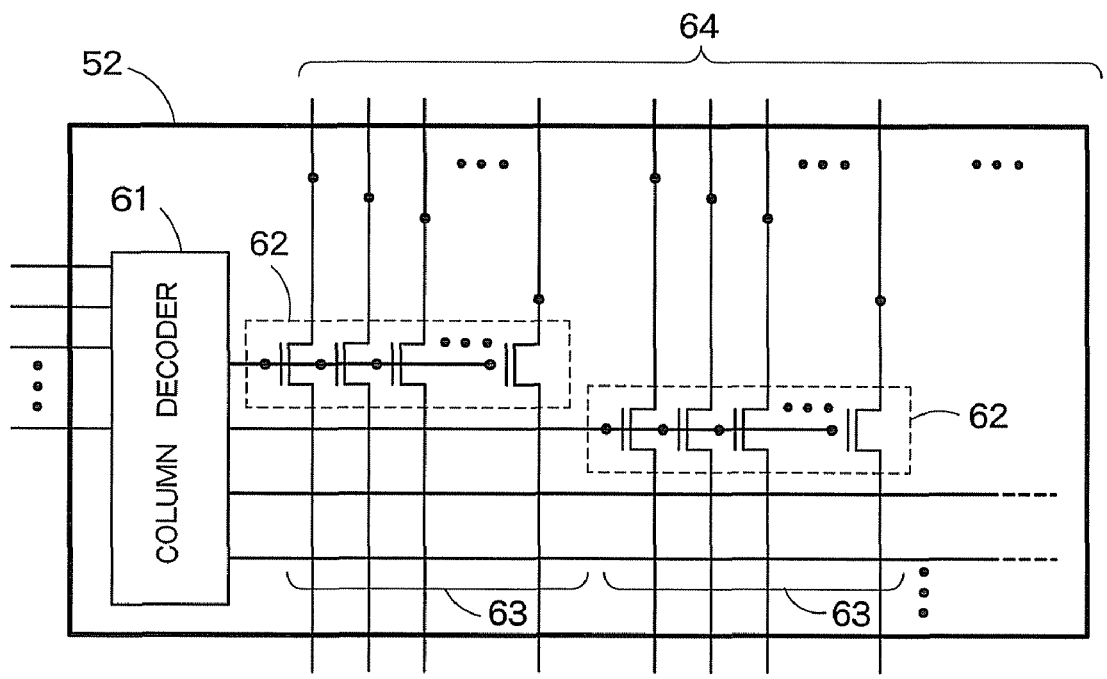
F I G. 37
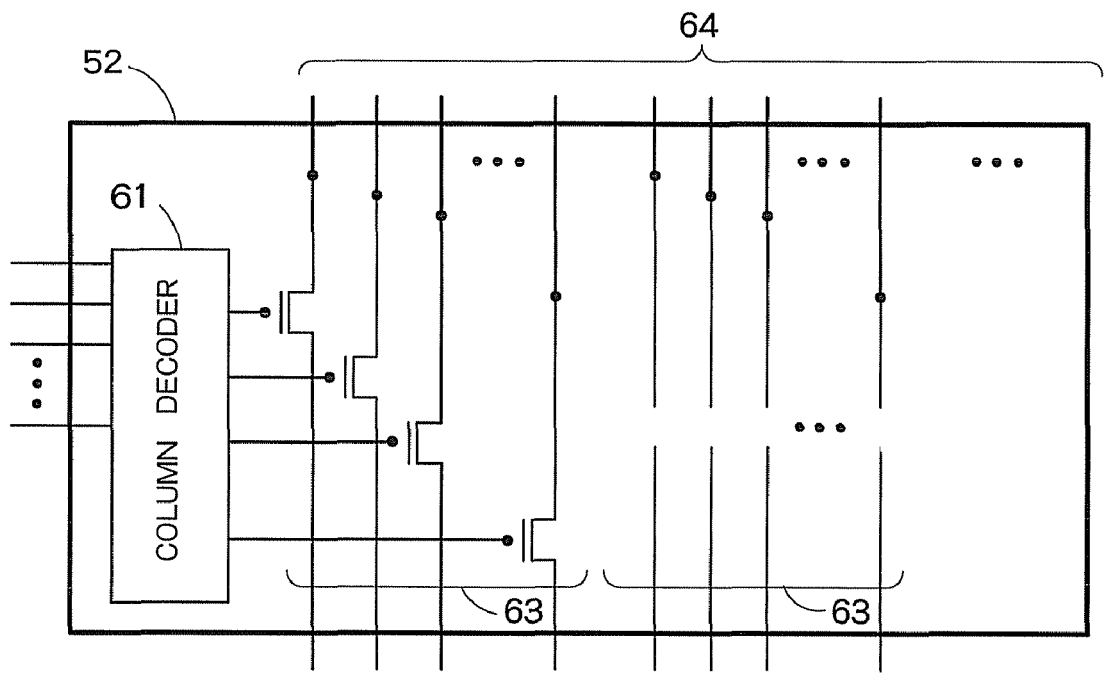
F I G. 38

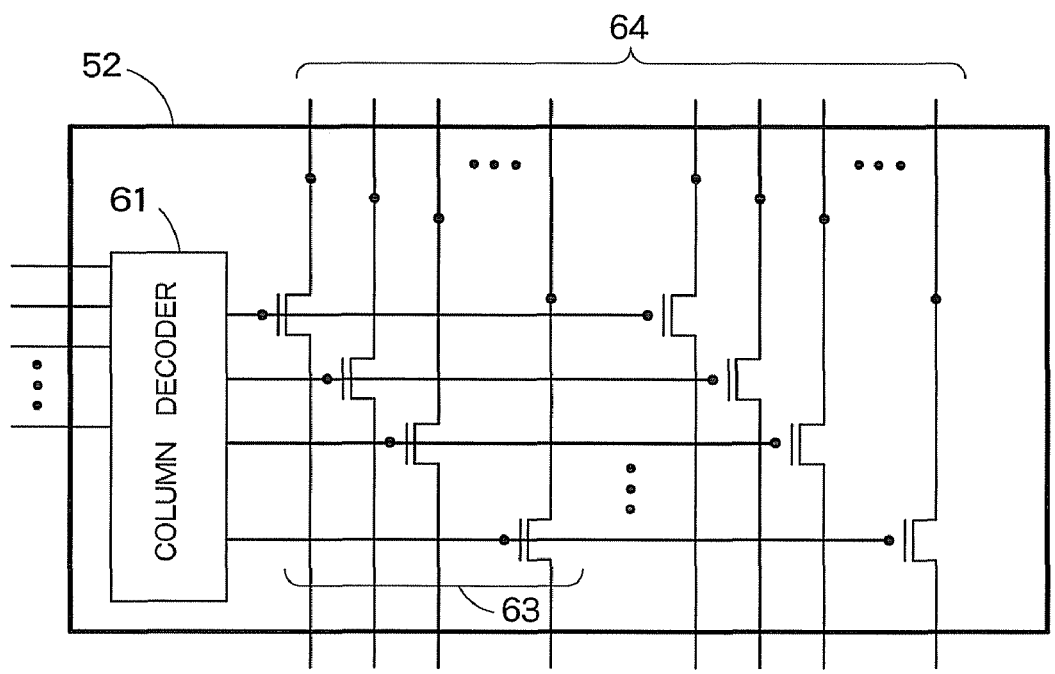
F I G. 39
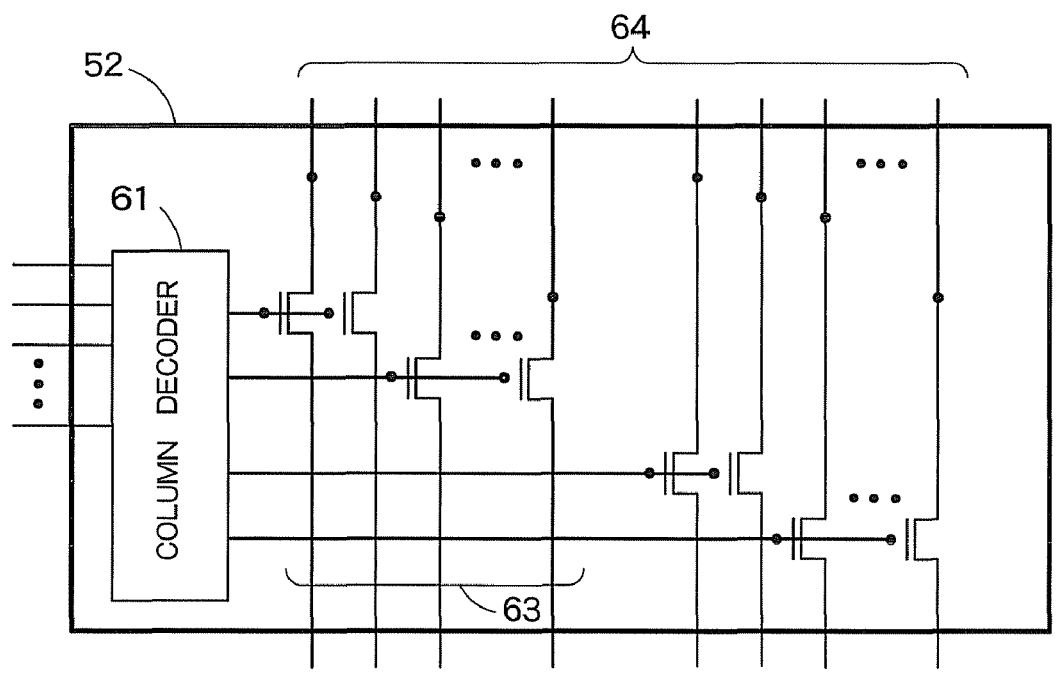
F I G. 40

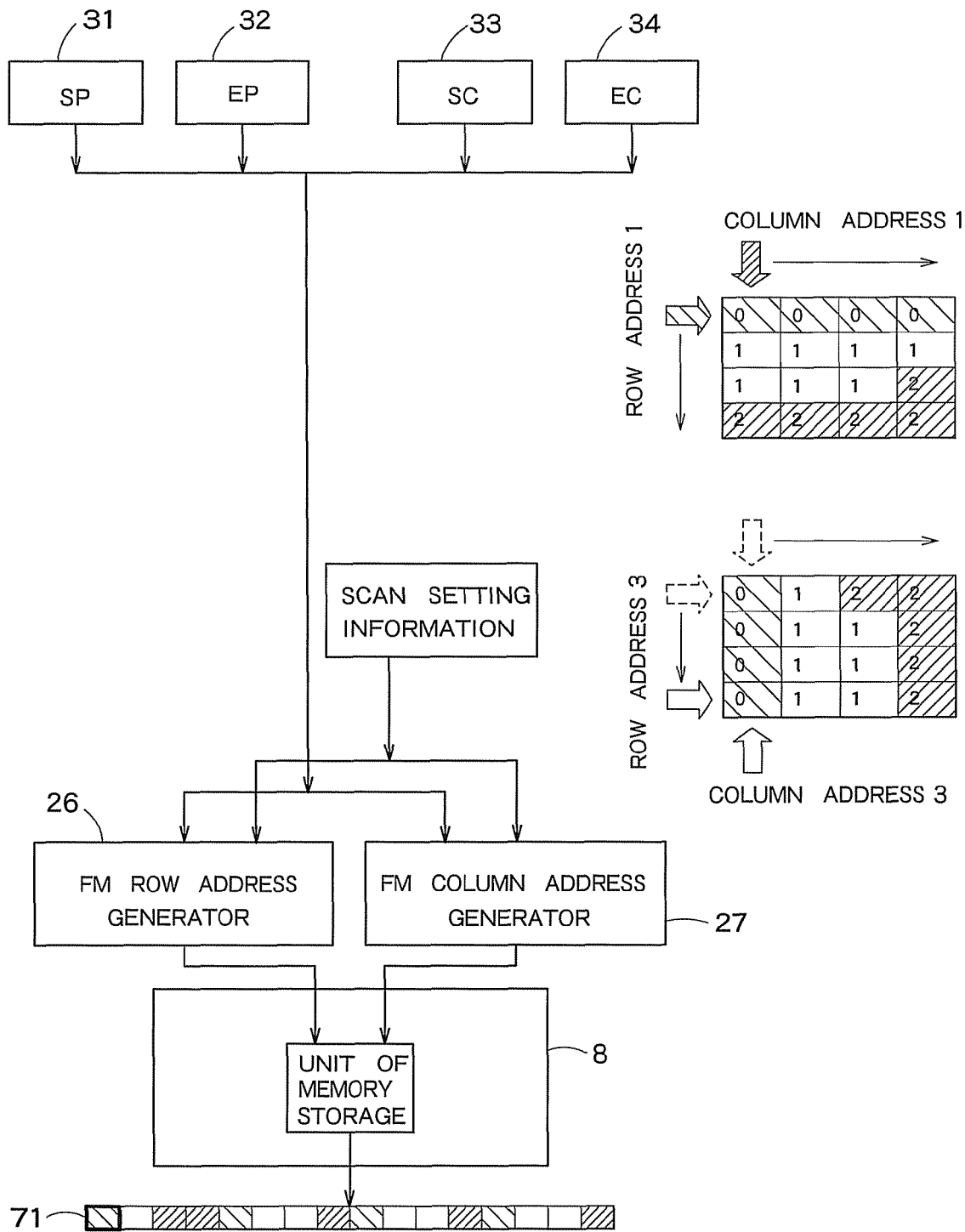
F I G. 43

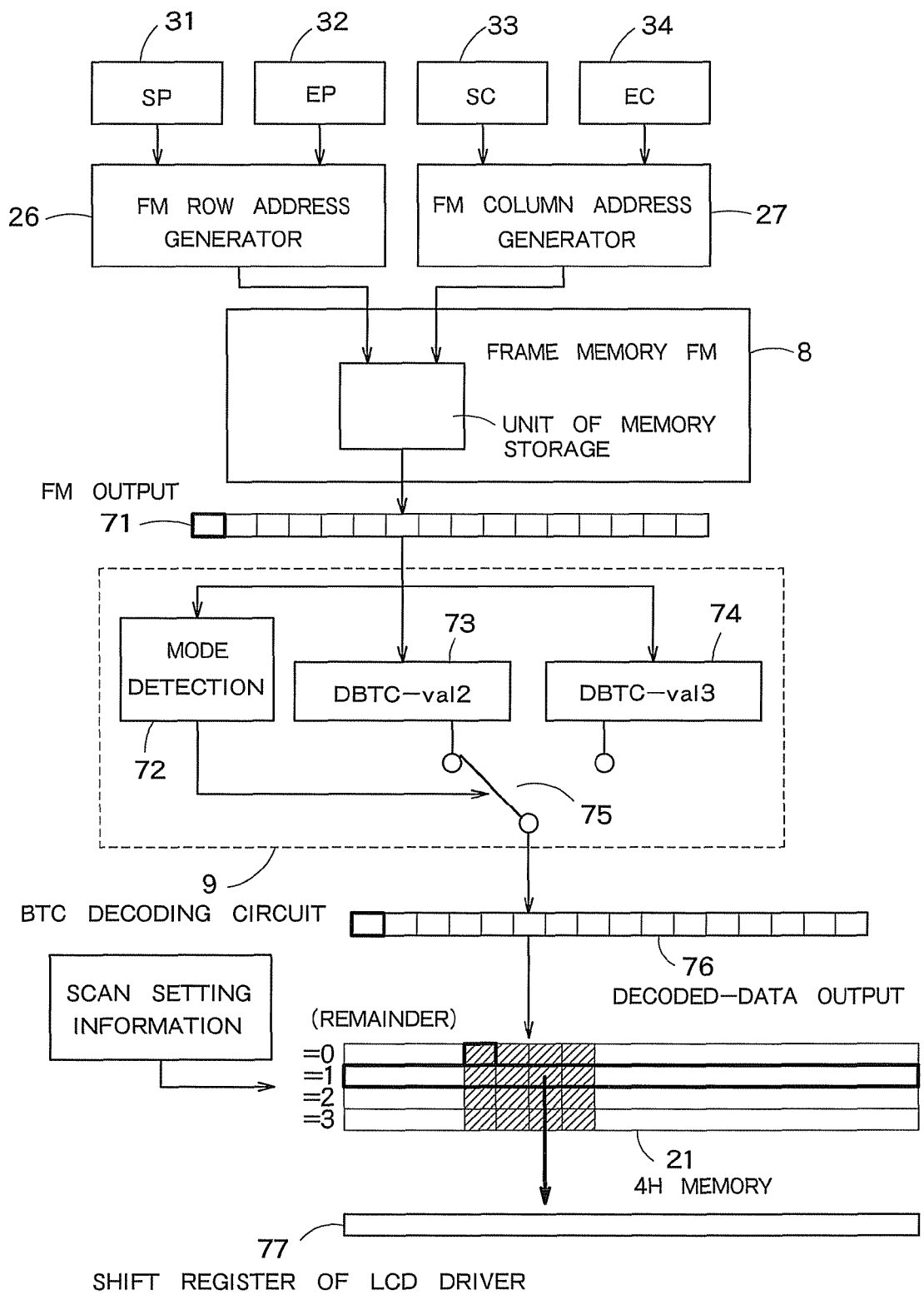
F I G. 44

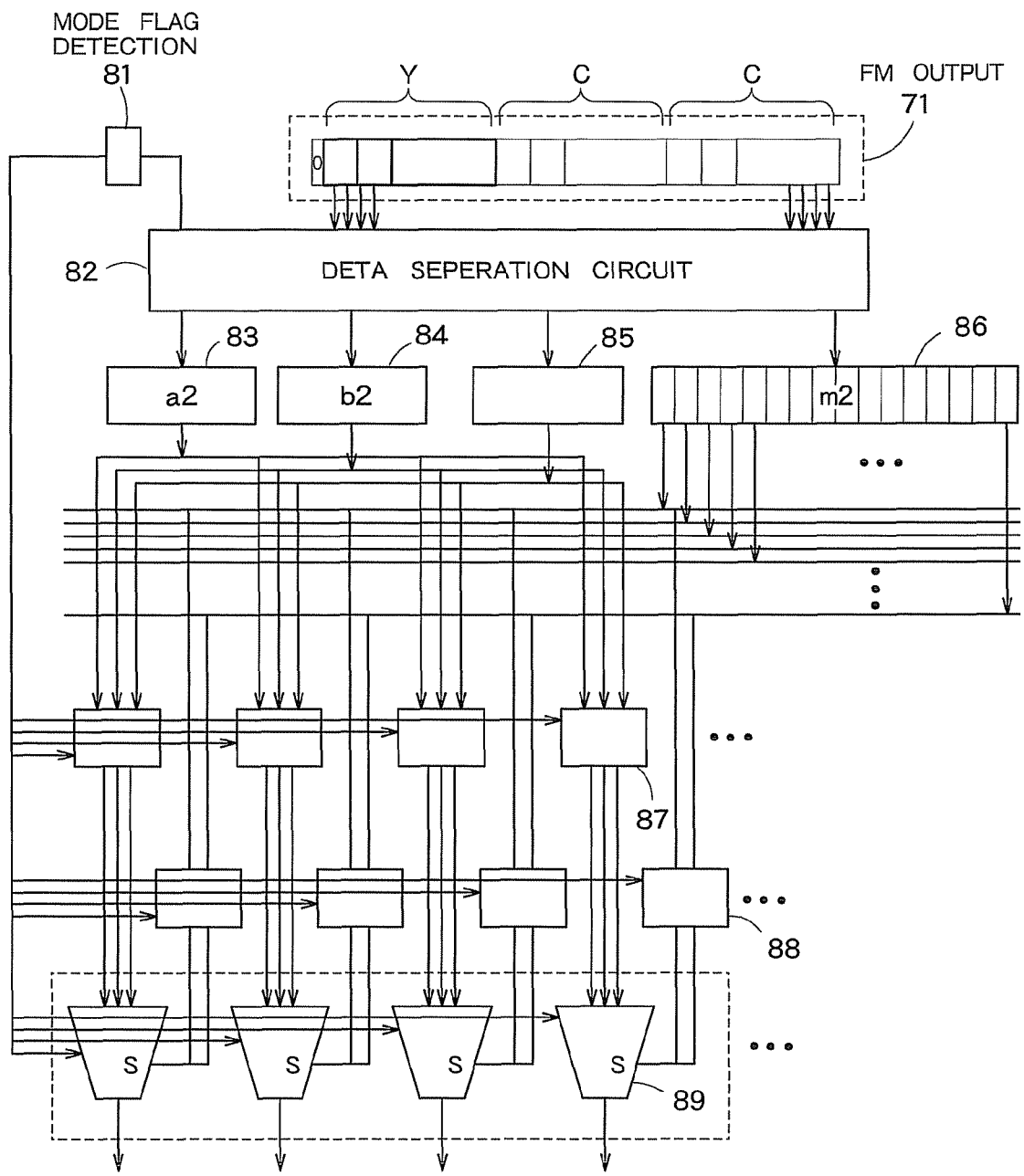
F I G. 45

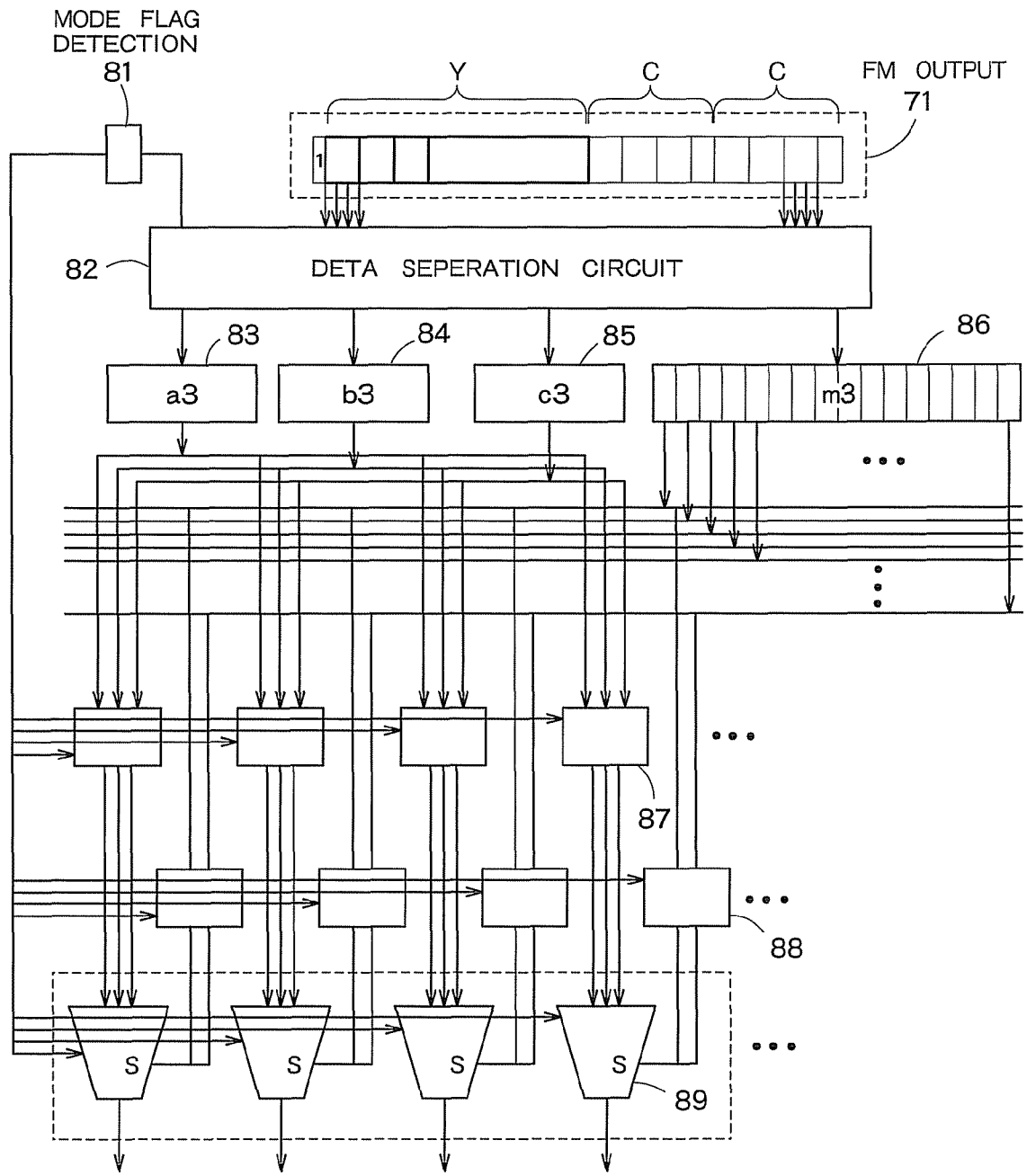
F I G. 46

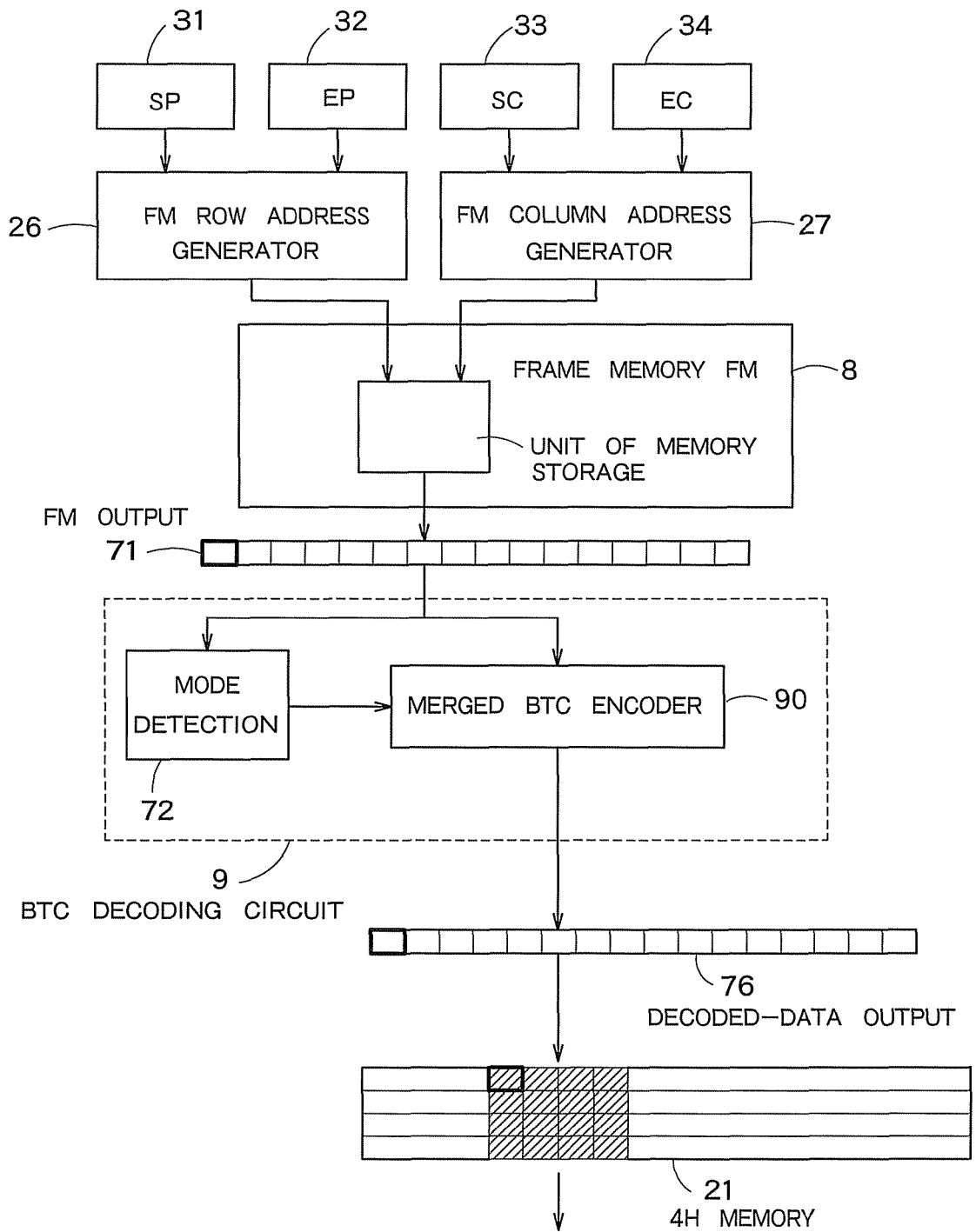
F I G. 47

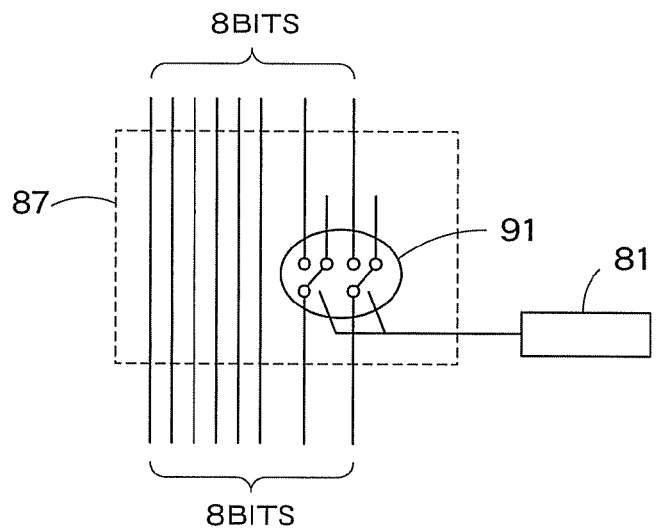
F I G. 48
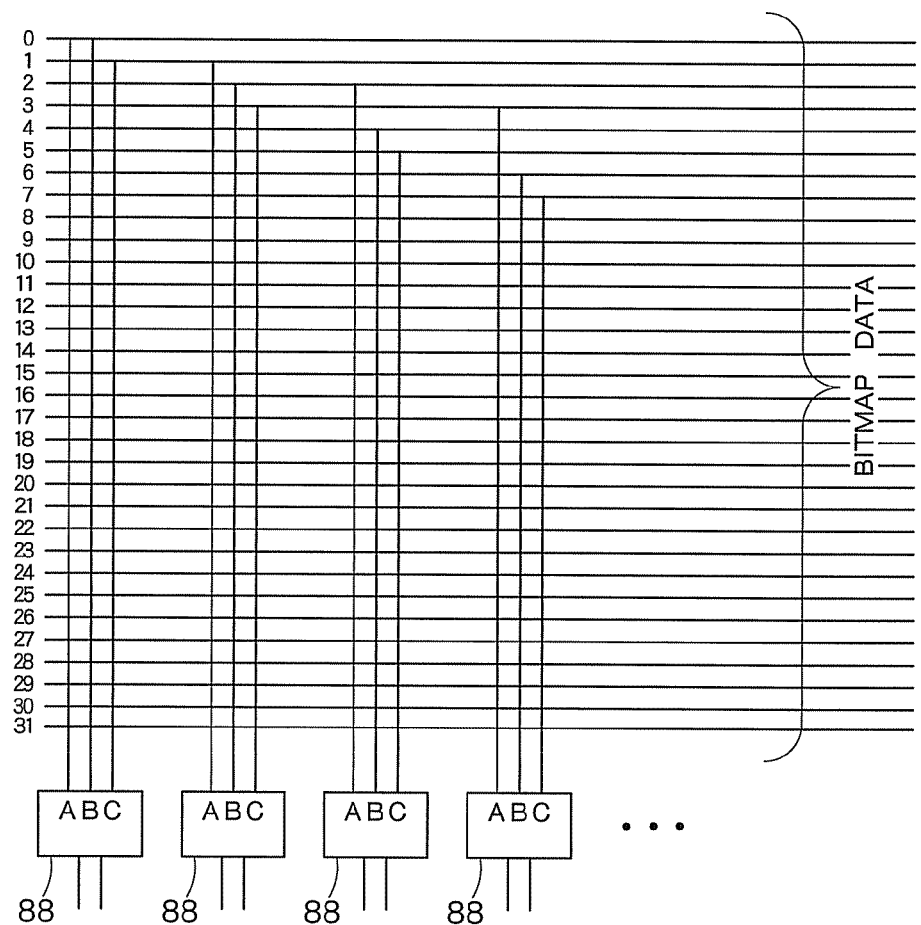
F I G. 49

| M | A | B | C |
|---|---|---|---|
| 0 | SEL1 | * | * |
| 1 | * | SEL2 | SEL1 |

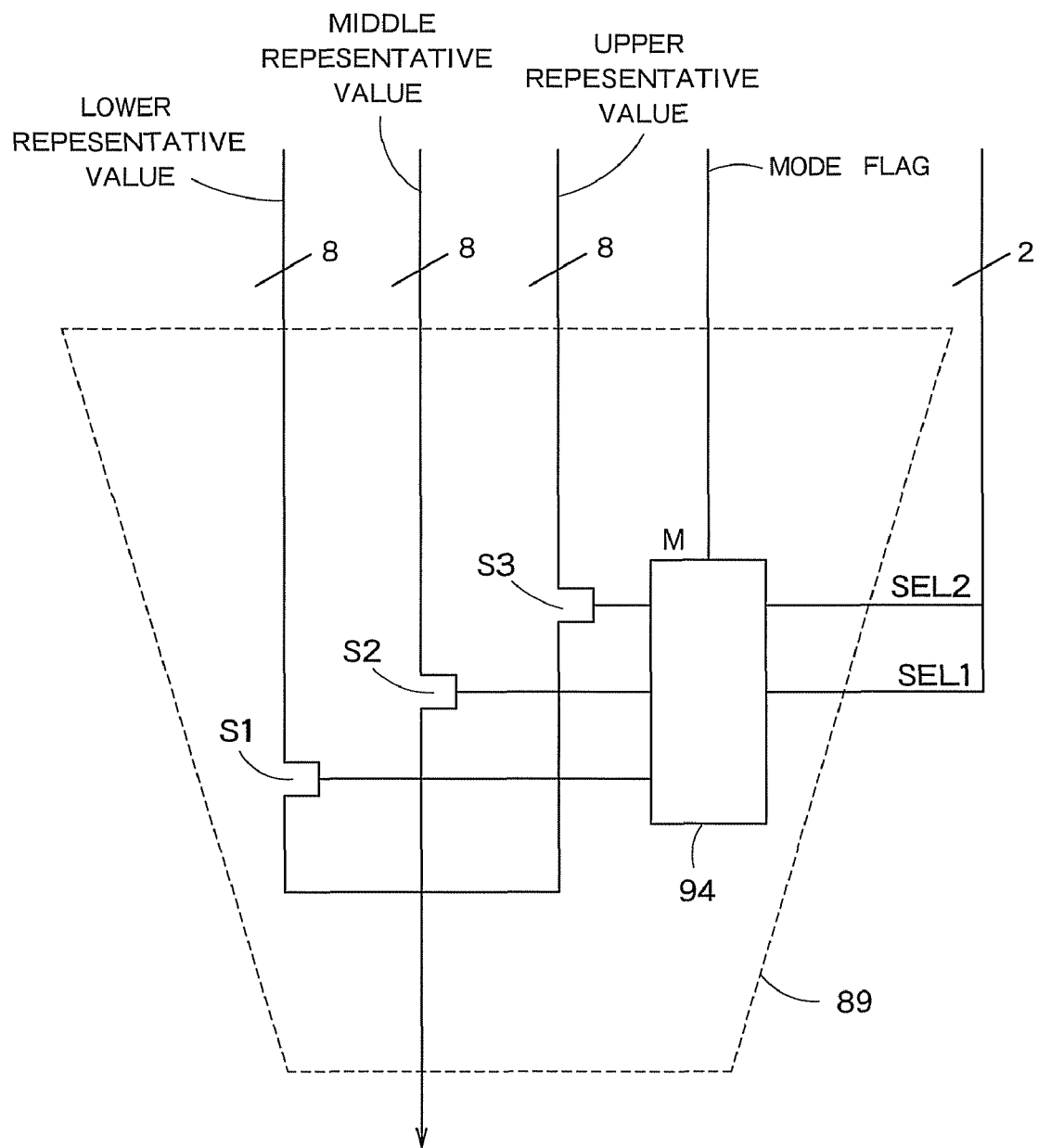
F I G. 52

| M | SEL1 | SEL2 | S1 | S2 | S3 |
|---|------|------|----|----|----|
| 0 | 0 | 0 | 1 | 0 | 0 |
| 0 | * | 1 | 0 | 1 | 0 |
| 1 | 0 | 0 | 1 | 0 | 0 |
| 1 | 0 | 1 | 0 | 1 | 0 |
| 1 | 1 | 0 | 0 | 0 | 1 |
| 1 | 1 | 1 | 0 | 0 | 0 |
F I G. 53
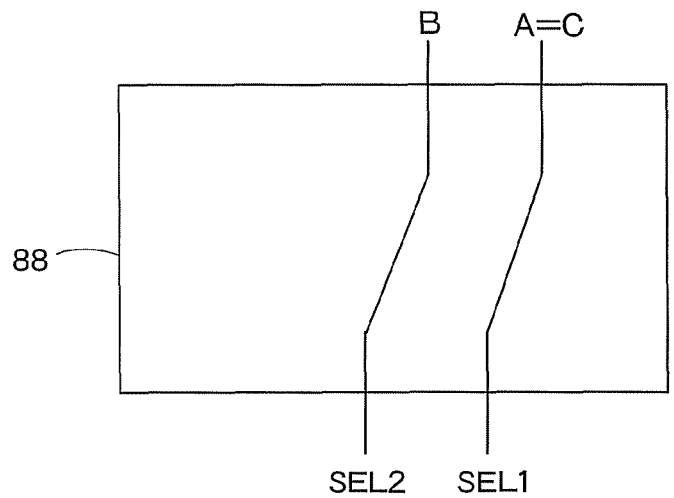
F I G. 54
| M | B | C (=A) |
|---|---|--------|
| 0 | * | SEL1 |
| 1 | SEL2 | SEL1 |
F I G. 55

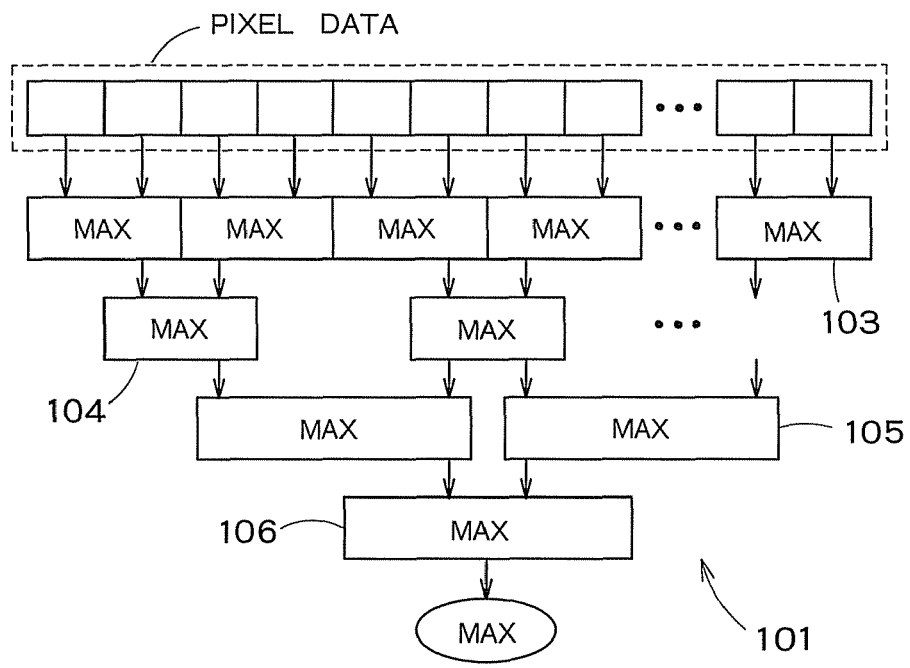
F I G. 56
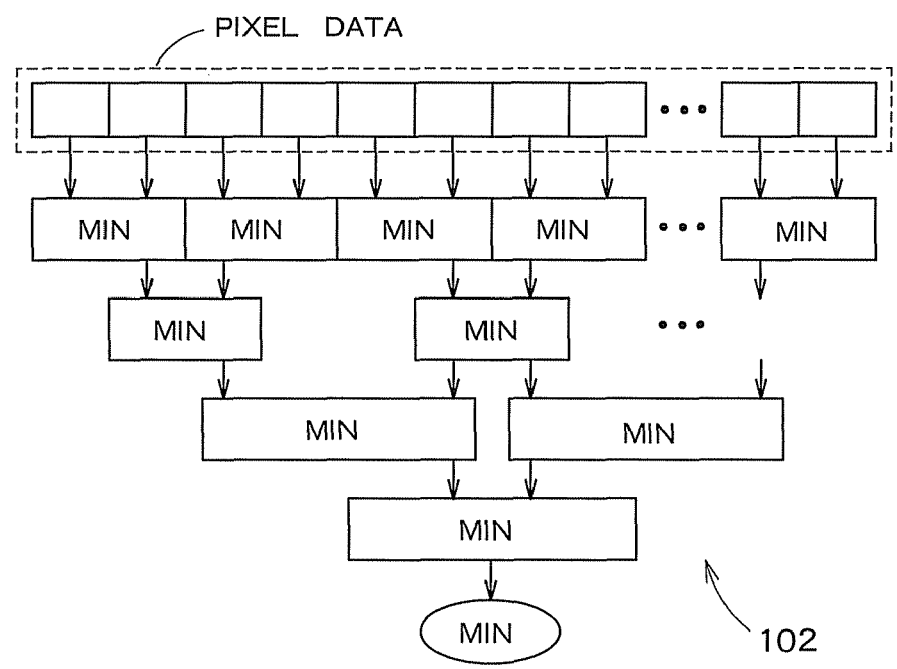
F I G. 57

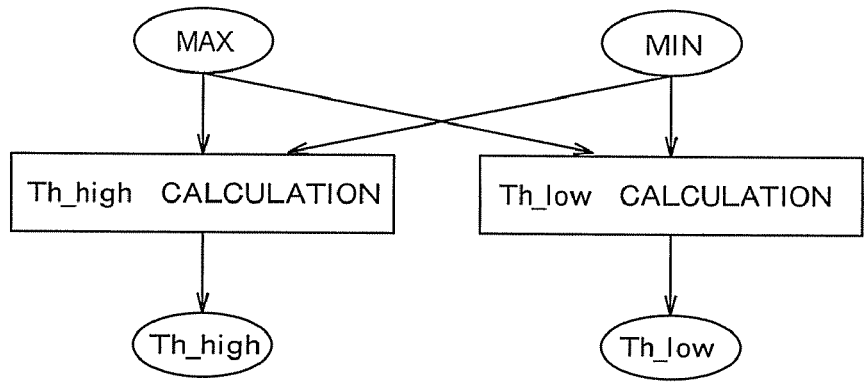
F I G. 58
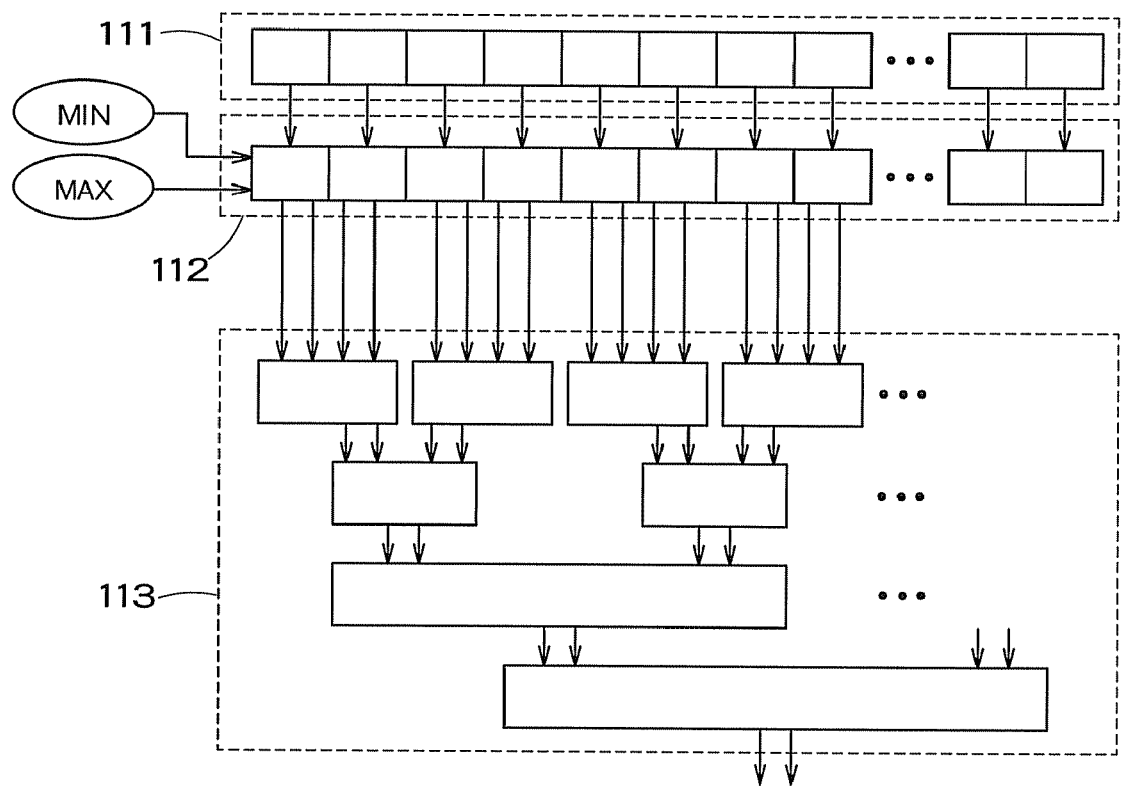
F I G. 59

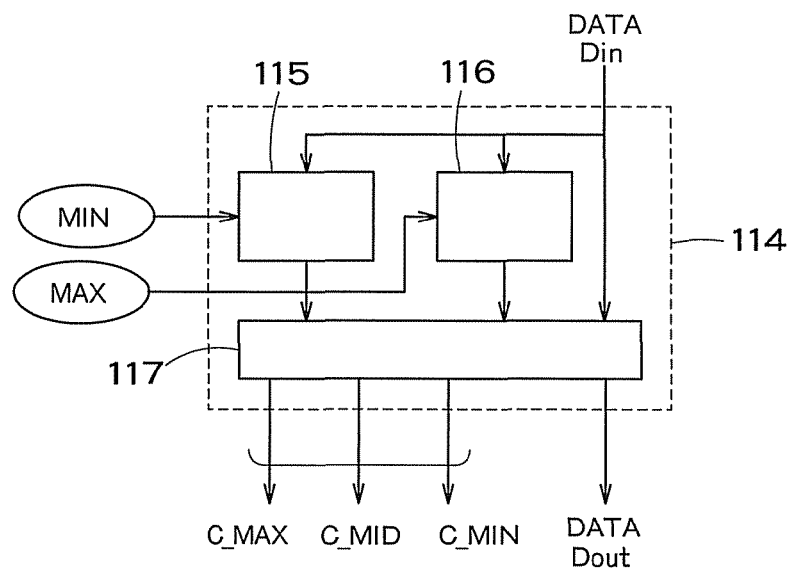
F I G. 60
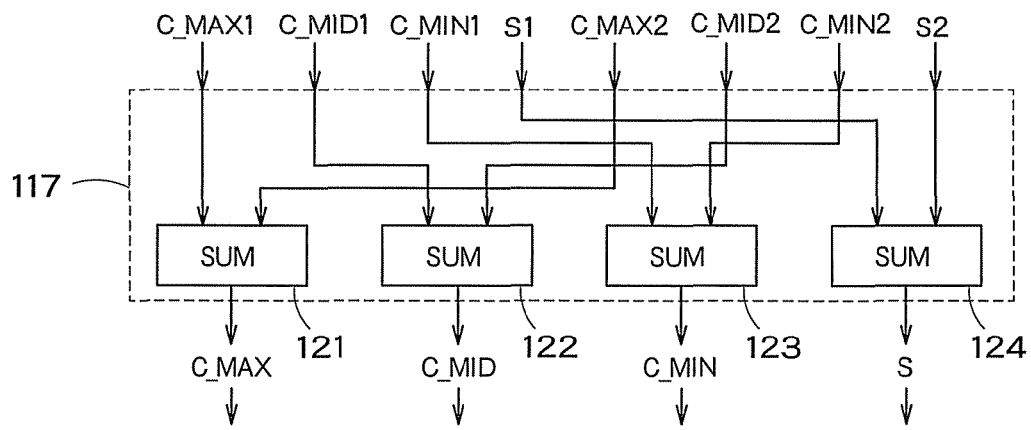
F I G. 61
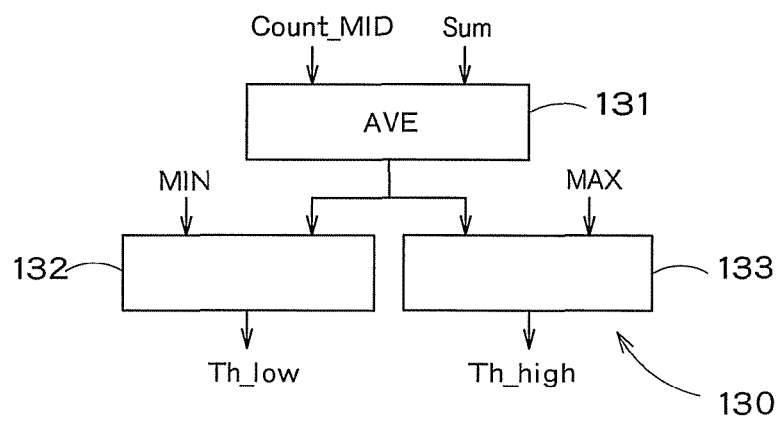
F I G. 62

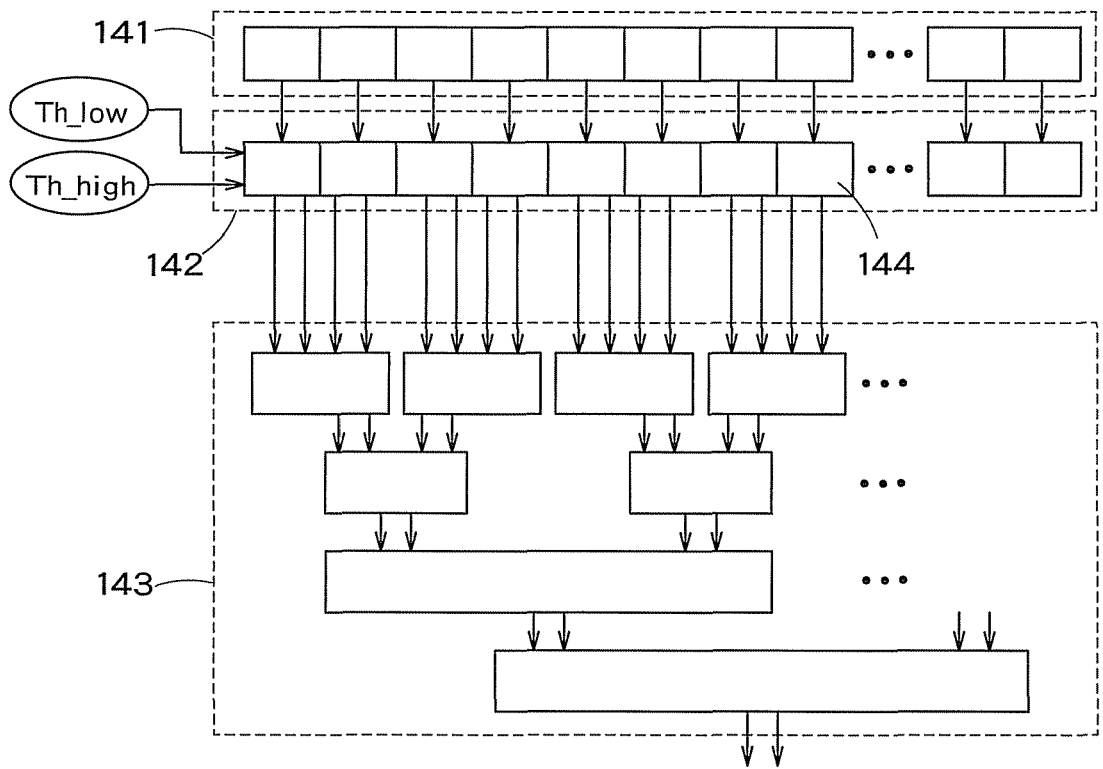
F I G. 63
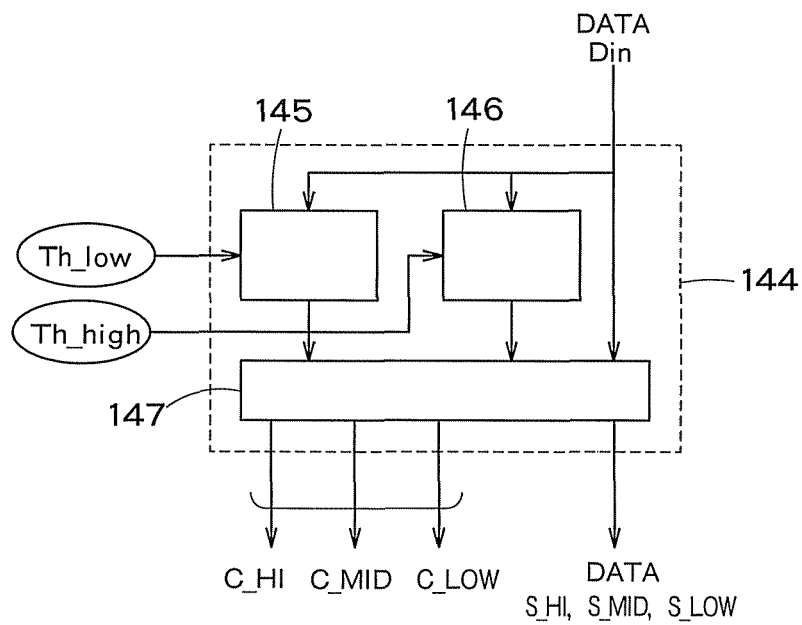
F I G. 64

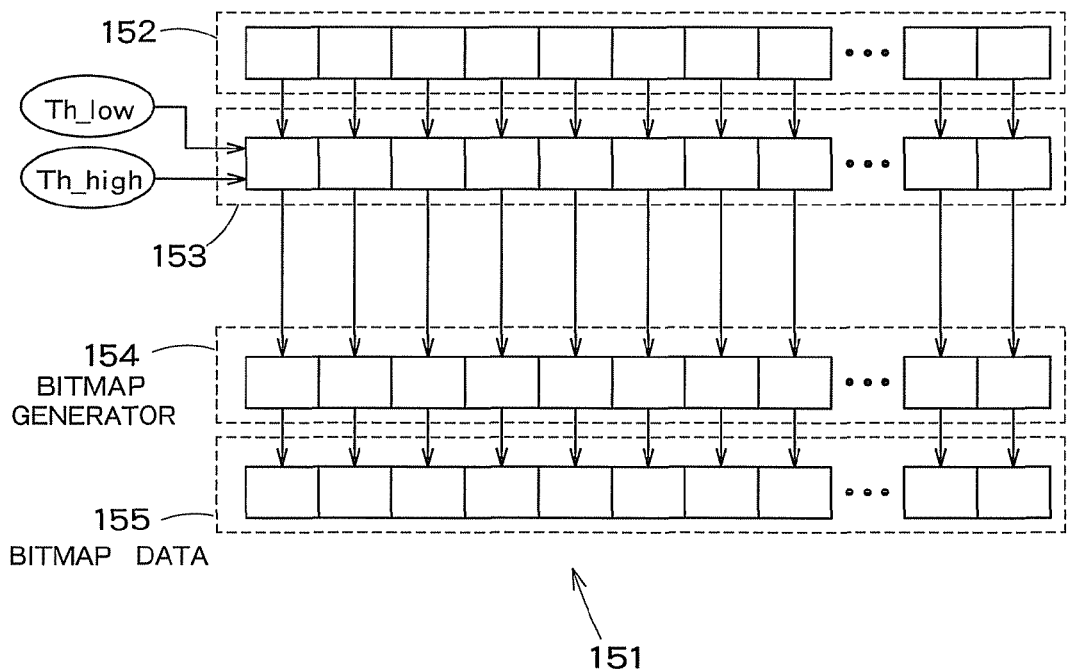
F I G. 67
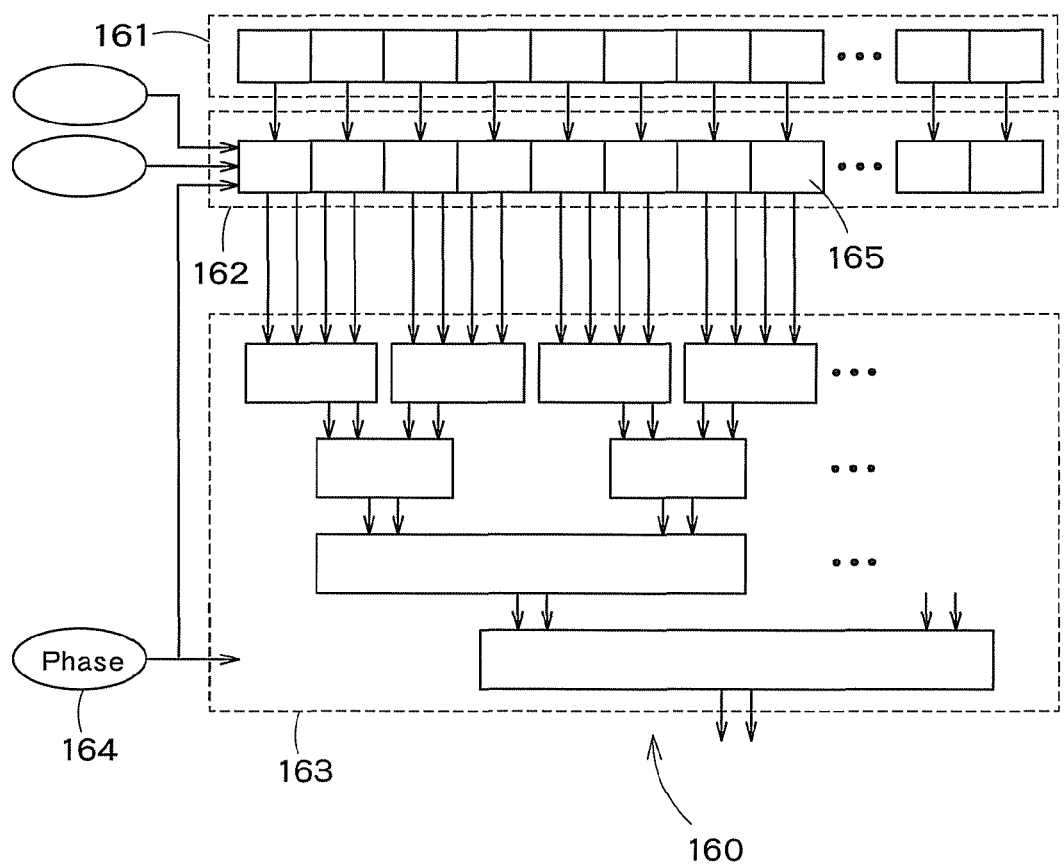
F I G. 68

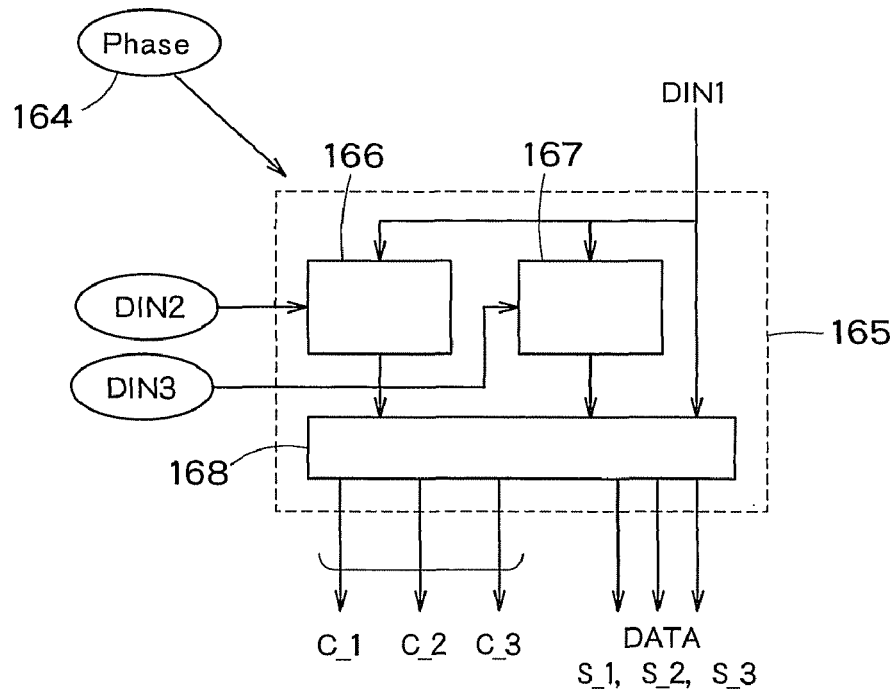
F I G. 69
| Phase | CONDITION | C_1 | C_2 | C_3 | S_1 | S_2 | S_3 |
|---|---|---|---|---|---|---|---|
| 1 | – | * | * | * | * | DIN | * |
| 2 | =MAX | 1 | 0 | 0 | * | * | * |
| 2 | OTHER | 0 | 1 | 0 | * | DIN | * |
| 2 | =MIN | 0 | 0 | 1 | * | * | * |
| 3 | Th_high OR MORE | 1 | 0 | 0 | DIN | 0 | 0 |
| 3 | MIDDLE | 0 | 1 | 0 | 0 | DIN | 0 |
| 3 | Th_low OR LESS | 0 | 0 | 1 | 0 | 0 | DIN |
F I G. 70

| Phase | CONDITION | C_1 | C_2 | C_3 | S_1 | S_2 | S_3 |
|---|---|---|---|---|---|---|---|
| 1 | (MAX SIDE) | +1 | * | +0 | MAX | * | * |
| 1 | (MIN SIDE) | +0 | * | +1 | * | * | MIN |
| 2 | – | + | + | + | * | + | * |
| 3 | – | + | + | + | + | + | + |

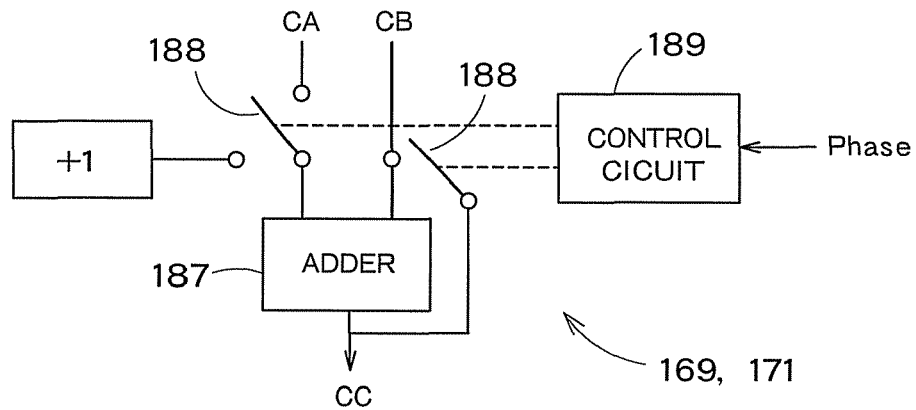
FIG. 76
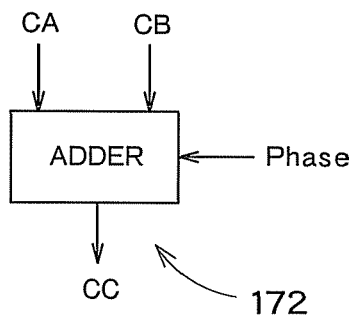
FIG. 77
| M | P | CONDITION | C_1 | C_2 | C_3 | S_1 | S_2 | S_3 |
|---|---|---|---|---|---|---|---|---|
| 0 | 1 | (MAX SIDE) | * | * | * | * | * | * |
| 0 | 1 | (MIN SIDE) | * | * | * | * | * | * |
| 0 | 2 | - | * | * | * | * | + | * |
| 0 | 3 | - | + | * | + | + | * | + |
| 1 | 1 | (MAX SIDE) | +1 | * | +0 | MAX | * | * |
| 1 | 1 | (MIN SIDE) | +0 | * | +1 | * | * | MIN |
| 1 | 2 | - | + | + | + | * | + | * |
| 1 | 3 | - | + | + | + | + | + | + |
FIG. 78

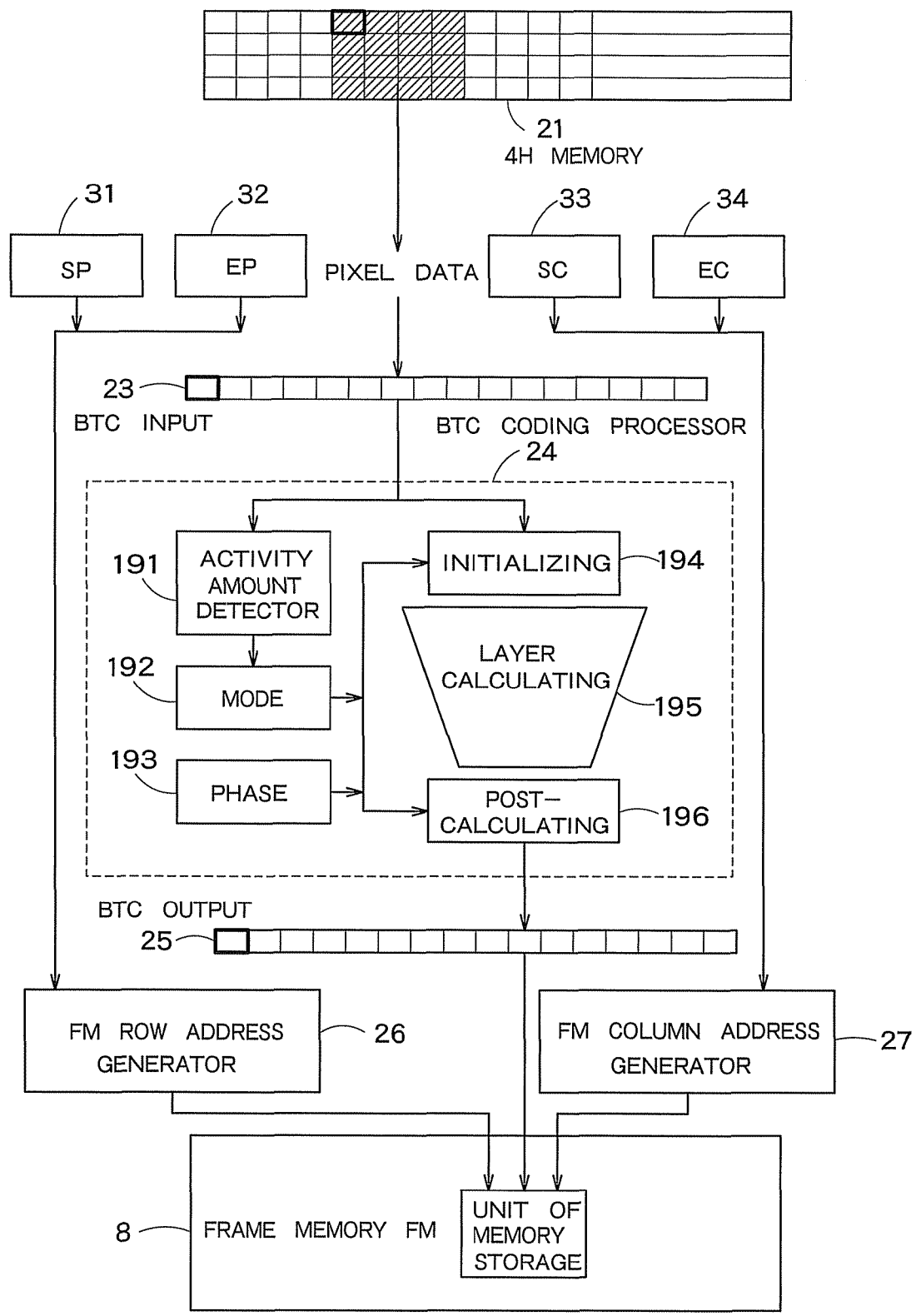
F I G. 79

IMAGE PROCESSING CIRCUIT AND LIQUID CRYSTAL DISPLAY APPARATUS

CROSS REFERENCE TO RELATED APPLICATIONS

This application is based upon and claims the benefit of priority from the prior Japanese Patent Application No. 2006-139309, filed on May 18, 2006, the entire contents of which are incorporated herein by reference.

BACKGROUND OF THE INVENTION

1. Field of the Invention

The present invention relates to an image processing circuit which encodes image data and a liquid crystal display apparatus including the image processing circuit.

2. Related Art

BTC technology for image compression has been proposed. A three level BTC has been proposed which compresses image data in a pixel block consisting of multiple pixels at three levels (see reference 1: Alsaka & Lee 1990) Y. A. Alsaka, D. A. Lee. "Three Level Block Truncation Coding," IEEE, Proceedings 1990 Southastcon, p. 421). The technique described in this reference fixes thresholds "th" and "tl" where "th=MAX−R/3" and "tl=MIN+R/3" and fixes representative values "a" and "b" classified by the thresholds "th" and "t1" at "a=(th+MAX)/2" and "b=(tl+MIN)/2" based on a range "R=MAX−MIN" determined from a maximum value "MAX" and minimum value "MIN," without considering distribution of pixel values. PC images, if compressed by this technique, may cause visible artifacts.

Another three-level BTC has been proposed (see reference 2: Efrati 1991] N. Efrati, H. Liciztin. "Classified block truncation coding-vector quantization: An edge sensitive image compression algorithm," Signal Processing: Image Communication 3 (1991) 275-283, Elsevier Science Publisher). The technique described in this reference determines three-level BTC thresholds using representative values "a2" and "b2" determined by two-level BTC in advance. For instance, it determines two thresholds "t1" and "t2" by performing calculations "t1=(3×b2+a2)/4" and "t2=(3×a2+b2)/4," classifies image data into three groups using the thresholds "t1" and "t2," and determines average values of the respective groups as their representative values. Using these representative values as initial values, the technique repeats calculations to determine optimum thresholds and representative values.

Again, since the thresholds and representative values are determined in a fixed manner, visible artifacts may be caused especially in the case of PC images.

Yet another three-level BTC has been proposed (see reference 3: Mor 1992] I. Mor, Y. Swissa, H. B. Mitchell. "A fast nearly optimum equi-spaced 3-level block truncation coding algorithm," Signal Processing: Image Communication 6 (1994) 397-404, Elsevier Science Publishers). The technique described in this reference generates three levels at equal intervals, centering on a representative value of image data. The two thresholds "t8" and "t2" are given by "t1=c−s/2" and "t2=c+s/2." It performs calculations repeatedly by optimizing mean square error (MSE) as an objective function, and thereby determines final thresholds.

Since this technique must perform calculations repeatedly until final thresholds are determined, there is a problem that the calculation is computationally very intensive.

Any of the techniques described above has the problem of visible degradation for PC images processed by it. False colors may appear in relatively large areas, especially in window frames, banners, error display panel portions, input prompt portions, and the like which have high black-and-white contrast and in which pixel data having three values or more are neighboring each other including a background and characters. Also, three-level BTC has a lower compression ratio than two-level BTC because the number of representative values increases from two to three.

SUMMARY OF THE INVENTION

According to one embodiment of the present invention, an image processing circuit, comprising:

a color information converter configured to convert image data including a plurality of color information into luminance data and color difference data;

an activity detector whether amount of activity predetermined according to differences between the luminance data in a plurality of pixels in each of pixel blocks and differences between the color difference data in the plurality of pixels exceeds a predetermined first threshold value for each pixel block including a plurality of pixels adjacent to each other; and a encoding unit configured to perform a first encoding process by generating m (m is an integer of three or larger) representative values corresponding to the luminance data and the color difference data in the plurality of pixels in the pixel block that the activity detector determines to exceed the first threshold value, and perform a second encoding process by generating n (n is an integer of two or more and the integer larger than m) representative values corresponding to the luminance data and the color difference data in the plurality of pixels in the pixel block that the activity detector determines not to exceed the first threshold value, to generate encoded data.

According to one embodiment of the present invention, a liquid crystal display apparatus, comprising:

a liquid crystal panel configured to have signal lines and scanning lines arranged in a matrix form, and a plurality of pixel switches provided corresponding to the respective cross points of the signal lines and the scanning lines; and a display control unit configured to generate analog pixel voltages to be supplied to the signal lines, wherein the display control unit includes:

a color information converter configured to convert image data including a plurality of color information into luminance data and color difference data;

an activity detector whether amount of activity predetermined according to differences between the luminance data in a plurality of pixels in each of pixel blocks and differences between the color difference data in the plurality of pixels exceeds a predetermined first threshold value for each pixel block including a plurality of pixels adjacent to each other; and a encoding unit configured to perform a first encoding process by generating m (m is an integer of three or larger) representative values corresponding to the luminance data and the color difference data in the plurality of pixels in the pixel block that the activity detector determines to exceed the first threshold value, and perform a second encoding process by generating n (n is an integer of two or more and the integer larger than m) representative values corresponding to the luminance data and the color difference data in the plurality of pixels in the pixel block that the activity detector determines not to exceed the first threshold value, to generate encoded data.

BRIEF DESCRIPTION OF THE DRAWINGS

FIG. 1 is a block diagram showing a schematic configuration of an image processing apparatus according to an embodiment of the present invention;

FIG. 5 is a diagram showing encoded data obtained by the two-level BTC algorithm in FIG. 4;

FIG. 6 is a diagram showing results of decoding the encoded data in FIG. 5;

FIG. 10 is a diagram showing an example of encoded data produced by a three-level BTC algorithm;

FIG. 11 is a diagram showing an example of color-difference data coded by a three-level BTC algorithm;

FIG. 12 is a diagram showing all encoded data obtained from the luminance data shown in FIG. 7 and the color-difference data shown in FIG. 8;

FIG. 14 is a diagram schematically showing how an amount of data is compressed to 1/4 in an encoding process performed by the BTC encoding circuit 7;

FIG. 15 is a flowchart showing an example of processing procedures performed by a BTC decoding circuit 9 in FIG. 1;

FIG. 16 is a diagram illustrating the process of decoding data coded by a two-level BTC algorithm;

FIG. 17 is a diagram illustrating a decoding process of luminance data;

FIG. 18 is a diagram illustrating a decoding process of color-difference data;

FIGS. 19A and 19B are diagrams illustrating an example of how image quality changes with a middle representative value;

FIG. 22 is a flowchart illustrating processing procedures for selecting thresholds and representative values used for a three-level BTC algorithm;

FIG. 23 is a diagram illustrating details of a process performed in Step S23;

FIG. 24 is a flowchart showing processing procedures for determining representative values;

FIG. 25 is a table showing correspondence between variables "Cnt_high," "Cnt_mid," and "Cnt_low" and representative values "V_plus," "V_mid," and "V_minus" used in Step S47 in FIG. 24;

FIG. 26 is a table showing compression capability of a frame memory 8;

FIG. 27 is a table showing compression capability when a QVGA size image is compressed directly;

FIG. 28 is a block diagram showing a schematic configuration of an image processing circuit which is a variation of the one shown in FIG. 1;

FIG. 29 is a diagram illustrating data exchange between a timing controller and source driver;

FIG. 30 is a diagram showing an internal configuration of the BTC encoding circuit 7 in FIG. 1;

FIG. 33 is a flowchart illustrating processing procedures for generating an address in the frame memory 8;

FIG. 37 is a block diagram showing an internal configuration of a data selector 52 configured differently from the one shown in FIG. 36;

FIG. 38 is a block diagram showing an internal configuration of a data selector 52 configured differently from the one shown in FIGS. 36 and 37;

FIG. 39 is a diagram illustrating an example of storing encoded data in blocks of multiple bits in the frame memory 8;

FIG. 40 is a diagram illustrating an example of storing encoded data in blocks of multiple bits in the frame memory 8;

FIG. 43 is a diagram illustrating address generation in the frame memory 8 when a 90-degree rotation process is performed;

FIG. 44 is a diagram illustrating processing operations used when start column information SC and end column information EC are not quadruples of an integer;

FIG. 45 is a block diagram showing a detailed internal configuration of a BTC decoding circuit 9;

FIG. 46 is a diagram illustrating a decoding process of luminance data when mode flag is "1";

FIG. 47 is a block diagram showing an internal configuration of a BTC decoding circuit 9 containing a merged decoder 80;

FIG. 48 is a block diagram showing an internal configuration of a bit length adjusting circuit 87 in FIG. 45;

FIG. 49 is a diagram showing connections among input sections of data reference circuits 88 in FIG. 45;

FIG. 52 is a block diagram showing an internal configuration of a selector 89 in FIG. 45;

FIG. 53 is a table showing a switching operation of a switching control circuit;

FIG. 54 is a diagram showing an example of data reference circuit;

FIG. 55 is a table showing an example of a switching operation of the data reference circuit;

FIG. 56 is a block diagram showing a schematic configuration of a maximum value detecting circuit 101 which detects a maximum value in a pixel block;

FIG. 57 is a block diagram showing a schematic configuration of a minimum value detecting circuit 102 which detects a minimum value in a pixel block;

FIG. 58 is a diagram illustrating a technique for calculating two thresholds "Th_high" and "Th_low" based on the maximum value "MAX" and minimum value "MIN" detected in FIGS. 56 and 57;

FIG. 59 is a block diagram showing a schematic configuration of an average value detecting circuit 110 which performs a process of Step S23 in FIG. 22 to detect an average value of pixels excluding the maximum value "MAX" and minimum value "MIN" of pixel values in the pixel block;

FIG. 60 is a block diagram showing an internal configuration of multiple comparison sections 114 installed in a comparison circuit 112 in FIG. 59;

FIG. 61 is a block diagram showing an internal configuration of an output circuit 117 in FIG. 60;

FIG. 62 is a block diagram showing a schematic configuration of a threshold detecting circuit 130 which detects the thresholds "Th_high" and "Th_low" in Step S23 in FIG. 22;

FIG. 63 is a block diagram showing a schematic configuration of a circuit which performs a process of Step S33 in FIG. 23 to classify pixel values in a pixel block into three groups based on the thresholds "Th_high" and "Th_low" and determine a count value and cumulative value of each group;

FIG. 64 is a block diagram showing an internal configuration of multiple comparison sections 144 installed in a comparison circuit 142;

FIG. 67 is a block diagram showing an internal configuration of a bitmap data generating circuit 151 which generates bitmap data of a pixel block;

FIG. 68 is a block diagram showing a schematic configuration of a shared circuit 160;

FIG. 69 is a block diagram showing an internal configuration of multiple comparison sections 165 installed in a comparison circuit 162;

FIG. 70 is a table summarizing operations in each phase;

FIG. 76 is a block diagram showing an internal configuration of adders 169 and 171 in FIG. 71;

FIG. 77 is a block diagram showing an internal configuration of an adder 172 in FIG. 71;

FIG. 78 is a table showing conditions of optimization for two-level BTC and three-level BTC; and FIG. 79 is a block diagram showing an internal configuration of a BTC encoding circuit 7.

DETAILED DESCRIPTION OF THE INVENTION

Figure 2:
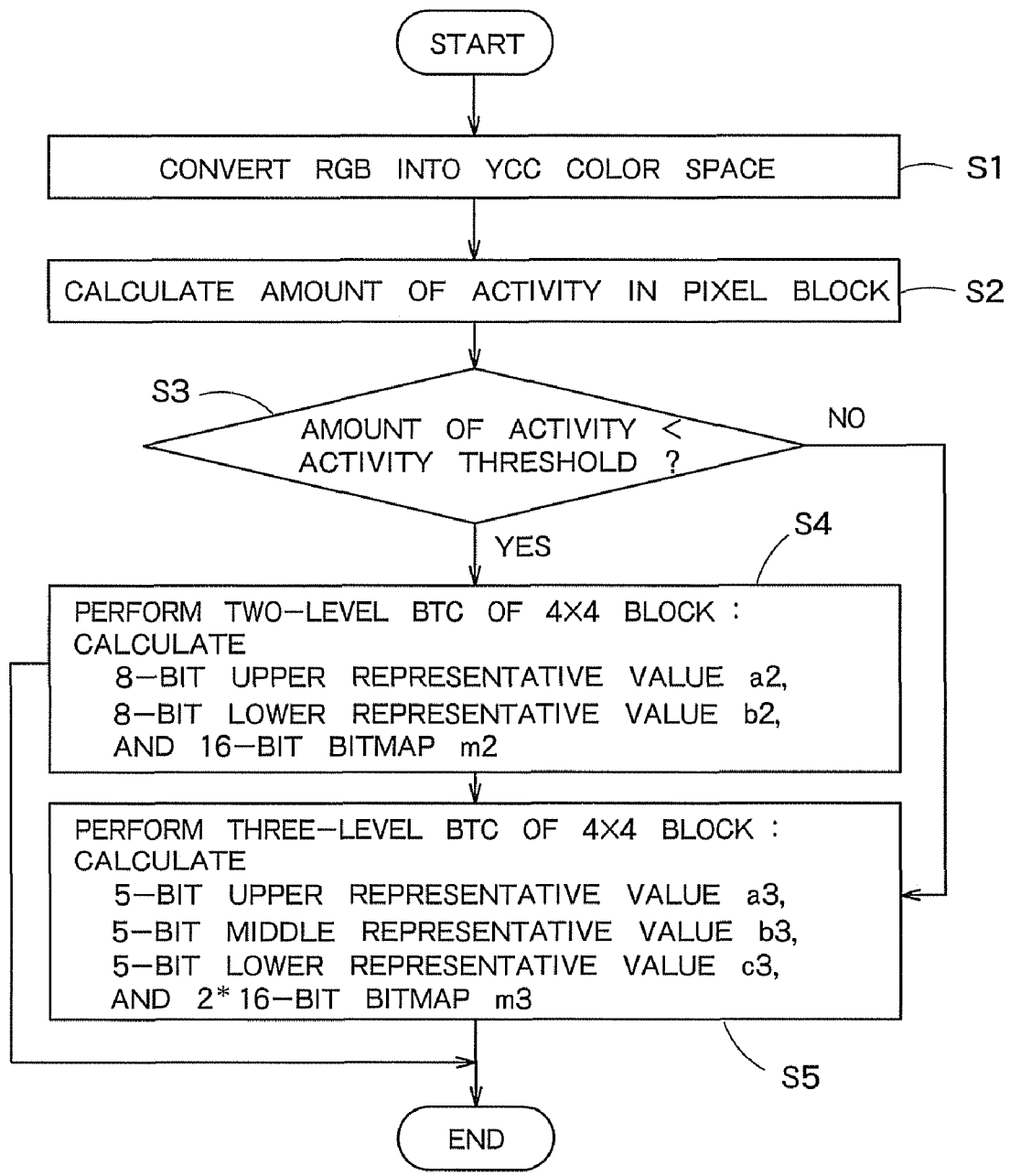
FIG. 2 is a flowchart showing processing operations of a YCC conversion circuit 6 and BTC encoding circuit 7 in a source driver 3.

An embodiment of the present invention will be described below with reference to the drawings.

FIG. 1 is a block diagram showing a schematic configuration of a liquid crystal display apparatus including an image processing apparatus according to an embodiment of the present invention. The image processing apparatus in FIG. 1 is intended to supply pixel data to a liquid crystal panel (LCD) 1 and equipped with a timing controller 2 and source driver 3. The timing controller 2 and source driver 3 are often implemented on separate ICs, but they may be implemented on a single IC. Also, the timing controller 2 and/or source driver 3 may be composed of multiple ICs.

A liquid crystal panel 1 has signal lines and scanning lines arranged in a matrix form, and a plurality of pixel switches which are provided corresponding to the respective cross points of the signal lines and the scanning lines.

The timing controller 2 has an RGB data transmitting circuit 4, where only transmitting circuit 4 is shown in the timing controller 2 because of simplification. The RGB data transmitting circuit 4 supplies RGB pixel data to source driver 3.

The source driver 3 has following circuits: an RGB data receiving circuit 5, YCC conversion circuit 6, BTC encoding circuit 7, frame memory 8, BTC decoding circuit 9, RGB conversion circuit 10, and LCD drive circuit 11.

The RGB data receiving circuit 5 receives pixel data transmitted by the RGB data transmitting circuit 4 in the timing controller 2. The YCC conversion circuit 6 converts RGB pixel data into luminance data and color-difference data. The BTC encoding circuit 7 compresses each pixel block of an image based on the luminance data and color-difference data produced by the YCC conversion circuit 6 and thereby generates encoded data. The encoded data generated is stored in the frame memory 8. For our image compression, we will adopt a BTC algorithm which converts the luminance and color difference data into bitmap and representative values for each pixel in a processing pixel block.

The BTC decoding circuit 9 decodes the encoded data stored in the frame memory 8 and thereby converts it into luminance data and color-difference data. The RGB conversion circuit 10 converts the luminance data and color-difference data into RGB pixel data. The LCD drive circuit 11 controls the supply of the generated RGB pixel data to various signal lines in the liquid crystal panel 1.

This embodiment is characterized by the following components: the BTC encoding circuit 7 in the source driver 3, frame memory 8, and BTC decoding circuit 9. Before describing configuration and operation of these circuits in detail, processing principles will be described below for this embodiment.

FIG. 2 is a flowchart showing processing operations of the YCC conversion circuit 6 and BTC encoding circuit 7 in the source driver 3. First, convert RGB data into luminance data and color-difference data YCC (Y denotes luminance data and color-difference data Cr and Cb will be abbreviated to CC) (Step S1). The reason for the conversion into YCC is to improve image quality to the tolerable degree of human vision. Since such conversion is a common practice, detailed conversion formulas will be omitted.

Color-difference data is statistically distributed in the positive and negative sides around the center 0. Thus, an appropriate conversion (known as modulo reduction) may adjust the data range so that pixel values will fall within the range of 0 to 255. Alternatively, hardware capable of processing negative data may be used. This eliminates the negative-to-positive conversion of the color-difference data. Such a technique is in common use, and thus detailed description thereof will be omitted. Steps S2 to S5 are carried out for each of luminance data and color-difference data.

Next, calculate an amount of activity for each pixel block consisting of multiple pixels (Step S2). This process checks the context of the pixel block to be processed when selecting one of BTC algorithm from two BTC algorithm options described later.

If image values in the pixel block to be processed change greatly, the image values themselves does not require accuracy. Suppose, for example, there is a pixel with a value of "0" adjacent to a pixel with a value of "255." Even if the value "255" changes to "245" as a result of compression, the difference between the two changes (two edges) "0 to 255" and "0 to 245" cannot be visually recognized.

On the other hand, even a small difference of "0" and "1" can be recognized for large areas where there is a collection of pixels rather than single pixel: for example, when there are an area containing 100 pixels with a pixel value of "0" and an area containing 100 pixels with a pixel value of "1."

In this way, the degree of human visual recognition changes according to changes in an image (a context of an image). Thus, such an amount of change in an image is referred to herein as an "amount of activity" and is used as a selection criterion for our BTC algorithm. The amount of activity will be described in detail later.

Next, determine whether the amount of activity in the pixel block is smaller than a predetermined threshold (Step S3). If the amount of activity is smaller, meaning that the pixel block to be processed is considered to be in a flat area, the BTC encoding circuit 7 selects a two-level BTC algorithm which can recognize a subtle difference. The two-level BTC algorithm represents 16 pixels of a 4×4 pixel block by the following approximation: the pixel block by 16 bits bitmap with an upper representative value a2 (consisting of 8 bits, having large value) and a lower representative value b2 (consisting of 8 bits, having small value).

On the other hand, if the amount of activity in the pixel block is equal to or larger than the predetermined threshold, it is considered that high accuracy is not required for pixel value, and thus the BTC encoding circuit 7 selects a three-level BTC algorithm which can achieve a high compression ratio and cope with abrupt changes in pixel values. The three-level BTC algorithm represents 16 pixels in a 4×4 pixel block by the following: the pixel block by 16 bits bitmap with an upper representative value a3 (consisting of 5 bits having large value), a middle representative value b3 (consisting of 5 bits having middle value), and a lower representative value c3 (consisting of 5 bits having small value).

In general, image compression algorithms are not limited to the two-level BTC algorithm and three-level BTC algorithm described above, and a compression algorithm may be selected by considering the tradeoff between the compression ratio and image quality. Also, pixel block size is not limited to 4×4 pixels and bit count of each pixel is not limited to 8 bits and the like.

Also, although BTC is classified into two types in FIG. 2, more than two types are possible: classification number is not limited to the number two. Image quality can be improved with increases in the number of BTC levels. This is because a larger number of representative values allow image data restored more faithfully. On the other hand, this increases the amount of data to be stored and decreases the compression ratio. More is not necessarily better.

The advantage of using the two-level BTC is that it can ensure 8-bit accuracy in a flat image naturally. Even if representative values are 8 bits each, bitmap information can be relatively reduced. This makes it possible to achieve high accuracy of 8 bits while maintaining the compression ratio at approximately 1/4.

Figure 3:
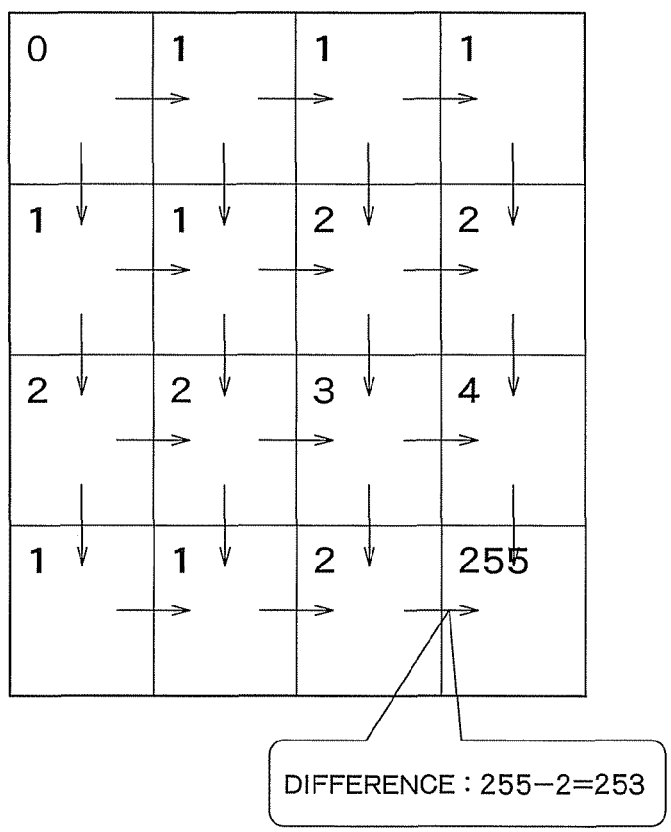
FIG. 3 is a diagram illustrating an amount of activity calculated in Step S2.

FIG. 3 is a diagram illustrating the amount of activity calculated in Step S2. In FIG. 3, the pixel value of each pixel in a 4×4 pixel block is shown numerically. An arrow indicates a pair of pixels whose difference is to be calculated. For example, "2" and "255" are the pixel values of the two adjacent pixels at the bottom right. The difference between the two pixels is "255−2=253."

Changes in an image may occur in horizontal and vertical directions, and thus there are horizontal and vertical arrows. There are 12 horizontal arrows and 12 vertical arrows in each pixel block. The pixel value difference is calculated for each arrow and the amount of activity is defined as the maximum value of the differences.

Instead of using the maximum value, the amount of activity can be defined by other measures: an average value of differences, any of various high-order statistical moments, a mode, a medium, or the like. In the following example, the maximum value is adopted as the amount of activity and its value is stored as a mode flag.

Figure 4:
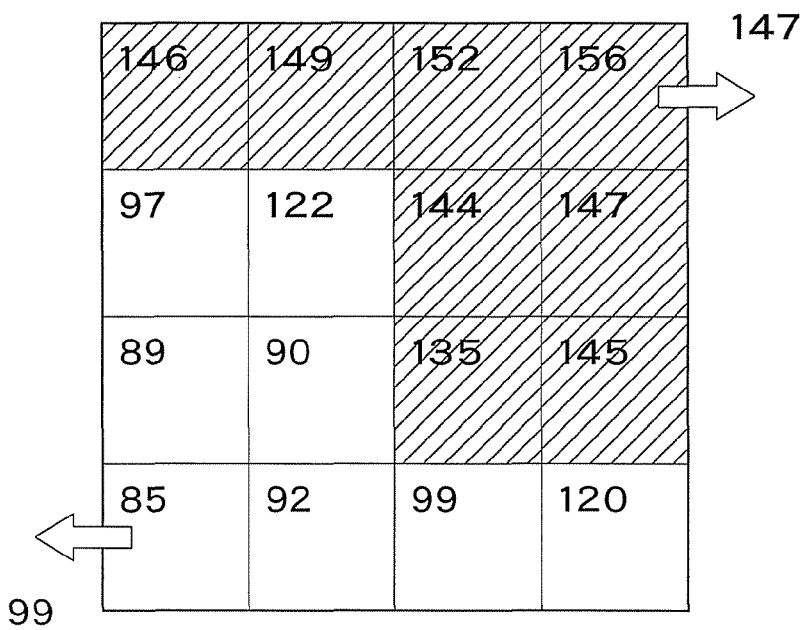
FIG. 4 is a diagram illustrating a two-level BTC algorithm.

FIG. 4 is a diagram illustrating a two-level BTC algorithm, where a number shows the pixel value for each pixel in a 4×4 pixel block. In this example, each pixel has an 8-bit pixel value (0 to 255). The average of the pixel values in the pixel block is "(146+149+152+156+97+122+144+147+89+90+135+145+85+92+99+120)/16=1968/16=123."

Using this average value as a threshold, the pixels are classified into two groups, i.e. pixels (a group of eight pixels including 146, 149, etc. is called an upper group) with a pixel value of larger than 123 and pixels (a group of eight pixels including 97, 122, etc. is called a lower group) with a pixel value of smaller than 123.

For compression, all the pixels in the lower group are intentionally approximated by their average value of 99 and all the pixels in the upper group are approximated by their average value of 147.

In this way, BTC algorithm compresses data by consolidating the 16 pixel values in a pixel block into two pixel values. Since the BTC described here uses two levels (the average 99 of the lower group and average 147 of the upper group), it is called "two-level BTC."

FIG. 5 is a diagram showing encoded data obtained by the two-level BTC algorithm for FIG. 4. As shown in the figure, the pixel values of the upper group are replaced by "1" and the pixel values of the lower group are replaced by "0" and 32-bit encoded data is finally obtained: 8-bit data a2 "01100011" which represents the pixel values of the lower group, 8-bit data b2 "10010011" which represents the pixel values of the upper group, and a bitmap m2 "1111001100110000" which arranges the pixel values in the pixel block in the order from left to right and from top to bottom.

Since each pixel is 8 bits wide, the data size is "16×8=128" bits for the original image, thus the image compression reduces the image size to "32/128=1/4." As the reduction works equally on the luminance data and color-difference data, the overall data size is reduced to "96/384=1/4."

The data encoded by the processing procedures described above is stored in the frame memory 8 shown in FIG. 1, and then decoded by the BTC decoding circuit 9 into the luminance data and color-difference data. FIG. 6 shows results of decoding the encoded data in FIG. 5. The BTC decoding circuit 9 converts bits "1" and "0" found in the bitmap m2 "1111001100110000" in FIG. 5 into "147" and "99," respectively.

Next, a three-level BTC algorithm will be described. In general, some techniques are known which decimates spatial data to improve the compression ratio. A decimation process called 420 will be described here, but another decimation process such as 422 may also be selectable.

Generally, statistically speaking, luminance data has more abrupt changes than color-difference data, and thus it is desirable for luminance data to maintain pixel values as it is in order to reconstruct abrupt data change faithfully. That is, the luminance data "Y" is not decimated.

Figure 7:
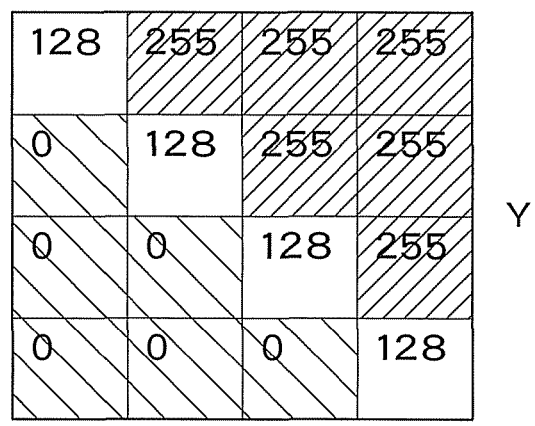
FIG. 7 is a diagram showing an example of luminance data "Y" in a pixel block.

FIG. 7 shows an example of luminance data "Y" in a pixel block. The three-level BTC algorithm consolidates luminance values of pixels into three representative luminance values: "0," "128," and "255."

Figure 8:
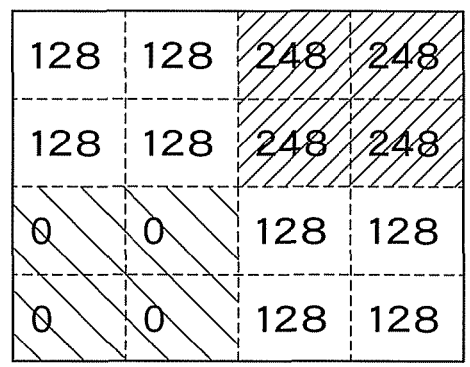
FIG. 8 is a diagram showing an example of color-difference data in a pixel block.

On the other hand, color-difference data (Cr and Cb) is spatially insensitive compared to luminance data. Thus, for example, even if four adjacent pixels are represented by a single pixel as shown in FIG. 8, the change is relatively inconspicuous. Suppose the pixel values of 2×2 pixels in a pixel block are "128," "255," "0" and "128" as shown at the top left of FIG. 7, the average of the four pixels is "(128+255+ 0+128)/4=128." Consequently, all the four pixels are treated as 128, as shown at the top left of FIG. 8. Thus, the entire pixel block can be treated as apparently consisting of 2×2 pixels, where 2×2 pixel is called as a sub-pixel block.

For the three-level BTC algorithm, two thresholds are prepared (a lower threshold which represents a small threshold and upper threshold which represents a large threshold). The following values are used here as an example: the lower threshold is "85," the upper threshold is "170," a lower representative value (data a3) which represents a smaller representative value is "0," a middle representative value (data b3) which represents a medium representative value is "128," and an upper representative value (data c3) which represents a larger representative value is "255."

FIG. 10 is a diagram showing an example of encoded data produced by a three-level BTC algorithm. It shows encoded data which corresponds to the luminance data "Y" in FIG. 7. The representative value which takes "0" is converted into "0," the representative value which takes "128" is converted into "1," and the representative value which takes "255" is converted into "2."

The encoded data consists of data a3 which represents the lower representative value, data b3 which represents the middle representative value, data c3 which represents the upper representative value, and 16-bit bitmap data m3 which represents the luminance values of the pixels in the pixel block.

Whereas the two-level BTC algorithm described above has the data a2 and b2 as 8-bit data, the three-level BTC algorithm has the data a3, b3, and c3 as 6-bit data to increase the compression ratio. For example, the data a3 of the lower representative value is expressed as "000000" omitting the lower 2 bits. Similarly, the data b3 of the middle representative value is expressed as "010000" and the data c3 of the upper representative value is expressed as "111111," omitting the lower 2 bits.

Even though encoded data is generated omitting the lower 2 bits, the BTC decoding circuit 9 generates luminance data and color-difference data by appending "00" as lower 2 bits for a decoding process.

The bitmap data m3 in the encoded data of FIG. 10 is expressed as a ternary value "1222012200120001." Thus, actually, each digit in the ternary value is represented by 2 bits by converting "0" into "00," "1" into "01," and "2" into "10." Consequently, "2×16=32" bits are needed for the bitmap data m3.

After all, "6+6+6+32=50" bits are needed for the entire encoded data. In addition, by reducing the amount of the bitmap data m3 from 32 bits (the above 2 bit has capability for 4 levels, so it is extra-capability for 3 levels), it is possible to reduce the number of bits from 50 bits.

FIG. 11 is a diagram showing an example of color-difference data coded by the three-level BTC algorithm. The encoded data in FIG. 11 corresponds to the color-difference data in FIGS. 8 and 9. In FIG. 11, the lower representative value (data a3), middle representative value (data b3), and upper representative value (data c3) are each represented by 5 bits. By reducing the bit count of data a3, b3, and c3 in this way, it is possible to increase the compression ratio although the accuracy of the color-difference data is reduced.

Figure 9:
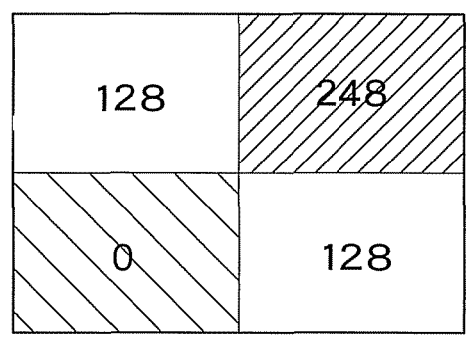
FIG. 9 is a diagram showing an example in which the data in FIG. 8 is regarded to be 2×2 pixel data in appearance.

As described with reference to FIGS. 8 and 9, the color-difference data of 2×2 pixels are equally decimated. So, the bitmap data m3 containing the color-difference data is reduced to only 4 digits "1201." And each digit is represented by 2 bits. Thus, the total bit count of the encoded data is "5+5+5+2×4=23" bits.

FIG. 12 is a diagram showing all the encoded data obtained from the luminance data shown in FIG. 7 and the color-difference data shown in FIG. 8. As shown in the figure, the BTC encoding circuit 7 obtains one luminance data and two color-difference data. The total bit count of these data is "50+23×2=96."

Before encoding, each of the 16 pixels in the pixel block has luminance data and two color-difference data, each of which consists of 8 bits. So, the total bit count is "16×3× 8=384, and thus the compression ratio is "96/384=1/4."

The reasons why the use of three levels does not deteriorate the compression ratio are (1) bit count reduction and (2) decimation as mentioned above. As described with reference to FIG. 2, the three-level BTC algorithm is used for image compression, when low accuracy practically does not pose a problem because of a large amount of activity in the pixel block. Thus, the bit count reduction and decimation process do not cause visible degradation in image quality. In this way, image data is compressed efficiently.

Figure 13:
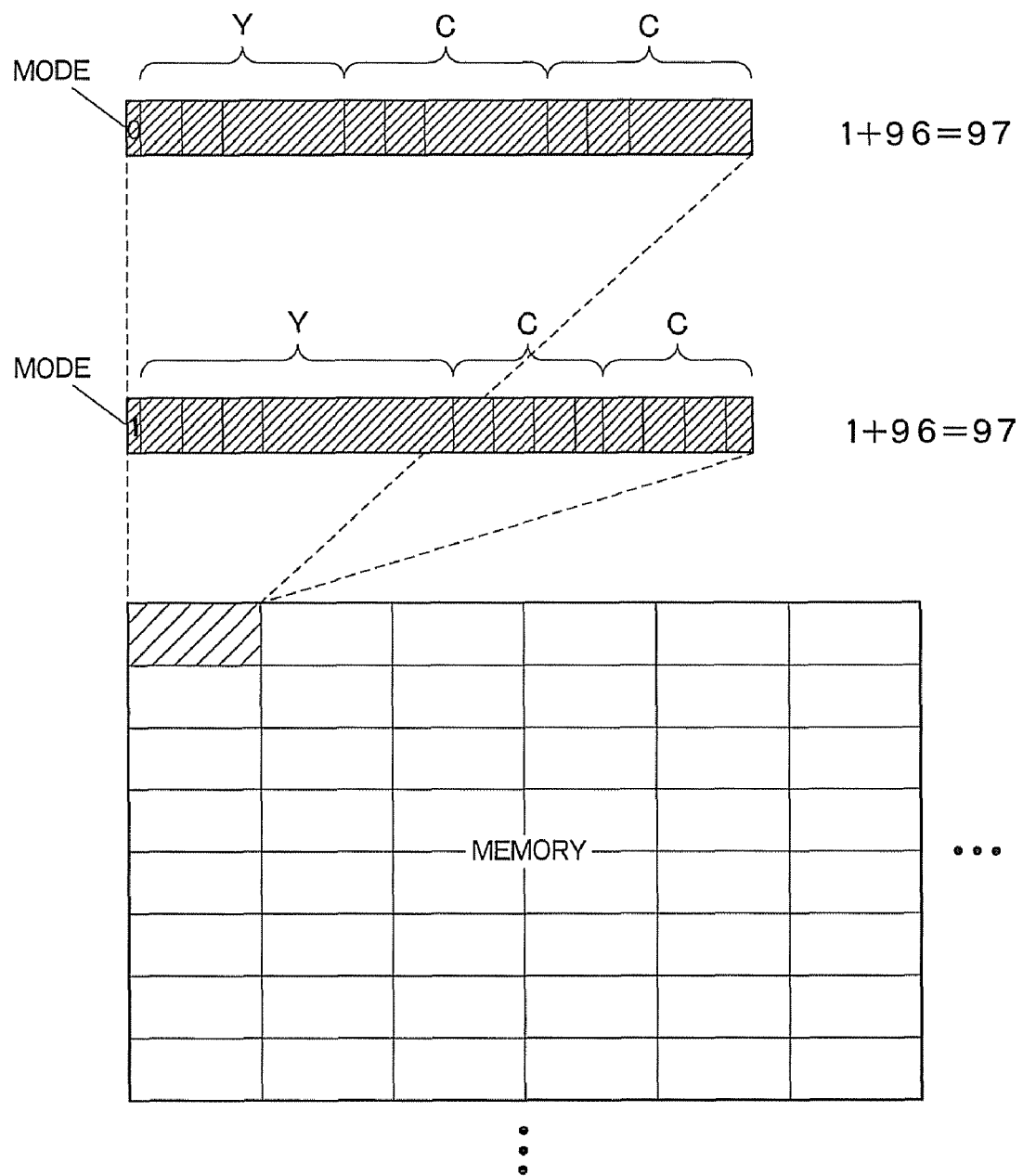
FIG. 13 is a diagram illustrating data format of encoded data produced by the BTC encoding circuit 7 and structure of a frame memory 8.

FIG. 13 is a diagram illustrating data format of encoded data produced by the BTC encoding circuit 7 and structure of a frame memory 8. As shown in the figure, the encoded data consists of encoded data corresponding to the luminance data "Y" and encoded data corresponding to the two types of color-difference data Cr and Cb, which are arranged in sequence and preceded by a first bit containing a mode flag which indicates whether a two-level BTC algorithm or three-level BTC algorithm is used. For example, when the mode flag is "0," it indicates data encoded by a two-level BTC algorithm, and when the mode flag is "1," it indicates data encoded by a three-level BTC algorithm. An example of the former case is suitable for a natural image and an example of the latter case is suitable for a PC image.

The frame memory 8 easily performs random access in pixel block-wise manner, because the frame memory stores encoded data by processing 4×4 pixel block simultaneously.

In the example described with reference to FIG. 13, a common mode flag is used for the luminance data and color-difference data for the same pixel block, but individual mode flags which give independent flag values may be used for the luminance data and color-difference data. When using more than two BTC algorithms, mode flag need more than 2 bit width.

FIG. 14 is a diagram schematically showing rough sketch of image data compression to 1/4 by the BTC encoding circuit 7. The original image data which consists of "16×3×8=384" bits per processing image block is compressed finally to 96 bits. As a mode flag of 1 bit is appended, the total bit count is 97 bits. This means a compression ratio of "97/384=approximately 1/4."

FIG. 15 is a flowchart showing an example of processing procedures performed by the BTC decoding circuit 9 in FIG. 1. First, the BTC decoding circuit 9 reads the mode flag (see FIG. 13) which is the first bit of the encoded data (Step S11). Then the BTC decoding circuit 9 determines whether the mode flag is "0," meaning that the data has been coded by a two-level BTC algorithm (Step S12). If the mode flag is "0," the BTC decoding circuit 9 decodes the data using the two-level BTC algorithm (Step S13). If the mode flag is "1," the BTC decoding circuit 9 decodes the data using a three-level BTC algorithm (Step S14).

After step S13 or S14 is finished, the BTC decoding circuit 9 converts the luminance and color-difference data YCC into RGB pixel data (Step S15).

FIG. 16 is a diagram illustrating the process of decoding data encoded by a two-level BTC algorithm. The encoded data includes a 1-bit mode flag, 8-bit data a2 which represents a lower representative value, 8-bit data b2 which represents an upper representative value and bitmap data m2 which represents luminance data of the pixels in the pixel block. The bitmap data m2 is followed by bitmap data which represents color-difference data, which, however, is omitted in FIG. 16.

In FIG. 16, the mode flag is "0," meaning that the data has been coded by the two-level BTC algorithm. Thus, there are only two representative values. The values of data a2 and b2 show that the lower representative value is "99" and the upper representative value is "147."

The BTC decoding circuit 9 replaces "0" in the bitmap data with "99," and "1" with "147." Consequently, luminance data of the pixel block is generated as shown at the bottom of FIG. 16.

If the same BTC algorithm is used for the luminance data and color-difference data of the pixel block, only one mode flag is needed for the pixel block. However, if individual mode flags are supposed for the luminance data and color-difference data, individual mode flag must be provided for each of the luminance data and color-difference data. Suppose the case, for this example, when luminance in a pixel block changes greatly, but color does not change so much. In that case, image quality can be improved using a two-level BTC algorithm for color-difference data.

FIGS. 17 and 18 are diagrams illustrating a decoding process of data encoded by the three-level BTC algorithm. FIG. 17 shows a decoding process of luminance data while FIG. 18 shows a decoding process of color-difference data.

As shown in FIG. 17, the encoded luminance data includes a 1-bit mode flag, 6-bit data a3 which represents a lower representative value, 6-bit data b3 which represents a middle representative value, 6-bit data c3 which represents an upper representative value and bitmap data m3 which represents luminance data of the pixels in the pixel block.

The bitmap data m3 is followed by bitmap data of encoded color-difference data Cr and Cb shown in FIG. 18. The encoded color-difference data includes 5-bit data a4 which represents a lower representative value of Cr, 5-bit data b4 which represents a middle representative value of Cr, 5-bit data c4 which represents an upper representative value of Cr, bitmap data m4 which represents Cr of the pixels in the pixel block, 5-bit data a5 which represents a lower representative value of Cb, 5-bit data b5 which represents a middle representative value of Cb, and 5-bit data c5 which represents an upper representative value of Cb.

The encoded data of Cb is omitted in FIG. 18 for the sake of simplicity. In addition, the data structure of Cr is the same as Cb.

The encoded data in FIGS. 17 and 18 contains a mode flag "1," meaning that a three-level BTC algorithm has been used for encoding. Although the mode flag is shared by the luminance data "Y" and color-difference data Cr and Cb, individual mode flags can be used if different BTC algorithms are used for luminance data "Y" and color-difference data Cr and Cb.

To decode the luminance data "Y," "0" in the bitmap data is converted into "0" of the lower representative value a3, "1" is converted into "128" of the middle representative value b3 and "2" is converted into "252" of the upper representative value c3 as shown in FIG. 17.

To decode the color-difference data Cr, "0" in the bitmap data is converted into "0" of the lower representative value a4, "1" is converted into "128" of the middle representative value b4 and "2" is converted into "248" of the upper representative value c4 as shown in FIG. 18. The color-difference data Cb is decoded using the same procedures as the color-difference data Cr.

The three-level BTC algorithm described above may cause image quality degradation if the middle representative value is not determined appropriately. FIGS. 19A and 19B are diagrams illustrating an example of how image quality changes with the middle representative value. FIG. 19A shows an example in which a character string "Graph Area" (the letter is shown in Japanese katakana) is displayed in black on a gray background.

In this case, it seems that two levels are sufficient for encoding. Actually, however, BTC processing 4×4 pixel blocks may treat image object fragmentally, in other word, pixel blocks may contain part of the gray background. In that case, three levels including gray is needed. In order to get the middle representative value of gray for 3-level data, you may use a threshold that simply estimate gray value by equi-spaced interpolation based on black and white pixel values. This threshold may result in a wrong color level which is very different from actual gray, causing visible artifacts such as shown in FIG. 19B.

In a natural image, such errors are so local and relatively inconspicuous. However, in the case of an image produced artificially, such as a PC image (screen image and paint image), artifacts are visible as a relatively large area, resulting in eye-grabbing artifact degradation in image quality.

Figure 20:
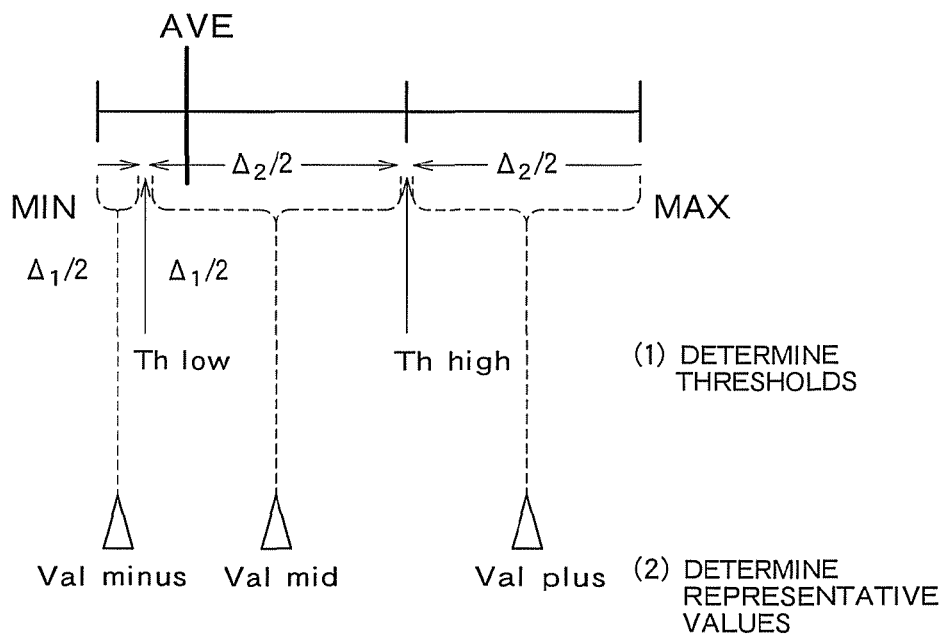
FIG. 20 is a diagram illustrating a method, newly proposed in this embodiment, for setting a middle representative value.

FIG. 20 is a diagram illustrating a method, newly proposed in this embodiment, for setting a middle representative value. This embodiment intends to tune the middle representative value which is a gray level used by a three-level BTC algorithm. If the middle representative value is interpolated simply based on a range from minimum to maximum pixel value without considering the pixel value distribution in the actual image, then the middle representative value frequently deviates from the actual image after all. Thus, in order to set the middle representative value by considering the pixel value distribution in the actual image, this embodiment takes an average ("AVE" in FIG. 20) excluding pixel data of the maximum and minimum pixel values which correspond to white and black. This trimming by the exclusion is a key for our invention. Since the maximum and minimum pixel values are excluded, it is possible to calculate the gray level more accurately without being affected by the number of pixels with the maximum and minimum pixel values.

Two thresholds "Th_high" and "Th_low" are respectively given as the average values of the following values: (1) the maximum or minimum pixel values and (2) the average value "AVE" calculated by excluding the maximum and minimum pixel values. Then, the two thresholds define three ranges, representative values "Val_plus," "Val_mid," and "Val_minus" are calculated as average for the three ranges.

If there are only three levels in a 4×4 processing pixel block, the above method reconstruct original data values directly for representative values. This improves accuracy.

Figure 21A:
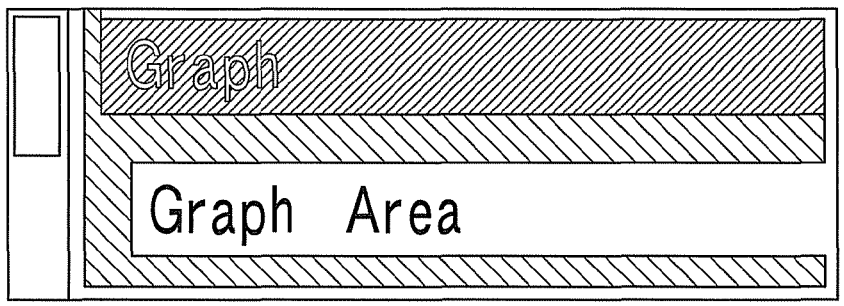
FIGS. 21A and 21B are diagrams illustrating an example of improved image quality compared to FIG. 19.
Figure 21B:
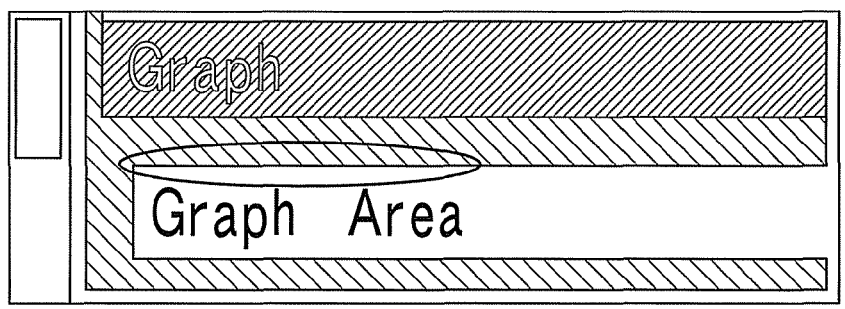

If data is encoded by setting the middle representative value using the technique described above with reference to FIG. 20, there is no visible gray artifact around the character string as shown in FIG. 21B when the encoded data is decoded, resulting in obvious improvements compared to FIG. 19.

Additionally, when encoding a natural image such as a photograph, if average values are calculated including the maximum and minimum pixel values; better image quality can be obtained statistically. Thus, in the case of natural images, it is not desirable to exclude the maximum and minimum pixel values, on the contrary. This embodiment is suitable for encoding natural images such as PC images rather than natural images.

The inventors believe that it is desirable to use mainly a two-level BTC algorithm to encode natural images. In the case of natural images, the "amount of activity" defined herein is small statistically in most cases. Although there is a faint possibility that natural images will be processed by three-level BTC, this is a very exceptional case. Also, in natural images, changes are difficult to recognize because they are buried in its surrounding image context. Thus, statistically speaking, the two-level BTC algorithm deceives human vision sufficiently but not completely. In addition, PC images often have 6-bit accuracy. Therefore, even if the compression ratio is increased by using a 6-bit Y signal and 5-bit color-difference signal, there is small degradation in image quality. In this regard, it is understandable that three-level BTC can reduce bit length of representative values.

Next, processing procedures will be described for in order to calculate two thresholds "Th_high" and "Th_low" and three representative values "Val_plus," "Val_mid" and "Val_mimus", which are generated by the technique described with reference to FIG. 20. FIG. 22 is a flowchart illustrating processing procedures for calculating thresholds and representative values used for a three-level BTC algorithm.

First, the maximum pixel value "MAX" and minimum pixel value "MIN" are calculated for the pixels in the pixel block (Step S21). Next, as described with reference to FIG. 20, two thresholds "Th_high" and "Th_low" are calculated excluding the maximum and minimum pixel values (Step S22), where Th_low<Th_high.

Next, three representative values "V_plus," "V_mid," and "V_mimus" are calculated finally using the thresholds "Th_high" and "Th_low" (Step S23). Details will be described with reference to FIG. 23.

Let "x" denote the pixel value of each pixel in the pixel block. In Step S24, the pixel value "x" is classified by the following comparisons with the two thresholds "Th_high" and "Th_low." If the value "x" is larger than Th_high, V_plus is selected as a representative value (Step S25). If the value "x" is between "Th_low" and "Th_high," "V_mid" is selected as a representative value (Step S26). Finally, if the value "x" is smaller than "Th_low," "V_mimus" is selected as a representative value (Step S27). In this way, the representative value is determined.

FIG. 23 is a flowchart showing processing procedures for calculating the thresholds in Step S22 of FIG. 22. First, initialize variables "SUM" and "CNT" to "0" (Step S31). Next, perform the MAX-MIN check: whether the pixel value of the pixel to be processed is the maximum pixel value "MAX" or minimum pixel value "MIN" (Step S32). If the answer is NO, add the pixel value to the variable "SUM" and increment the variable "CNT" by "1" (Step S33).

Next, check the loop-end condition: whether all the pixels in the pixel block have been processed (Step S34). If there remains any pixel to be processed, return to the head of the loop (Step S32). If all the pixels have been processed, end the loop and calculate the average "AVE=SUM/CNT" of the pixel values (Step S35).

Next, calculate the following values: difference $\Delta1$ between the average value "AVE" and minimum pixel value "MIN" as well as difference $\Delta2$ between the average value "AVE" and maximum pixel value "MAX" (Step S36). In this calculation, the differences $\Delta1$, $\Delta2$ are given as Eq. (1) below.

$$\Delta1 = AVE - \text{MIN}, \Delta2 = \text{MAX} - AVE \qquad (1)$$

Next, calculate the threshold "Th_high" using Eq. (2) below (Step S37).

$$Th\_\text{high} = \text{MAX} - \Delta2/2 \qquad (2)$$

Next, calculate the threshold "Th_low" using Eq. (3) below (Step S38).

$$Th\_\text{low} = \text{MIN} - \Delta2/2 \qquad (3)$$

In this way, the two thresholds "Th_high" and "Th_low" are calculated.

Supplementarily speaking on the calculation of the average value excluding the maximum pixel value "MAX" and minimum pixel value "MIN," you may use new values "MAX–$\Delta3$" and "MIN+$\Delta4$" instead of "MAX" and "MIN" in the equations above. The new values are defined by considering a certain margin $\Delta3$ or $\Delta4$ (>0). In that case, use the predicate GE (greater than or equal to) or the predicate LE (less than or equal to) instead of the predicate EQ (an equal sign) (see FIG. 38 later).

FIG. 24 is a flowchart showing processing procedures for determining representative values. As pixel values are classified into three ranges, variables "Sum_high," "Sum_mid," and "Sum_low" are provided to calculate the sum total of pixels in each range, variables "Cnt_high," "Cnt_mid" and "Cnt_low" are provided to calculate the number of pixels in each range. Initialize these variables to "0" (Step S41).

Next, processes of Steps S42 to S46 are performed for each pixel in the pixel block. In Step S42, check whether the pixel value "X" is equal to or larger than the threshold "Th_high." If the answer is YES, add the pixel value to the variable "Sum_high" and increment the variable "Cnt_high" by "1" (Step S43).

If the answer is NO in Step S42, go to Step S44 and check whether the pixel value X is equal to or larger than the threshold Th_low. If the answer is YES, add the pixel value to the variable "Sum_mid" and increment the variable "Cnt_mid" by "1" (Step S45).

If the answer is NO in Step S44, go to Step S46, then add the pixel value to the variable "Sum_low" and increment the variable "Cnt_low" by "1" (Step S46).

After performing the processes of Steps S42 to S46 for all the pixels in the pixel block, calculate the representative values "V_plus," "V_mid" and "V_mimus" based on the variables "Sum_high," "Sum_mid," "Sum_low," "Cnt_high," "Cnt_mid," and "Cnt_low" (Step S47).

FIG. 25 is a table showing correspondence between variables "Cnt_high," "Cnt_mid," and "Cnt_low" and representative values "V_plus," "V_mid," and "V_minus" used in Step S47 in FIG. 24. In FIG. 25 the values of the representative values "V_plus," "V_mid," and "V_minus" are indicated as "0" when they are "0," and indicated as "1" when they are not "0."

For example, in the first row, the variables "Cnt_high," "Cnt_mid," and "Cnt_low" are all "0," meaning that the processes in FIG. 24 have not been performed. In the case of such logically indefinite values, practically for hardware implementation, you should assign some convenient values (which will not cause inconsistency) so that implemented hardware will not produce indefinite values inadvertently.

As can be seen from FIG. 25, representative values at three levels are not always available as definite. When any of the variables "Cnt_high," "Cnt_mid," and "Cnt_low" is "0," it is appropriate to reduce the number of levels. When the variables "Cnt_high," "Cnt_mid," and "Cnt_low" are all "0," since no representative value is assigned, there is no particular problem whatever value the pixels may take because that this case is impossible to occur.

Although selection between a two-level BTC algorithm and three-level BTC algorithm has been described, this embodiment allows expansion to N-level (e.g., four-level) BTC algorithms. In that case, it is desirable that the amount of data approaches to a fixed target value because their max should be allocated as hardware memory.

In the case of a four-level algorithm, for example, the following configuration is conceivable. Regarding luminance Y, four 4-bit representative values use 16 bits (4 bits×4 representative values=16 bits), and bitmap data uses 32 bits (2 bits×16 pixels=32 bits). Regarding two types of color-difference data (Cr and Cb), four 4-bit representative values use 32 bits (4 bits×4 representative values×2=32 bits), and bitmap data uses 16 bits (2 bits×4 pixels×2=16 bits).

Thus, the four-level algorithm handles "16+32+32+16=96 bits" in total. Then two bits are added as mode flag bit to select algorithm, the total is 98 bits. Even in this case, a compression ratio of approximately 1/4 is maintained. This is merely an example, and there isn't any restriction for the number of levels as long as processing operations are performed based on the principle described with reference to FIG. 20.

FIG. 26 is a table showing compression capability of the frame memory 8. The compression capability is estimated based on the assumption that a QVGA size image is enlarged to a VGA size image. The first column COL1 shows memory compression capability, more specifically compression capability for 8-bit images. In the case of 6-bit images, the values must be multiplied by 6/8 for conversion. In addition, the compression capability is defined as (input image size)/(compressed output image size). The inverse of this, i.e., (output image size)/(input image size), is compression ratio.

The second column COL2 shows the compression capability of a driver 1 which handles 6-bit QVGA images, where the driver 1 includes a QVGA-RAM. The third column COL3 shows the compression capability of a driver 2 which handles 6-bit VGA images, where the driver 2 with "through-mode" functionality includes a QVGA-size RAM. The term "through-mode" means that image is transferred directly to LCD driver circuit with bypassing RAM. The fourth column COL4 shows the compression capability of a driver 3 which handles 8-bit QVGA images, where the driver 3 includes a QVGA-RAM.

FIG. 26 shows the changed compression capability for the drivers 1 to 3 when image size is changed from QVGA to VGA. The driver 1 will be described below as an example, and the same procedures calculate the compression capability for the drivers 2 and 3.

In the second to the fifth rows, IC chip areas required are calculated for various compression capacities. The first row shows base data for the calculations. Relative ratios are calculated assuming that the current chip area is 1.0. The relative ratio of the frame memory 8 in the IC is 0.32. Thus, when the image size is increased from QVGA to VGA, the memory size is increased four times, meaning "0.32×4=1.28." Assuming that the size of the fix part "0.68" other than the frame memory 8 is unchanged, the IC chip area is estimated "0.68+1.2=1.96." This is the case when the image is not compressed, thus the required area almost doubles. This is undesirable in terms of costs.

Next, we will explain the case that the image is compressed at compression capability 4. FIG. 26 shows compression capabilities for 8-bit images. The frame memory 8 increased 1.28 times is compressed to "1.28/4/0.75," resulting in an increase of 1.11 times.

The above calculations do not count an added circuit for compression. This is because the frame memory 8 is so large that the added circuit for compression (including both encoding and decoding) is negligible in a relative sense. Actually, these circuits add small area to the IC chip: this cause no serious error problem in estimation. The table FIG. 26 shows the calculation results by the calculation procedure described above. For the driver 3, since drive 3 has 8-bit accuracy, the memory size can be divided directly by the memory compression capability.

On the other hand, FIG. 27 is a table showing compression capability when a QVGA size image is compressed directly. In this case, 20% to 36% reductions are possible (the row which corresponds to a memory compression capability 4).

As can be seen by comparing FIG. 26 and FIG. 27, higher compression capability can be achieved for VGA size images, but sufficiently high compression capability of 20% to 30% can be achieved even for QVGA size images. For example, an FRC technique which converts 6 bits into 4 bits corresponds to compression capability 2, and thus achieves a compression capability of only 10% to 25%. Thus FRC is inferior to ours.

Thus, FIG. 26 and FIG. 27 show that this embodiment can achieve sufficiently higher compression capability than conventional techniques.

A compression ratio of 1/4 (compression capability) has been mainly described above, and FIG. 26 and FIG. 27 show calculations for other compression ratios (compression capacities). Thus, this embodiment is not limited to a compression ratio of 1/4: that is, it allows other BTC combinations as options which provide other compression ratios.

Although the example of FIG. 1 has described the case that the BTC encoding circuit 7 is installed in the source driver 3, the BTC encoding circuit 7 may be installed in the timing controller 2. FIG. 28 is a variation of FIG. 1 for a schematic configuration of an image processing circuit. In the image processing circuit in FIG. 28, the timing controller 2 and source driver 3 have different internal configurations from the FIG. 1.

The timing controller 2 in FIG. 28 has a YCC conversion circuit 6, BTC encoding circuit 7, and BTC data transmitting circuit. On the other hand, the source driver 3 in FIG. 28 has a BTC data receiving circuit 5, frame memory 8, BTC decoding circuit 9, RGB conversion circuit 10, and LCD drive circuit 11.

FIG. 1 and FIG. 28 differ in the format of transmitted data between the timing controller 2 and source driver 3. In FIG. 28, encoded data produced by the timing controller 2 is transmitted to the source driver 3. The encoded data, which is obtained by compressing original image data, reduces the data size for the transmitting between the timing controller 2 and source driver 3. This provides EMI reduction functionality. This transmit of encoded data also decrease transmission frequency by avoiding the higher operation speed to transmit and receive for circuits of the timing controller 2 and source driver 3, thus FIG. 28 configuration finally gives the reduction of circuit size by slow operation.

The source driver 3 needs to perform decoding and does not need to perform encoding. Thus, the configuration of the source driver 3 can be simplified drastically compared to FIG.

1. Although the configuration of the source driver 3 is not compatible with the configuration of conventional source drivers 3, its major advantage is that it allows the chance to optimize the transmitting and receiving circuits of the timing controller 2 and source driver 3. Thus, the configuration is a very promising candidate to be adopted for a next generation source driver 3.

In order to transmit image data or encoded data between the timing controller 2 and source driver 3, a 4H memory 21 may be installed on the timing controller 2 and 16 sets of registers may be installed on the source driver 3.

A small liquid crystal panel 1 used for a cell phone or the like is driven by a single source driver 3, on the other hands, a large liquid crystal panel 1 of a PC, TV, or the like is sometimes driven by multiple source drivers 3. In such a case, there is no need to install a 4H memory on each source driver 3 in the configuration shown in FIG. 29. This avoids the needless memory installation of each source driver for the image processing apparatus as a whole.

FIG. 29 shows only an example, and the circuits assigned to the timing controller 2 and source driver 3 may be changed as required.

FIG. 30 is a diagram showing an internal configuration of the BTC encoding circuit 7 in FIG. 1. The process of storing image data sent from a host in the frame memory 8 will be described with reference to FIG. 30.

The BTC encoding circuit 7 has a 4H memory 21, address generating circuit 22, BTC input section 23, BTC encoding processor 24, BTC output section 25, FM (Frame Memory) row address generator 26, and FM column address generator 27.

The 4H memory 21 temporarily stores four rows of luminance data and color-difference data generated by the YCC conversion circuit 6. The address generating circuit 22 has following address generators: an SP generator 31 which generates start page information, EP generator 32 which generates end page information, SC generator 33 which generates start column information, and EC generator 34 which generates end column information.

The SP generator 31 generates a starting row address. The EP generator 32 generates an end row address diagonally opposite the starting row address. The SC generator 33 generates a starting column address. The EC generator 34 generates an end column address diagonally opposite the starting column address.

For simplicity of explanation, assume that the SC, EC, SP, and EP are compatible with a 4×4 block. That is, assume that SC=4×(integer 1), that EC=4×(integer 2)+3, that SP=4×(integer 3), and that EP=4×(integer 4)+3.

The frame memory 8 stores encoded data by maintaining the relative positional arrangement of 4×4 pixel blocks. Let the data in the 4×4 pixel block be reduced to a fixed size "SIZE" (e.g., 97 bits, in the above example) as a result of BTC compression. Let us name this size "BTC cell size".

The parameters MSC, MEC, MSP, and MEP specify a range of the image which gives the column address CA and row address RA of the frame memory 8: MSC is the start column of the frame memory 8, MEC is the end column of the frame memory 8, MSP is the start page of the frame memory 8, and MEP is the end page of the frame memory 8.

Assume that a bit string of encoded data stored in the frame memory 8 is placed in a single row. Although it is possible to allocate the encoded data over multiple rows, for the sake of simplicity and without loss of generality, assume that the encoded data is placed in a single row.

Here, MSC=SIZE×(integer 1), MEC=SIZE×(integer 2), MSP=(integer 3), and MEP=(integer 4). Thus, in order to write encoded data (compressed data) of the size "SIZE" as column addresses of the frame memory 8, the FM column address generator 27 needs to generate addresses of MSC, MS C+1, . . . , 2×MSC, 2×MSC+1, . . . , (integer 2−integer 1)×MSC, (integer 2−integer 1)×MSC, . . . , (integer 2)×MSC−1 in sequence.

Assume that pixels are written simultaneously in blocks of 4×4 because this can be done without loss of generality. Addresses are generated on a "SIZE" by "SIZE" basis. That is, MSC, MSC+1, . . . MSC+SIZE−1 are generated first. Next, 2×MSC, 2×MSC+1, . . . 2×MSC+SIZE−1 are generated, and so on. Similarly, the FM row address generator 26 generates (integer 3), (integer 3)+1, . . . (integer 4) in sequence.

The FM column address generator 27 always selects encoded data in amounts equal to "SIZE." Thus, there is no need to decode all addresses as column select signals. The column select signals corresponding to N×MSC only need to be decoded and the other column select signals remains its signals as they are.

Since the size of FM row addresses is fixed at 4×4 pixels, it is obvious that one row select signal is sufficient. It should be noted additionally that this also applies to more general cases in which the configuration of the frame memory 8 is changed.

The amounts of data written and read are reduced to approximately 1/4 by compression of encoding. This means, in order to write or read the original uncompressed data to/from the frame memory 8 in the same time, read or write operation must be four times faster or a four times larger width of I/O interface must be prepared.

Thus, as a result, the data compression reduces access speed to the frame memory 8 or decrease the I/O width.

For example, suppose that one chooses to reduce the access speed to the frame memory 8. In this case, since access time for a VGA memory is same as the required time for a conventional QVGA memory, operational speed of control of the frame memory 8 is as fast as conventional design. In this way, data compression also has the effect of improving the performance of the memory system itself.

The BTC input section 23 in FIG. 30 reads data out from the 4H memory 21 in the operation: one pixel block at a time. Then it supplies the data to the BTC encoding processor 24 by the operation: one pixel block at a time.

The BTC encoding processor 24, which carries out Steps S2 to S5 in FIG. 2, has an activity amount detector 41, two-level BTC processor (BTC-val2) 42, three-level BTC processor (BTC-val3) 43, selector 44. The selector 44 selects one from the following encoded data: encoded data generated by the two-level BTC processor 42 and encoded data generated by the three-level BTC processor 43.

The activity amount detector 41 detects the amount of activity in the pixel block to be processed, compares the detected amount of activity with a predetermined threshold, and outputs a signal which indicates a result of the comparison.

The two-level BTC processor 42 generates encoded data of each pixel block using a two-level BTC algorithm. The three-level BTC processor 43 generates encoded data of each pixel block using a three-level BTC algorithm. The selector 44 selects the encoded data generated by the two-level BTC processor 42 or the three-level BTC processor 43 based on the context: whether or not the amount of activity detected by the activity amount detector 41 exceeds the predetermined threshold.

The BTC output section 25 temporarily stores the encoded data selected by the selector 44 of the BTC encoding processor 24. Then, the encoded data is stored in the frame memory 8. A storage location in the frame memory 8 is specified using the row address generated by the FM row address generator 26 and column address generated by the FM column address generating circuit 22.

Next, treatment for rotation will be described in order to display a rotated image. While a TV screen is horizontally-wide, a cell phone screen is vertically-wide. Thus, when you want a horizontally-wide TV screen image displayed on a cell phone, it is necessary to rotate the image 90 degrees from horizontal to vertical on the cell phone.

When image compression is not performed, the image data can be stored in the frame memory 8 as usual by accessing generated column addresses and row addresses in sequence, for example, from bottom left to top right.

However, according to this embodiment, since image data is compressed in pixel block-wise operation, for the case that compressed data is rotated image, rotation data is not well reflected in data addressing. This causes a problem.

Thus, according to this embodiment, it is necessary to maintain consistency between compressed data and original data using image rotation information.

Figure 31:
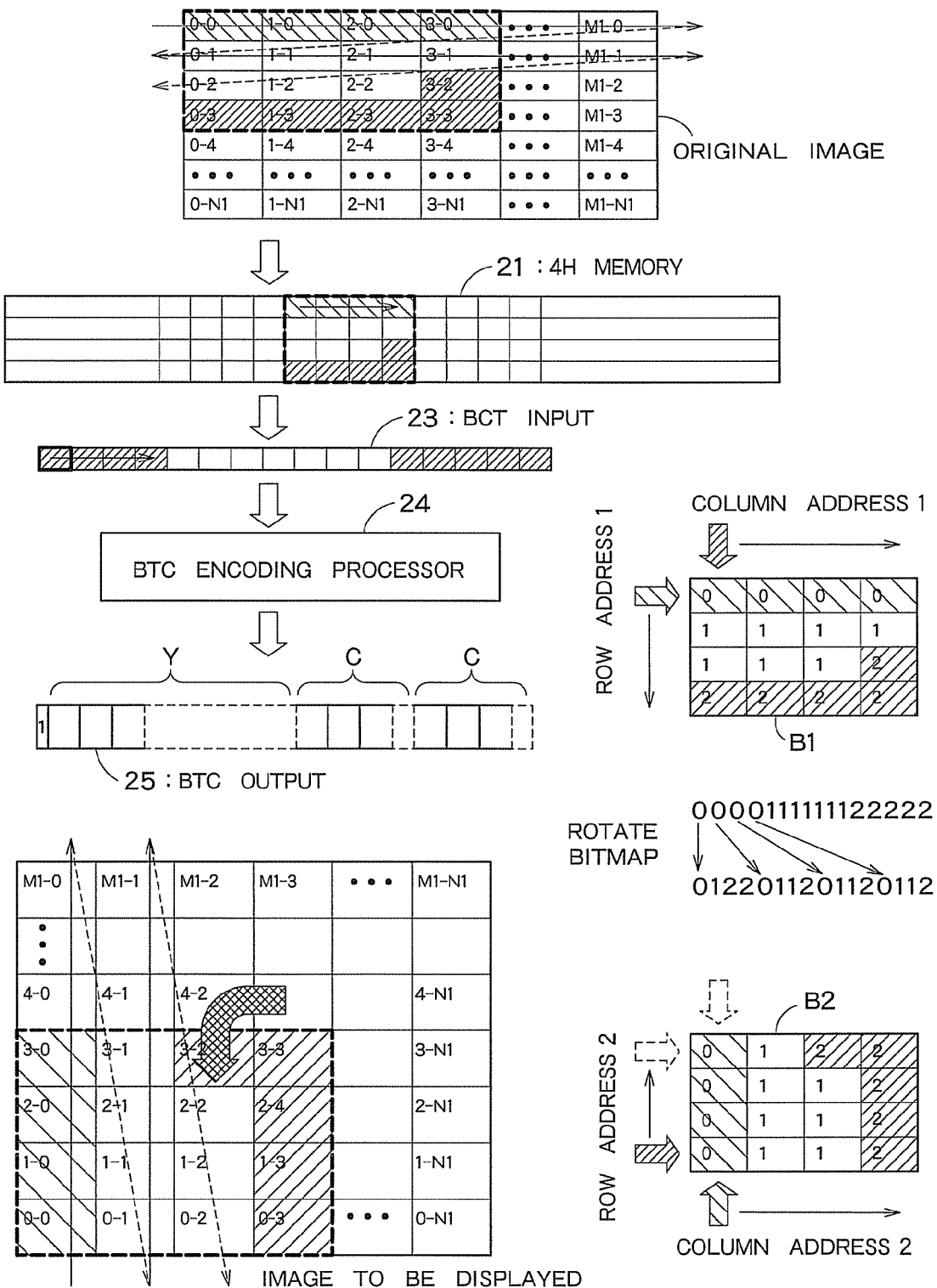
FIG. 31 is a diagram illustrating processing procedures for rotating an image.

FIG. 31 is a diagram illustrating processing procedures for rotating an image. The original image in FIG. 31 is, for example, a TV screen image. As shown in the figure, this image is rotated in the order from left to right and from top to bottom. Data (luminance data and color-difference data) is sent to the BTC encoding circuit 7 in this order. It is stored in the 4H memory 21 for a subsequent BTC process.

The BTC input section 23 reads data out from the 4H memory 21 in 4×4 pixel blocks. Then the data is converted into encoded data according to the processing procedures in FIG. 1. The encoded data contains bitmap data which provides information about each pixel in the pixel block.

The bitmap data is arranged in the same manner as the original image. In the example in FIG. 31, bitmap data "0000111111122222" is arranged from left to right and from top to bottom in the pixel block.

To rotate the image 90 degrees, the arrangement of data in a pixel block B1 in FIG. 31 should be changed to the arrangement of data in a pixel block B2.

When rotating the image 90 degrees, you should change only the arrangement of data in the pixel block, however the representative values in the encoded data remain unchanged. The same results are obtained for the two cases: a BTC encoding process is performed after a 90-degree data rotation or a 90-degree data rotation is performed after a BTC encoding process.

Thus, as the explanation of this embodiment, we choose the processing-order as follow: the BTC encoding process is performed first, and then the image is rotated by rearranging the bitmap data.

Additionally, the image rotation may be performed during a BTC decoding process. However, the size of frame memory 8 is generally limited and it is desirable to store the image in the frame memory 8 after rotation. By selecting a rotation direction suitable for an aspect ratio of the memory and storing data after rotation, it is possible to avoid wasting extra memory areas.

Alternatively, it is conceivable to perform rotation when inputting data in the BTC encoding circuit 7. In that case, since pixel data is rotated, the data is rotated in blocks of 8 bits. Thus, bitmap rotation, which uses only one bit for positional information, allows more hardware resources to be reduced.

Figure 32:
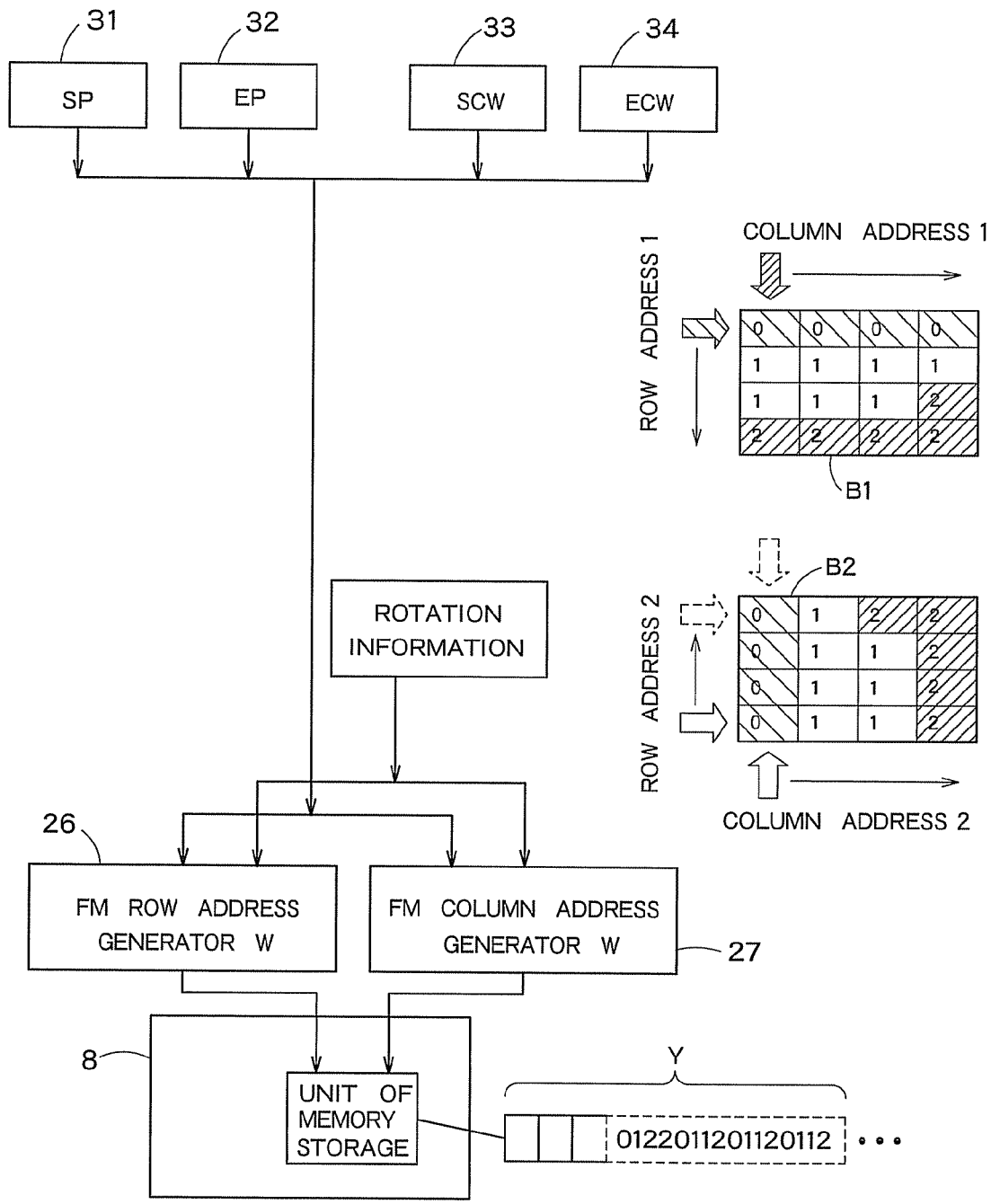
FIG. 32 is a diagram illustrating a 90-degree rotation process performed by the BTC encoding circuit 7.

FIG. 32 is a diagram illustrating a 90-degree rotation process performed by the BTC encoding circuit 7. Hereinafter, addresses specified for storing encoded data in the frame memory 8 will be referred to as FM addresses. Then, in the next, we will explain how FM addresses are specified, with reference to FIG. 32.

Assume that addresses of the original pixel block B1 are given by "x=column addresses 1" and "y=row addresses 1." Rotate the pixel block B1, then the pixel block B2 is obtained. So, the addresses of the pixel block B2 is given as follows: "x=column addresses 2= row addresses 1" and "y=row addresses 2= -column addresses 1." In this addressing, the pixels should be accessed in sequence in the minus y direction.

The two cases are conceivable to specify start page information SP, end column information EC, start column information SC, and end page information EP: (1) using the addresses of the original image (original coordinate mode) or (2) using the addresses obtained as a result of a 90-degree rotation (display coordinate mode).

In the original coordinate mode, the information must be re-interpreted in terms of coordinate obtained as a result of the 90-degree rotation. In the display coordinate mode, the 90-degree rotated coordinate values are sent form the timing controller 2. On the other hands, in the original coordinate mode, rotation is not yet performed and only the original addresses are available. For the original coordinate mode, assume that the start row address is "4×N1," end row address is "4×N2−3," start column address is "4×N3," and end column address is "4×N4−3." That is, the row address changes from "4×N1" to "4×N2−3," and column address changes from "4×N3" to "4×N4−3." After performing a 90-degree rotation, the row address changes from "4×N3" to "4×N4−3," and column address changes from "4×NN−4×N1" to "4×NN−(4N2−3)."

In the above, "4×NN" is the size of the original image in the X direction. Thus, an initial value of an FMx coordinate is given by "N3" and a final FMx coordinate is given by "N2." Similarly, an initial value of an FMy coordinate is given by "NN−N1" and a final FMy coordinate is given by "NN−N2." Such addresses of the frame memory 8 are generated by the FM row address generator 26 and FM column address generating circuit 22 in FIG. 32.

FIG. 33 is a flowchart illustrating processing procedures for generating an address in the frame memory 8. In the flowchart, "fx" denotes the x coordinate of the frame memory 8 and "fy" denotes the y coordinate.

First, initialize "fx" and "fy" to "N3" and "NN−N1," respectively (Step S51). Next, perform BTC encoding (Step S52). Since each pixel block has a size of 4×4 pixels, the addresses of the frame memory 8 is processed in 1/4 units of the original addresses.

Next, check whether the x coordinate "fx" is the final one (Step S53). Assume that the value of the final x coordinate "fx" is already set to "N3." If the answer in Step S53 is NO, increment the x coordinate "fx" by "1" and repeat to perform a BTC encoding process in Step S52.

If the answer in Step S53 is YES, check whether the y coordinate "fy" is the final one (Step S55). Assume that the value of the final y coordinate "fy" is already set to "NN−N2." If the answer in Step S55 is NO, increment the y coordinate "fy" by "1" and repeat to perform a BTC encoding process in Step S52.

To implement the process of FIG. 33 by hardware, there are several conceivable configurations as candidate: (1) functional block is used for the BTC encoding process (2) separate functional blocks are used for BTC encoding processes, depending on the values of the x coordinate "fx" and y coordinate "fy", Either of the configurations is adoptable.

For the treatment of a 90-degree rotation, the processing contents of Steps S54 and S56 should be changed. Also, x and y coordinates "fx" and "fy" are changed according to a rotation operation and symmetry operation. Also, the initial FM addresses and final FM addresses are changed similarly according to the rotation operation and symmetry operation. This can be dealt with by enumerating situations (eight situations) and modifying FIG. 33 according to the situation.

On the other hand, operation of the activity amount detector 41 is unchanged before and after a rotation. This is because relative position of adjacent pixels is not affected by a rotation. Although relationship between x and y directions may be changed by a rotation, the detected amounts of activity remain unchanged after the rotation.

Next, writing of encoded data into the frame memory 8 will be described. The image data which serves as a source of the encoded data stored in the frame memory 8 is sent from the host via an interface. Generally, the image is sent sequentially in the order of horizontal lines of the image. Thus, the 4H memory 21 is needed to process a 4×4 pixel block. Naturally, the host can sent the image data after changing the order of data, but we assume here that the data order is not changed.

First, store the first three lines of data in the 4H memory 21. When a 4×4 block of data is completed, that is, when completed the storing for the fourth line, a BTC compression process is ready to perform. Thus, the BTC encoding circuit 7 performs a process at every four clock.

Input the 4×4 block of data for a BTC process in the BTC input section 23 shown in FIG. 30. The BTC input section 23 has 16 input registers and stores data (luminance data and color-difference data) on 16 pixels in one pixel block.

Produce the encoded data by the BTC encoding processor 24 and store it temporarily in the BTC output section 25. The BTC output section 25 also consists of 16 input registers. The registers are arranged in the order in which data is written into the frame memory 8, and the data is written into the FM from data lines based on the column select signal and row select signal generated by the FM column address generating circuit 22 and FM row address generator 26.

Figure 34:
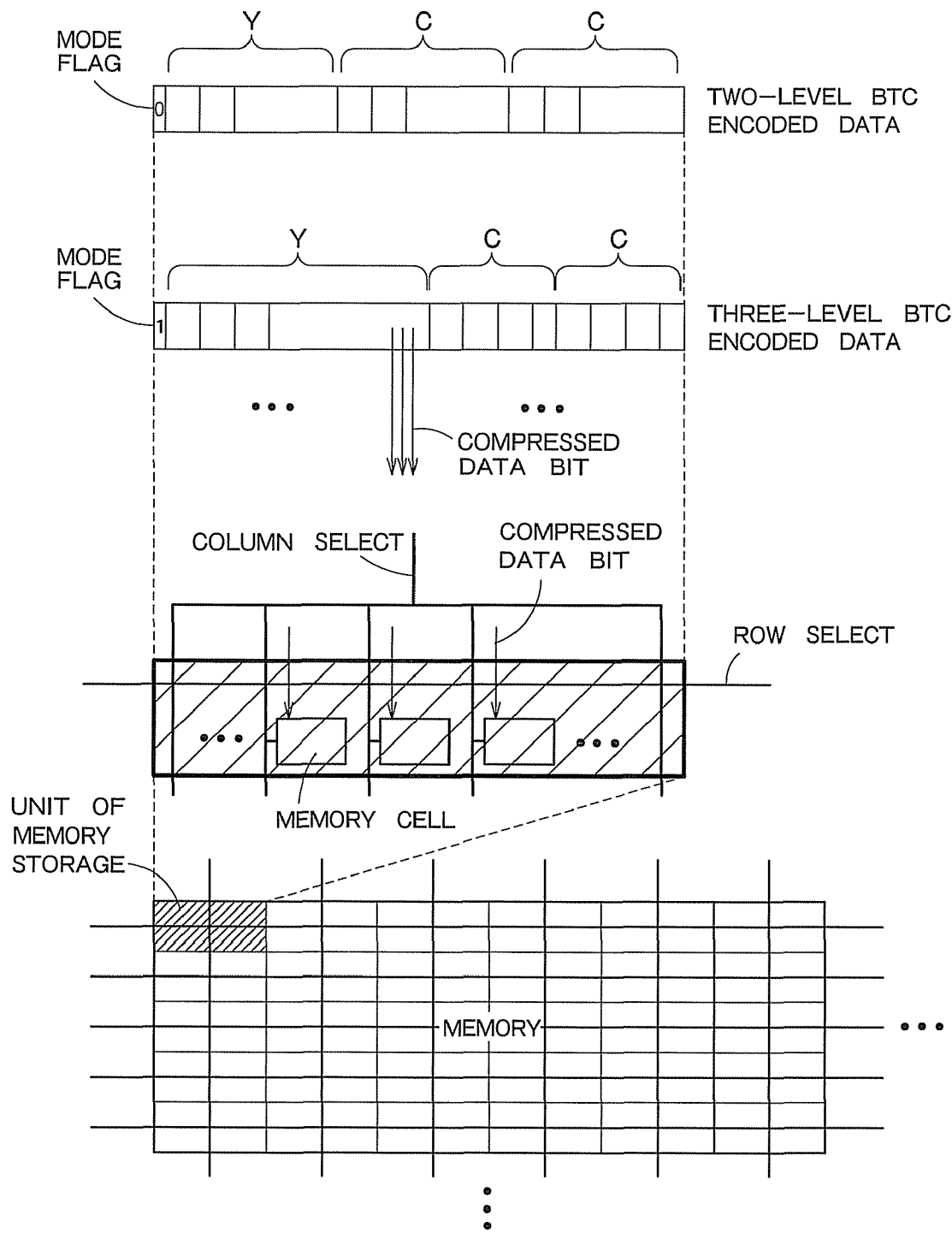
FIG. 34 is a diagram conceptually showing the operation of storing encoded data in the frame memory 8.

FIG. 34 is a diagram conceptually showing the operation of storing encoded data in the frame memory 8. Although a column select signal is shown adjacent to a memory array in FIG. 34 in order to emphasize proximity of memory cells, actually a selector column is fed as input in a data selector as described later.

The column select signal is common to all the encoded data in one pixel block. That is, a common column select signal is supplied to all the memory cells which store the encoded data of one pixel block. Similarly, a common row select signal is supplied to all the memory cells which store the encoded data of one pixel block. This makes the configuration of the frame memory 8 suitable for storing encoded data.

Figure 35:
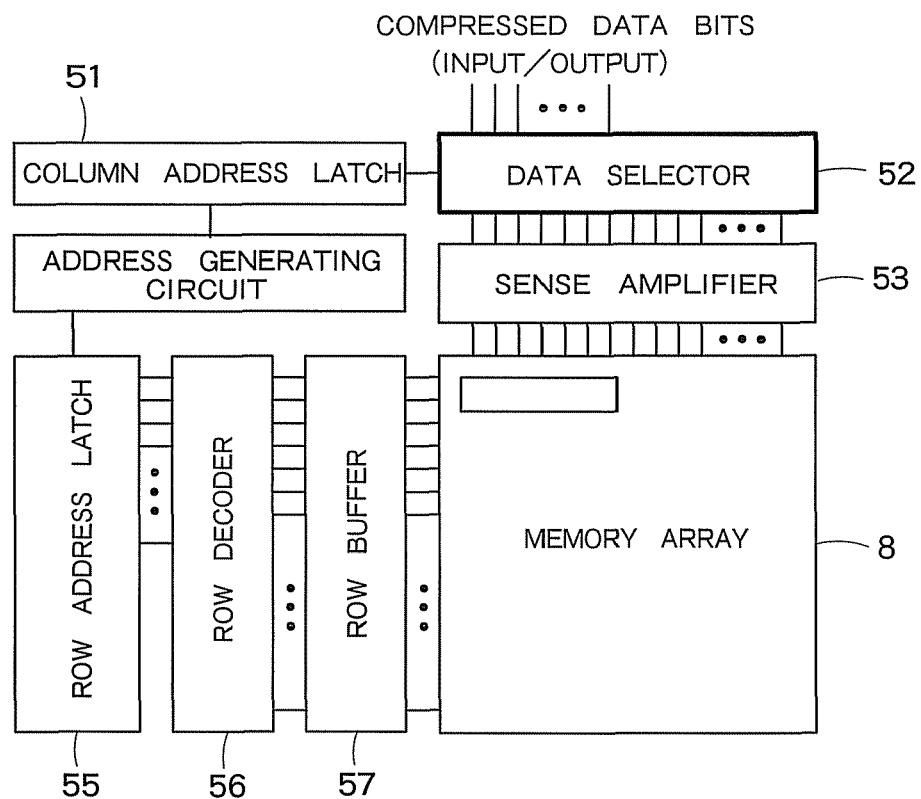
FIG. 35 is a block diagram showing an internal configuration of the frame memory 8 and its peripheral circuitry.

Next, internal configuration of the frame memory 8 and its peripheral circuitry will be described in more detail. FIG. 35 is a block diagram showing the internal configuration of the frame memory 8 and its peripheral circuitry. The frame memory 8 in FIG. 35 has a column address latch 51, data selector 52, sense amplifier 53, memory cell array 54, row address latch 55, row decoder 56, and row buffer 57.

The column address latch 51 latches the column addresses generated by the FM column address generating circuit 22 shown in FIG. 30. The row address latch 55 latches the row addresses generated by the FM row address generator 26 shown in FIG. 30.

Figure 36:
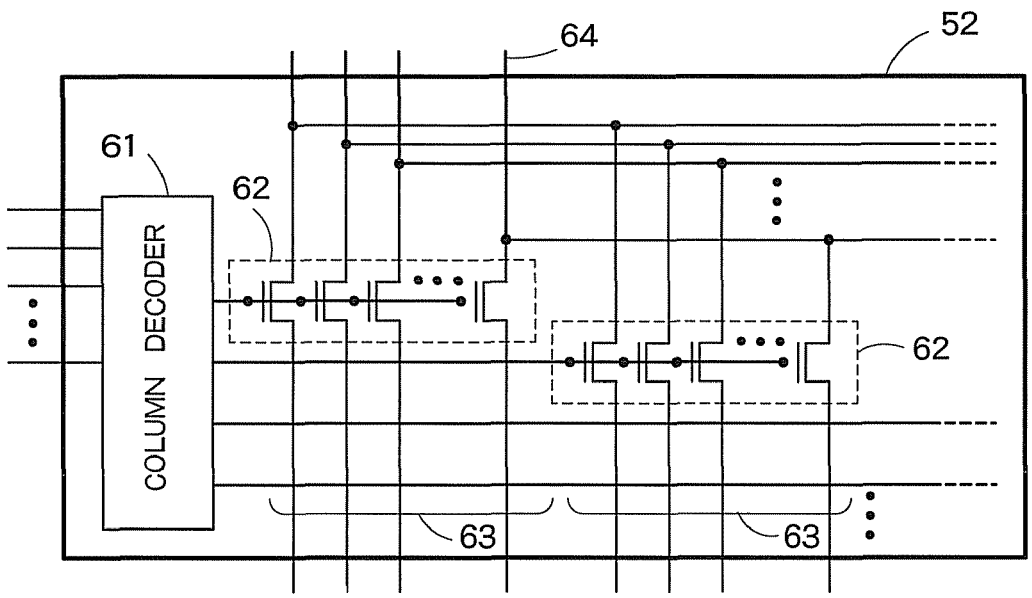
FIG. 36 is a block diagram showing an internal configuration of a data selector 52.

The memory cell array 54 is the main body of the frame memory 8. The encoded data stored in the memory cell array 54 is fed as input in the data selector 52. FIG. 36 is a block diagram showing an internal configuration of the data selector 52. As shown in FIG. 36, the data selector 52 has a column decoder 61 and multiple pass transistor groups 62. The column addresses generated by the FM column address generating circuit 22 are latched by the column address latch 51 and fed as input in the column decoder 61.

The column decoder 61 selectively turns on one of the multiple pass transistor groups 62. Consequently, the encoded data fed to the data selector 52 passes through the activated pass transistor group 62 and is supplied to bit lines 63 in the memory cell array 54.

The data selector 52 is characterized by the operation that it turns on pass transistor groups 62 corresponding to the bit count of the encoded data simultaneously and writes a block of encoded data 64 in multiple memory cells. FIG. 35 shows two pass transistor groups 62, each of which supplies the encoded data 64 of adjacent two pixel blocks to respective bit lines 63.

Regarding row addresses, the row addresses generated by the FM row address generator 26 are latched by the row address latch 55, and then decoded by the row decoder 56 to generate a row address signal.

FIG. 37 is another block diagram showing an internal configuration of a data selector 52 configured differently from the FIG. 36. The data selector 52 in FIG. 37 differs from FIG. 36 in connections where the encoded data 64 is fed as input. In FIG. 37, different blocks of encoded data 64 are fed as input in different pass transistor groups 62.

To implement the configuration in FIG. 37, it is necessary to connect multiple BTC encoding circuits 7 in parallel to the data selector 52.

An advantage of the configuration in FIG. 37 is that there is no need to gather output wires of the multiple BTC encoding circuits 7 for each pixel block. This promotes to reduce wire length between the encoding circuits 7 and frame memory 8. Gathering of wires may cause variation in wire length, resulting in longer wiring. Thus, consider the configuration in FIG. 37 as a possible alternative.

Additionally, you can conceive a combination of the configurations in FIGS. 36 and 37. For example, wires may be grouped according to luminance data and color-difference data or they may be grouped by pixel blocks. In such cases, desirably a concrete configuration should be studied by considering the trade-off between hardware areas and processing speed.

FIG. 38 is yet another block diagram showing an internal configuration of a data selector 52 configured differently from the one shown in FIGS. 36 and 37. In FIG. 38, individual pass transistors are turned on and off separately, and thus encoded data is stored in the frame memory 8 on a bit-by-bit basis. As a variation of FIG. 38, it is conceivable to store more than one bit of encoded data in the frame memory 8 at a time as shown in FIGS. 39 and 40.

Next, we will describe the process of decoding encoded data stored in the frame memory 8. The encoded data stored in the frame memory 8 can be read out by reversing the process of writing the encoded data.

Figure 41:
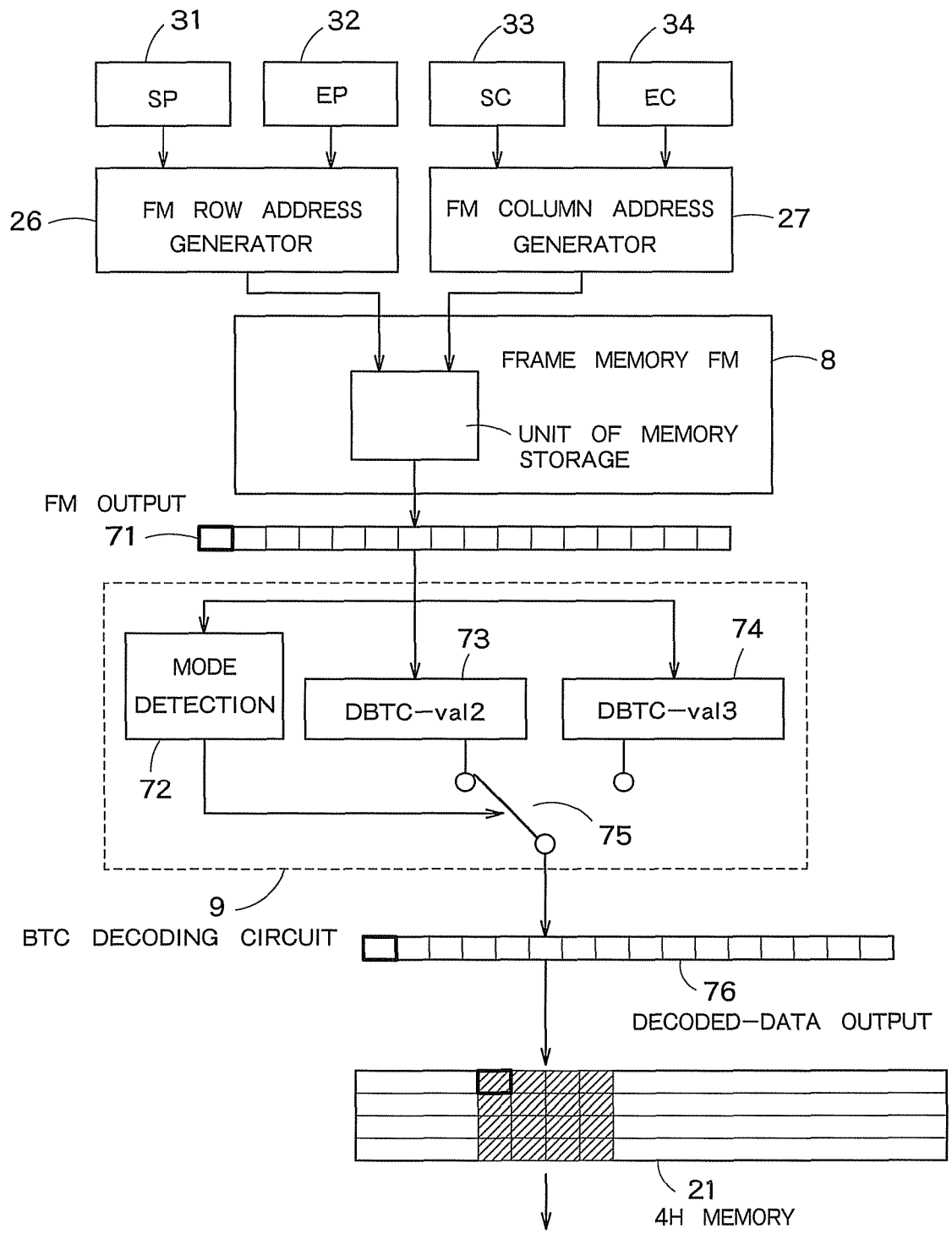
FIG. 41 is a diagram illustrating a decoding process of encoded data.

FIG. 41 is a diagram illustrating a decoding process of encoded data. Same as the case of writing, a column select signal of the frame memory 8 is generated using the SC generator 33 which generates start column information, EC generator 34 which generates end column information, and FM column address generating circuit 22.

Also, a row select signal of the frame memory 8 is generated using the SP generator 31 which generates start page information, EP generator 32 which generates end page information, and FM row address generator 26.

Image data compressed by the frame memory 8 is read out based on the select signals. This is image data of a 4×4 pixel block. It is decoded by the decoding method described above. Then the image data is decoded in blocks of 4×4 pixels, but to process it on a line-by-line basis, the pixel order is rearranged using the 4H memory 21.

The 4H memory 21 stores data up to the third line, and when one pixel block of data is complete (reaching the fourth line), the 4H memory 21 is ready to transmit the data to the host.

The encoded data read out of the frame memory 8 is stored temporarily in an FM output section 71. The BTC decoding circuit 9, a mode detecting section 72, two-level BTC processor (DBTC-val2) 73, three-level BTC processor (DBTC-val3) 74, and a selector 75. The mode detecting section 72 determines, based on the first bit of the encoded data, whether the data is encoded by a two-level BTC algorithm or three-level BTC algorithm.

Based on the detection result by the mode detecting section 72, the selector 75 selects one from the two: decoded data generated by the two-level BTC processor 73 and decoded data generated by the three-level BTC processor 74. The decoded data selected by the selector 75 is stored in the 4H memory 21 via a decoded-data output section 76.

Additionally, as an example, in the above explanation we have assumed that one pixel block of encoded data is read out simultaneously. However, if you think that simultaneous addressing is not desirable because of instantaneously massive current, the encoded data may be read out sequentially bit by bit. In that case, addresses must be generated for each read.

Figure 42:
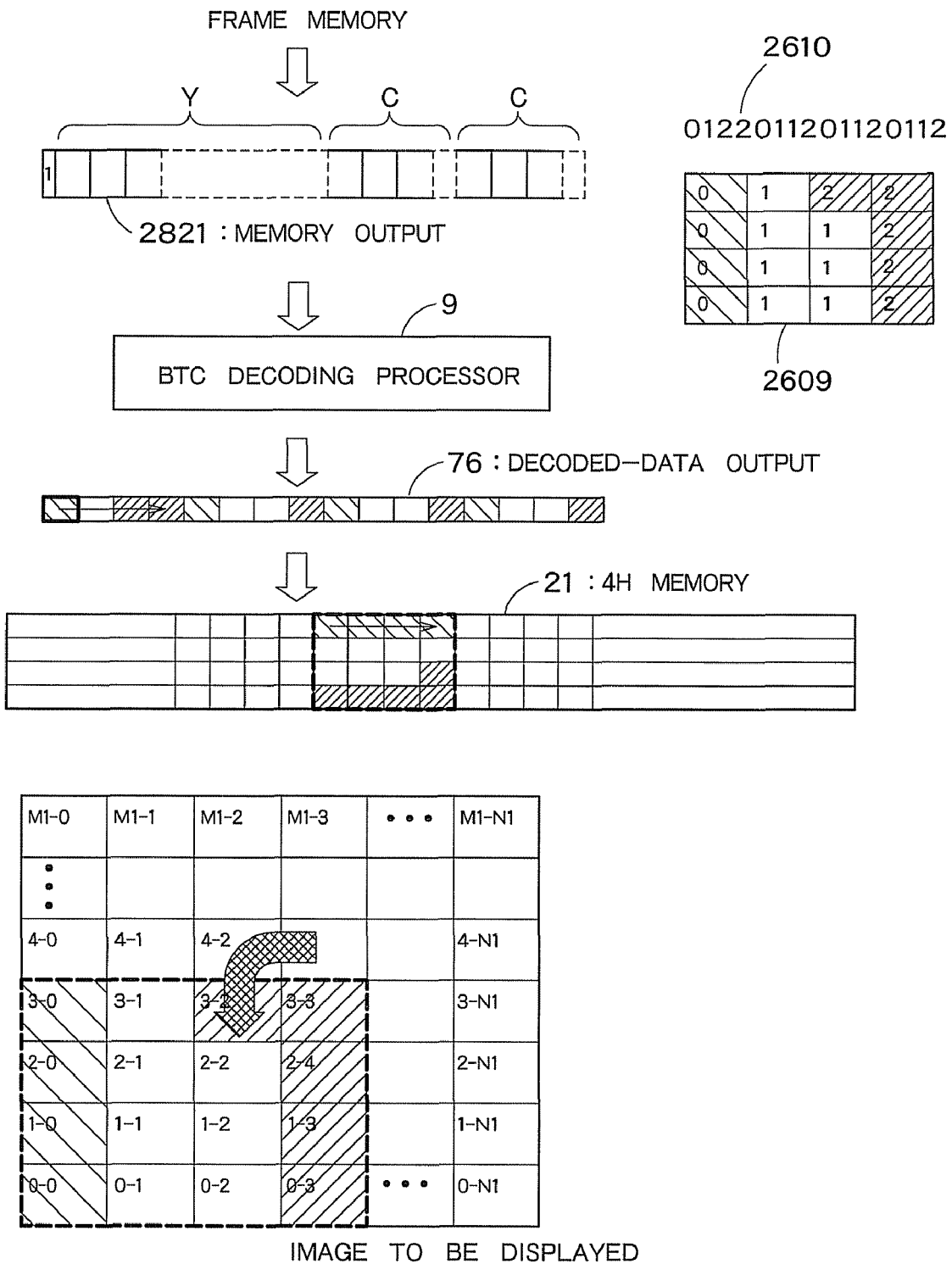
FIG. 42 is a diagram illustrating a decoding process used when rotating an image.

Next, we will describe a decoding process used when rotating an image. FIG. 42 is a diagram illustrating a decoding process used when rotating an image. The right portion of FIG. 42 shows an example of bitmap data B3, where B3 is contained in encoded data read out from the frame memory 8. The BTC decoding circuit 9 outputs the bitmap data without changing its order. The reason for not changing the order is that the BTC encoding circuits 7 have already rotated the data before encoding it. In this way, decoded data is stored in the decoded-data output section 76. The decoded data is stored in the 4H memory 21 without data order rearrangement. As described above, the image rotated 90 degrees has been displayed. Recall again the fact that there is no need to perform a rotation process during the decoding process, because the bitmap data contained in the encoded data stored in the frame memory 8 has already been rotated.

FIG. 43 is a diagram illustrating address generation in the frame memory 8 when a 90-degree rotation process is performed. As described above in encoding, the bitmap data contained in the encoded data has already been rotated. And, rotation information and scanning information can be handled independently.

As another option, the order of data output to lines for LCD driving may be determined by scanning information regardless of image rotation. Two orders are possible: from top to bottom and from bottom to top. During a write into the frame memory 8, "fy" is accessed in the negative direction (from bottom to top): from "NN−N1" to "NN−N2." However, data access sequence along "fy" may be forced to set to the order from "NN−N2" to "NN−N1" using the scanning information. Similarly, two access sequences are available along "fx": from right to left and from left to right.

FIG. 44 is a diagram illustrating processing operations used when start column information SC and end column information EC are not quadruples of an integer. For simplicity, assume that "start page information SP"="end page information EP"="4×integer."

Also, assume an even rather strong condition that "SC=EC=4×integer+remainder" because repetitive modulo computation reduce the addressing problem to this assumption for a situation in which SC and EC are different. The remainder here is given by modulo 4 and possible values are "1," "2," and "3." For example, assume that "the remainder=1" for the following explanation.

In FIG. 44, one H line of data is selected from the 4H memory 21, corresponding to the "remainder." The selected data is stored, for example, in a shift register 77 of an LCD driver and outputted to drive the liquid crystal panel 1. In the above operations, of course, the order is changed according to scan setting information.

FIG. 45 is a block diagram showing a detailed internal configuration of the BTC decoding circuit 9. Decoding of luminance data will be described below as an example, and color-difference data Cr and Cb can be decoded using the same procedures.

The luminance data "Y" will be described in the case that a mode flag bit (hereinafter referred to a mode signal) is "0." Also, assume that the lower representative value a2 is "01100011" (value 99), that the upper representative value b2 is "10010011" (value 147), and that the bitmap m2 is "1111001100110000." (See FIG. 5.)

The BTC decoding circuit 9 has following circuits: a mode detecting circuit 81, a data separation circuit 82, a first holding circuit 83, a second holding circuit 84, a third holding circuit 85, a fourth holding circuit 86, a bit length adjusting circuits 87, data reference circuits 88, and selectors 89.

The data separation circuit 82 extracts the encoded luminance data into the following bit strings: a bit string which represents the lower representative value a2, a bit string which represents the upper representative value b2, and a bit string which represents the bitmap data m2. The bit strings are stored, in the first holding circuit 83, second holding circuit 84, and fourth holding circuit 86, respectively. Additionally, the third holding circuit 85 is not used when the mode flag is "0."

The selectors 89 select either the lower representative value a2 or upper representative value b2 depending on whether the respective bits in the bitmap data m2 are "0" or "1." The selectors 89 are installed corresponding to the bits in the bitmap data.

The bit length adjusting circuits 87 set bit length according to mode. The data reference circuits 88 are installed to refer to data from appropriate position because data length of the bitmap data varies with mode.

The selectors 89 select either the lower representative value a2 or upper representative value b2 depending on following outputs: outputs from the bit length adjusting circuits 87, outputs from data reference circuits 88, and outputs from mode detecting circuit 81.

Next, FIG. 46 is a diagram illustrating a decoding process of luminance data when mode flag is "1." The data separation circuit 82 extracts the following values: the lower representative value a3, middle representative value b3, and upper representative value c3 and then these values are stored in the first to fourth holding circuits 83 to 85, respectively.

Assume that, for example, as shown in FIG. 17, "a3=000000" (value 0), "b3=010000" (value 128), "c3=111111" (value 252), and m3="1222012200120001." The bit length adjusting circuits 87 reconstruct, for example, "00000000" (value 0) by supplementing the 6-bit data a3 with "00" as the least significant two bits. Similarly, b3 is reconstructed as "010000000" (value 128) and c3 is reconstructed as "11111100" (value 252).

Additionally, in the above "00" is used here as the least significant bits, this is not restrictive: round-off can be used if you wish as another option. Since the bitmap is expressed in ternary such as "122 . . . ," each of its digits should be extracted as a binary value: for example, "0" as "00," "1" as "01," and "2" as "10." Then, the bit length adjusting circuits 87 extract appropriate bitmap information.

For example, regarding "1" at the head, the first two bits "01" are extracted by the fourth holding circuit 86. Regarding "2" that follows, the third and fourth bits "10" are extracted by the fourth holding circuit 86. The bit length adjusting circuits 87 decode the bitmap in this way.

Assume that the selectors 89 receive, for example, "a3=00000000," "b3=01000000," and "c3=11111100" as data to select. If a selection signal of the selectors 89 is "01" (meaning "select the middle"), "01000000" is selected and outputted. The mode signal of "1" specifies the operation of selecting one from among three. A term "merged BTC decoder" is defined as a BTC decoder obtained by integrating two BTC decoders. FIG. 47 is a block diagram showing an internal configuration of a BTC decoding circuit 9 containing a merged decoder 80. The configuration in FIG. 47 has only one merged decoder instead of two decoders in FIG. 41.

FIG. 48 is a block diagram showing an internal configuration of the bit length adjusting circuit 87 in FIG. 45. As shown in the figure, the bit length adjusting circuit 87 has two switches 91. The switches select the signal "00" or two LSB bits, based on output data from the mode detecting circuit 81. The output of the bit length adjusting circuit 87 always has 8 bits in length.

FIG. 49 is a diagram showing connections among input sections of data reference circuits 88 in FIG. 45. Thirty-two (32) data lines are connected to respective bitmap data output terminals. One bit of bitmap data is fed in an input A of the data reference circuits 88 when the mode is "0." Two bits of bitmap data are fed in inputs B and C of the data reference circuits 88 when the mode is "1."

Figures 50, 51:
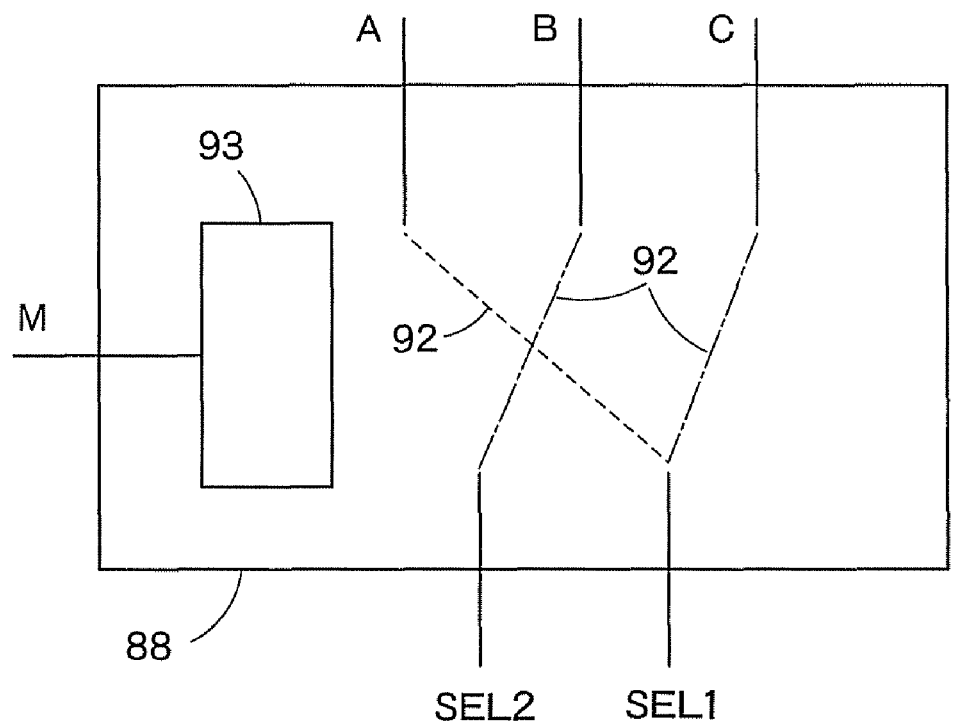
FIG. 50 is a block diagram showing an internal configuration of the data reference circuit 88.
FIG. 51 is a table showing a switching operation of a switch control circuit 93.

FIG. 50 is a block diagram showing an internal configuration of the data reference circuit 88. As shown in the figure, the data reference circuit 88 has a switch 92 which selects two outputs SEL1 and SEL2 from the three inputs A, B, and C. And switch control circuit 93 controls the switch 92.

FIG. 51 is a table showing a switching operation of the switch control circuit 93. As shown in the figure, the switch control circuit 93 controls the switch 92: (1) the input A will be transmitted to SEL1 when the mode flag is "0" and (2) inputs B and C will be transmitted to SEL1 and SEL2, respectively, when the mode flag is "1."

The 0th bit, first bit and so on, are fed in sequence in the inputs A of the data reference circuits 88 in FIG. 49. When the mode flag is "0", this feeding is done as following: the 16-bit bitmap data is fed in a 32-bit latch in sequence beginning with the first bit However, this feeding is merely an example, and there are various options for storing the bitmap data in the fourth holding circuit 86. For example, bit may be stored in an alternative way. (Data may be fed as input in even-numbered locations such as the 0th bit, second bit, fourth bit and so on without feeding data in odd-numbered locations which are set at a fixed value. In this way, there are various options for storing 16 bits in a 32-bit storage.)

On the other hand, when the mode flag is "1," 32-bit bitmap data is stored in the fourth holding circuit 86. For this storing, in FIG. 49, input lines are connected to both B and C by two bits input as connection unit. To supplement an example as a variation, if bit is stored in alternative way when the mode flag is "0." A and C can be treated practically as a single signal and the configurations in FIGS. 50 and 51 need to be changed.

FIG. 52 is a block diagram showing an internal configuration of the selector 89 in FIG. 45. The selector 89 has three transistor switches S1 to S3 which select the lower representative value, middle representative value, and upper representative value. And, a switch control circuit 94 performs on/off-control of the switches S1 to S3.

FIG. 53 is a table showing a switching operation of the switching control circuit 94. As shown in the figure, when the mode flag "M=0," "SEL2=0" and "SEL1=0," only the switch S1 is turned on. In FIG. 53, "1" indicates the switch is on and "0" indicates the switch is off. The other switches S2 and S3 are off. This corresponds to selection of the lower representative value in two-level BTC.

In the second row, "M=0," "SEL2=indefinite," and "SEL1=1." Only the switch S2 is turned on. This corresponds to selection of the upper representative value in two-level BTC.

In the third row, "M=1," "SEL2=0," and "SEL1=0." Only the switch S1 is turned on. This corresponds to selection of the lower representative value in three-level BTC.

Similarly, the fourth row corresponds to selection of the middle representative value in three-level BTC. The fifth row corresponds to selection of the upper representative value in three-level BTC. The last, sixth row has no correspondence in three-level BTC, and thus causes an error.

When A is merged with C (A=C), the data reference circuit 88 has a circuit configuration such as shown in FIG. 54 and switching in the data reference circuit 88 are specified as shown in FIG. 55. In this case, since C always merged with A, it does not vary with M. When the mode is "0," B has a value "don't care". Thus, B can be treated as being switched to SEL2. Such situation is the same as when the mode is "1." Consequently, the switch control circuit 93 becomes unnecessary.

In order to implement the configuration in FIG. 45 or 46, the above circuits are selected according to its configuration. Although only the luminance data "Y" has been described above, the color-difference data Cr and Cb can be processed using similar procedures: their explanation is omitted.

Next, hardware size will be discussed. Assume that luminance data "Y" is processed. For two-level BTC, "a2" and "b2" are 8 bits wide and the bitmap data m2 is 16 bits wide. In three-level BTC, "a3," "b3," and "c3" are 6 bits wide respectively and the bitmap data m3 is 32 bits wide. Thus, the first holding circuit 83 and second holding circuit 84 need to have 8-bit size, the third holding circuit 85 needs to have 6-bit size, and the fourth holding circuit 86 needs to have 32-bit size.

Next, we will describe on a hardware configuration which materializes the BTC encoding circuit 7 described above with reference to FIG. 1. At first, the maximum and minimum values are necessary to calculate for the pixel block, in order to calculate the thresholds which are used in a two-level BTC algorithm and three-level BTC algorithm.

The maximum and minimum values are detected in Step S22 in FIG. 22, and this process can be performed on hardware as follows. FIG. 56 is a block diagram showing a schematic configuration of a maximum value detecting circuit 101 which detects a maximum value in a pixel block. FIG. 57 is a block diagram showing a schematic configuration of a minimum value detecting circuit 102 which detects a minimum value in a pixel block. The circuits in FIGS. 56 and 57 have similar processing operations to detect the maximum value or minimum value. Thus, as a representative explanation, the configuration and processing operation in FIG. 56 will be selected to describe as follows.

The maximum-value-detecting-circuit 101 in FIG. 56 has eight first maximum-value-detecting-circuits 103. Each of the detecting circuit 103 compares two inputs which comes from 16 data (luminance data, color-difference data Cr, or color-difference data Cb) in a 4×4 pixel block and then extracts larger one. There are four second maximum-value-detecting-circuits 104, each of which compares two values: eight outputs from the first maximum value detecting circuits 103 and determines larger one. Then, there are two third maximum-value-detecting-circuits 105, each of which compares two values: four outputs from the second maximum-value-detecting-circuits 104 and determine larger value. There is a fourth maximum-value-detecting-circuit 106 which selects the larger value of two outputs from the third maximum-value-detecting-circuits 105.

FIG. 58 is a diagram illustrating a technique for calculating two thresholds "Th_high" and "Th_low" based on the maximum value "MAX" and minimum value "MIN" detected in FIGS. 56 and 57. As shown in the figure, the maximum value "MAX" and minimum value "MIN" detected in FIGS. 56 and 57 are fed as input in a Th_high calculating section 107 which calculates a large threshold "Th_high" and a "Th_low" calculating section 108 which calculates a small threshold "Th_low". In this way, "Th_high" and "Th_low" are calculated.

FIG. 59 is a block diagram showing a schematic configuration of an average value detecting circuit 110 which performs a process of Step S23 in FIG. 22 to detect an average value of pixels excluding the maximum value "MAX" and minimum value "MIN" of pixel values for the pixel block. As shown in the figure, the average value detecting circuit 110 has following circuits: (1) a data input section 111 where data of a 4×4 pixel block is fed as input, (2) comparison circuit 112 which detects MAX-MIN status: whether each pixel data matches the maximum value "MAX" or minimum value "MIN," and (3) an average value calculating circuit 113.

To calculate an average value excluding the maximum value "MAX" and minimum value "MIN," the average value calculating circuit 113 hierarchically calculates the number of excluded pixels and cumulative value of remaining pixels: and thereby its calculation process is started from all the 16 pixel values. The average value calculating circuit 113 has four layers and performs calculations on a layer-by-layer basis. Details will be described later.

FIG. 60 is a block diagram showing an internal configuration of multiple comparison sections 114 installed in a comparison circuit 112 in FIG. 59. The comparison section 114 in FIG. 60 has a first comparison section 115, second comparison section 116, and output circuit 117. The first comparison section 115 compares pixel data Din with the minimum value "MIN" and outputs a result signal of the comparison. The second comparison section 116 compares the pixel data Din with the maximum value "MAX": outputs "1" if they match, or outputs "0" if they do not match.

The output circuit 117 outputs "C_MIN=1," "C_MAX=0," and "C_MID=0" when the pixel data Din matches the minimum value "MIN." It outputs "C_MIN=0," "C_MAX=1," and "C_MID 0" when the pixel data Din matches the maximum value "MAX." It outputs "C_MIN=0," "C_MAX=0," and "C_MID=1" when the pixel data Din matches neither the minimum value "MIN" nor maximum value "MAX." Otherwise, it outputs the pixel data Din directly as "Dout."

"C_MIN," "C_MID," and "C_MAX" are fed as input in the average value calculating circuit 113 in FIG. 59 to count pixels when the pixel data matches the maximum value "MAX," middle value between the maximum value "MAX" and minimum value "MIN," or minimum value "MIN". "Dout" is fed as input also in the average value calculating circuit 113 to calculate a cumulative value excluding the maximum value "MAX" and minimum value "MIN."

As described above, margins Δ3 and Δ4 may be provided for the maximum value "MAX" and minimum value "MIN," in order to expand their range such as "MAX-Δ3" and "MIN+Δ4." Then, the first comparison section 115 and second comparison section 116 use predicate GE (greater than or equal to) or predicate LE (less than or equal to) in their comparison processes.

FIG. 61 is a block diagram showing an internal configuration of an output circuit 117 in FIG. 60. The output circuit 117 in FIG. 61 has following adders: an adder 121 which calculates a count value of "C_MAX," an adder 122 which calculates a count value of "C_MID," an adder 123 which calculates a count value of "C_MIN," and an adder 124 which calculates the cumulative value of pixel data "Dout" excluding the maximum value "MAX" and minimum value "MIN."

"C_MAX1," "C_MID1," "C_MIN1," and S1 are outputted from the first comparison section 115 in FIG. 60 and fed as input in the output circuit 117. "C_MAX2," "C_MID2," "C_MIN2,"[1] and S1 are outputted from the second comparison section 116 and fed as input in the output circuit 117.

Output of the comparison circuit 112 is fed as input in the average value calculating circuit 113, the pixel data in the pixel block is added to it cumulatively in sequence. In this way, the cumulative value S of "C_MAX," "C_MID," and "C_MIN" of the pixel block are calculated.

FIG. 62 is a block diagram showing a schematic configuration of a threshold detecting circuit 130 which detects the thresholds "Th_high" and "Th_low" in Step S23 in FIG. 22. "C_MID" and "S" outputted from the average value detecting circuit 110 in FIG. 59 are fed as input to "Count_MID" and "Sum," respectively, in the threshold detecting circuit 130 in FIG. 62. The threshold detecting circuit 130 in FIG. 62 has following circuits: an average value calculating circuit 131, Th_low calculating circuit 132, and Th_high calculating circuit 133. The average value calculating circuit 131 calculates an average value "AVE=Sum/Count_MID" from "Count_MID" and "Sum."

Since the process in FIG. 62 has 16 pixel data as input, "Count_MID" has 15 at the most count, which can be expressed in four bits. Thus, 4-bit division is used: in terms of hardware size, the dividers are smaller than a generally expected 8×8 divider.

The Th_low calculating circuit 132 performs the calculation "Δ1=AVE-MIN" shown in FIG. 20, and then calculates "Th_low=MIN+Δ1/2." On the other hand, Th_high calculating circuit 133 performs the calculation "Δ2=MAX-AVE" shown in FIG. 20, and then calculates "Th_high=MAX-Δ2/2."

FIG. 63 is a block diagram showing a schematic configuration of a circuit which performs a process of Step S33 in FIG. 23 to classify pixel values in a pixel block into three groups based on the thresholds "Th_high" and "Th_low" and then determine a count value and cumulative value of each classified group. The circuit in FIG. 63 has following circuits: (1) an input circuit 141 into which each pixel value in the pixel block is fed as input, (2) a comparison circuit 142 which compares each pixel value in the pixel block with the thresholds "Th_high" and "Th_low," and (3) a cumulative value calculating circuit 143 which calculates the count value and cumulative pixel value of the pixels in each group.

FIG. 64 is a block diagram showing an internal configuration of multiple comparison sections 144 installed in the comparison circuit 142. The comparison section 144 in FIG. 64 has following circuits: a first comparison section 145, a second comparison section 146, and an output circuit 147.

The first comparison section 145 checks whether the pixel data Din in the pixel block is smaller than the threshold Th_low. It outputs "1" if the pixel data Din is smaller, or outputs "0" if the pixel data Din is not smaller.

The second comparison section 146 checks whether the pixel data Din in the pixel block is larger than the threshold "Th_high". It outputs "1" if the pixel data Din is larger, or outputs "0" if the pixel data Din is not larger.

The output circuit 147 initializes count values "C_HI," "C_MID," and "C_LOW" and also initializes cumulative data values "S_HI," "S_MID," and "S_LOW" based on the comparison results produced by the first comparison section 145 and second comparison section 146. If the data Din is lower than "Th_low," then "C_HI" and "C_MID" are set to "0," "C_LOW" is set to "1," "S_HI" and "S_MID" are set to "0," and "S_LOW" is set to the value of "Din." If the data Din is higher than "Th_high," then "C_MID" and "C_LOW" are set to "0," "C_HI" is set to "1," "S_MID" and "S_LOW" are set to "0," and "S_HI" is set to the value of "Din." If the data Din is between "Th_low" and "Th_high," then "C_HI" and "C_LOW" are set to "0," "C_MID" is set to "1," "S_HI" and "S_LOW" are set to "0," and "S_MID" is set to the value of "Din." In this way, the count values are initialized and added cumulatively in sequence by the cumulative value calculating circuit 143 in FIG. 63.

Figure 65:
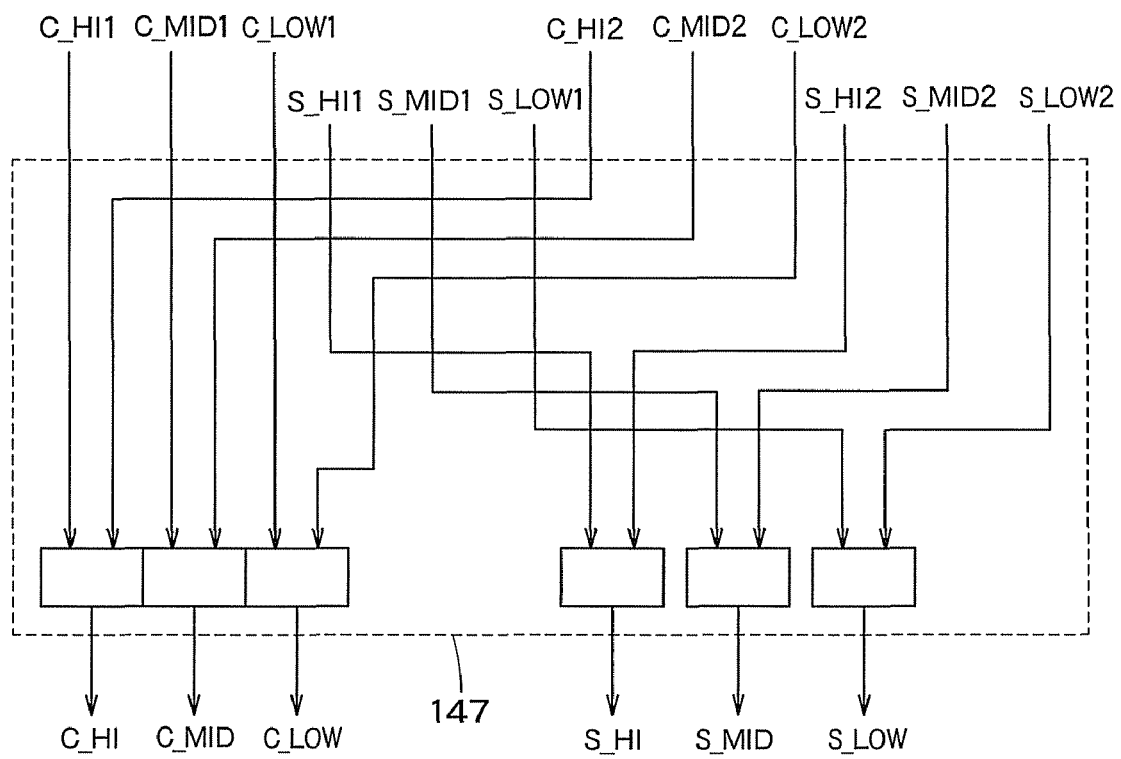
FIG. 65 is a block diagram showing an internal configuration of an output circuit 147 in FIG. 64.

FIG. 65 is a block diagram showing an internal configuration of an output circuit 147 in FIG. 64. The output circuit 147 in FIG. 65 has multiple adders 148 which calculates "C_HI," "C_MID," "C_LOW," "S_HI," "S_MID," and "S_LOW," respectively. Output of the output circuit 147 is fed as input in the cumulative value calculating circuit 143, which calculates respective cumulative values of "C_HI," "C_MID," "C_LOW," "S_HI," "S_MID," and "S_LOW."

Figure 66:
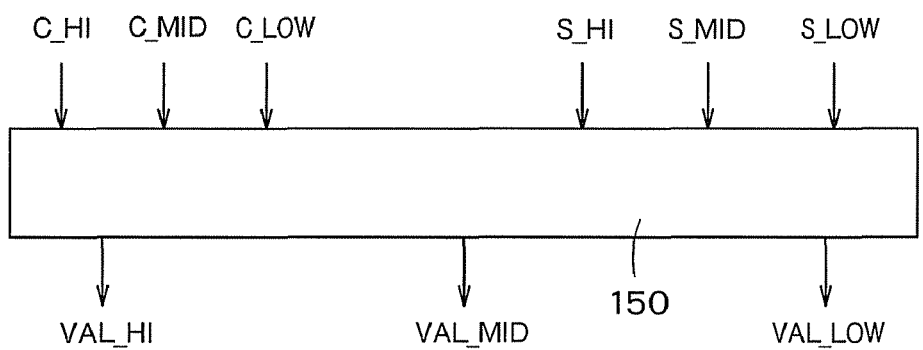
FIG. 66 is a block diagram showing a schematic configuration of a representative value calculating circuit 150 which calculates representative values "V_high," "V_mid," and "V_low" in Step S23 in FIG. 22.

FIG. 66 is a block diagram showing a schematic configuration of a representative value calculating circuit 150 which calculates the representative values "V_high," "V_mid," and "V_low" in Step S23 in FIG. 22. The representative value calculating circuit 150 in FIG. 66 calculates the representative values "V_high," "V_mid," and "V_low" according to the values of "C_HI," "C_MID," and "C_LOW" based on the correspondence shown in FIG. 25.

FIG. 67 is a block diagram showing a schematic configuration of a bitmap data generating circuit 151 which generates bitmap data of a pixel block. The bitmap data generating circuit 151 is installed in the BTC encoding circuit 7.

The bitmap data generating circuit 151 in FIG. 67 has following circuits: (1) an input circuit 152 into which pixel data in the pixel block is fed as input, (2) a comparison circuit 153 which detects whether the pixel data of each pixel matches the thresholds "Th_high" and "Th_low," (3) a bitmap data generating circuit 154 which generates bitmap data based on the comparison result produced by the comparison circuit 153, and (4) a bitmap output section 155.

The bitmap data generating circuit 154 generates bitmap as follows: (1) bitmap data "00" when the pixel data is smaller than "Th_low," (2) bitmap data "10" when the pixel data is larger than "Th_high," and (3) bitmap data "01" when the pixel data is between "Th_low" and "Th_high."

In the process of detecting the maximum value "MAX" and minimum value "MIN" in FIGS. 56 and 57, the process of detecting the average value "AVE" excluding the maximum value "MAX" and minimum value "MIN" in FIG. 59. And the process of detecting the representative values in FIG. 63, calculations are performed hierarchically using the pixel data in the pixel block as input.

Thus, the above processes may be implemented either on individual hardware or a single merged hardware. A configuration which implements the four processes on a single merged hardware will be discussed below to optimize the hardware. This avoids redundant overlapped functionality and reduces hardware size.

To identify an active process, a "Phase" signal will be introduced. Additionally, since that a 4×4 block of data is processed, desirably the processing can be completed in four CLK cycles at the longest. So, we assume that the process consists of four steps, and if single step corresponds to single CLK cycle, the process is completed well in four CLK cycles.

Thus, the Phase signal will be treated as CLK cycles. That is, assume that Phase repeats values 0, 1, 2, and 3. For example, when Phase=0, the amount of activity is calculated; when Phase=1, "MAX" and "MIN" are calculated; when Phase=2, "AVE" (threshold) is calculated; and when Phase=3, representative values (bitmap) are calculated.

Luminance data "Y" will be described below. The color-difference data Cr and Cb can be processed using similar procedures.

Additionally, suppose that hardware is connected serially instead of using such iterative calculations. Even for the case that calculations are not finished in four CLK cycles, pipelining may solve such bad situation. The four-CLK-cycle limit is imposed here because the hardware resources are shared (merged) for iterative calculations.

FIG. 68 is a block diagram showing a schematic configuration of a shared circuit 160. The shared circuit 160 in FIG. 68 has following circuits: (1) an input circuit 161 into which pixel data of each pixel in the pixel block is fed as input, (2) a comparison circuit 162 which checks whether the pixel data of each pixel in the input circuit 161 matches the data to be compared with, (3) a cumulative value calculating circuit 163 which calculates the count value and cumulative value of data based on the comparison result produced by the comparison circuit 162, and (4) a Phase input circuit 164 into which the Phase signal that identifies process contents is fed as input.

FIG. 69 is a block diagram showing an internal configuration of multiple comparison sections 165 installed in a comparison circuit 162. The comparison circuit 162 in FIG. 69 has following circuits: (1) a first comparison section 166 which compares pixel data with "DIN2," (2) a second comparison section 167 which compares pixel data with "DIN3," and (3) an output circuit 168 which outputs "C_1," "C_2," and "C_3" which indicate comparison results produced by the first comparison section 166 and the second comparison section 167 as well as data "S_1," "S_2," and "S_3."

First, consider the case where Phase=1. In this case, there is no need for initialization, and thus the pixel data of each pixel in the pixel block passes through the comparison circuit 162. For Phase=2, the comparison circuit 162 compares the pixel data of each pixel in the pixel block with the minimum value "MIN" and maximum value "MAX" as shown in FIG. 60.

In this case, "DIN1," "DIN2," and "DIN3" correspond to "DIN," "MIN," and "MAX" in FIG. 60, respectively. The first comparison section 166 compares "DIN1" and "DIN2" to determine which is larger. The second comparison section 167 compares "DIN1" and "DIN3" to determine which is larger. The first comparison section 166 and second comparison section 167 correspond to the first comparison section 115 and second comparison section 116 in FIG. 60.

The output circuit 168 calculates both count values "C" and cumulative values "S" for the maximum, middle (other than maximum and minimum) and minimum groups respectively. The calculation is based on the comparison results produced by the first comparison section 166 and the second comparison section 167. The output circuit 168 corresponds to the output circuit 117 in FIG. 60.

Since "Dout" generated as output from the output circuit 168 is a cumulative value excluding the maximum value "MAX" and minimum value "MIN," "Dout" should naturally corresponds to "S_2" of the middle group. "C_1," "C_2," and "C_3" correspond to "C_MAX," "C_MID," and "C_MIN" respectively.

On the other hand, when Phase=3, the comparison circuit 162 performs calculation processes similar to FIG. 64. In this case, "DIN1," "DIN2," and "DIN3" correspond to "DIN," "Th_low," and "Th_high," respectively. In FIG. 69, the first comparison section 166 compares "DIN1" and "DIN2". The second comparison section 167 compares "DIN1" and "DIN3." The output circuit 168 calculates both count values C and cumulative values S of the maximum, middle (other than maximum and minimum) and minimum groups respectively. This calculation is based on the comparison results produced by the first comparison section and second comparison section. The output circuit 168 corresponds to the output circuit 147 in FIG. 64. The outputs "S_1," "S_2," and "S_3" in FIG. 69 correspond to outputs "S_HI," "S_MID," and "S_LOW" of the output circuit 147 in FIG. 64, respectively. Also, "C_1," "C_2," and "C_3" in FIG. 69 correspond to "C_MAX," "C_MID," and "C_MIN" in FIG. 64, respectively. The calculations in each phase described above are summarized as shown in FIG. 70.

Figures 71, 72:
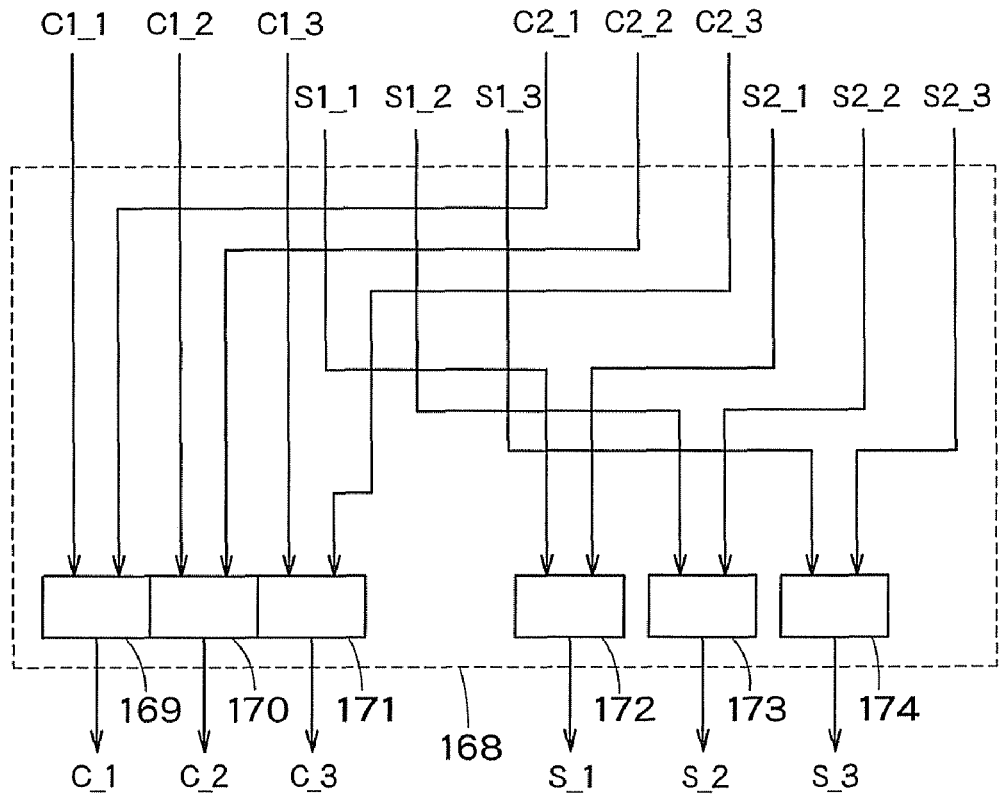
FIG. 71 is a block diagram showing an internal configuration of an output circuit 168 in FIG. 69.
FIG. 72 is a table showing input data of the output circuit 168 in each phase.

FIG. 71 is a block diagram showing an internal configuration of the output circuit 168 in FIG. 69. As shown in the figure, the output circuit 168 has multiple adders 169 to 174. FIG. 72 is a table showing input data of the output circuit 168 in each Phase. As shown in the figure, when Phase=1, perform the processing operations in FIGS. 56 and 57. Thus, the maximum value "MAX" is calculated using "C_1" and "S_1" and the minimum value "MIN" is calculated using "C_3" and "S_3." In the case of the maximum value "MAX," increment the count C_1 by 1. In the case of the minimum value "MIN", increment the count "C_3" by 1. Otherwise, the count is not incremented.

When Phase=2, perform the processing operations in FIG. 61. "C_1," "C_2," and "C_3" correspond to "C_MAX," "C_MID," and "C_MIN," respectively. Inputs are added within each group. This is indicated by "+." Also, "S_2" is put in correspondence with "S" in FIG. 61. Thus, only the "S_2" column contains "+" indicating addition.

When Phase=3, perform the processing operations in FIG. 65. "C_1," "C_2," and "C_3" correspond to "C_MAX," "C_MID," and "C_MIN," respectively. Thus, "+" indicating addition is shown in the table. The outputs "S_1," "S_2," and "S_3" correspond to the outputs "S_HI," "S_MID," and "S_LOW." They also involve addition, and thus "+" is shown in the table.

The processing operations in FIG. 72 are implemented by the adder 169. The sign "*" in FIG. 72 indicates "indefinite." For practical situation, it is desirable to suspend operation to save power. FIG. 72 shows primary processing operations only, where such a circuit disable (suspend) function is not explicitly specified.

Figure 73:
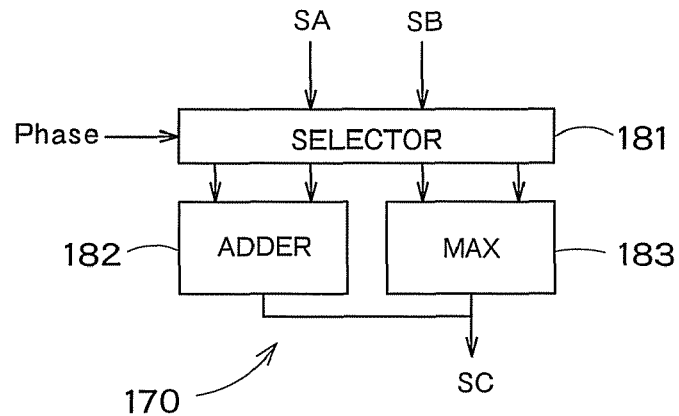
FIG. 73 is a block diagram showing an internal configuration of an adder 170 in FIG. 71.
Figure 74:
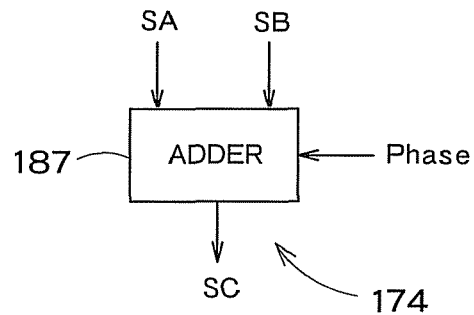
FIG. 74 is a block diagram showing an internal configuration of an adder 173 in FIG. 71.
Figure 75:
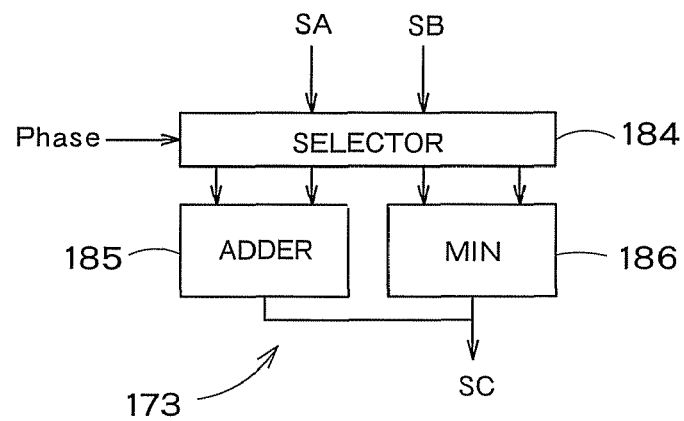
FIG. 75 is a block diagram showing an internal configuration of an adder 174 in FIG. 71.

FIG. 73 is a block diagram showing an internal configuration of the adder 170 in FIG. 71. FIG. 74 is a block diagram showing an internal configuration of the adder 173 in FIG. 71. FIG. 75 is a block diagram showing an internal configuration of the adder 174 in FIG. 71. FIG. 76 is a block diagram showing an internal configuration of the adders 169 and 171 in FIG. 71, and FIG. 77 is a block diagram showing an internal configuration of the adder 172 in FIG. 71.

The adder 170 in FIG. 73 has following circuits: a selector 181, an adder 182, and a maximum value detecting circuit 183. The adder 173 in FIG. 74 has following circuits: a selector 184, an adder 185, and a minimum value detecting circuit 186. The adder 174 in FIG. 75 has only an adder 187. The adders 169 and 171 in FIG. 76 have following circuits: an adder 187, a switch 188, and a control circuit 189 which performs on/off control of the switch 188. The adder 172 in FIG. 77 has only an adder 190.

In FIGS. 73 and 75, hardware may be shared between the adder 182 and adder 185 as well as between the maximum value detecting circuit 183 and minimum value detecting circuit 186. The maximum value detecting circuit 183 performs a comparison process to detect the maximum value. The minimum value detecting circuit 186 performs a comparison process to detect the minimum value. These comparison processes require a subtracter. This subtracter is substitutable with an adder by calculating two's complement of input. Thus, the adder and subtracter can be shared. Additionally, the control signal Phase controls both circuits: (1) a circuit which calculates the two's complement and (2) a circuit which determines and extracts the MAX/MIN value.

Although encoding and decoding of the luminance data "Y" have mainly been described above, the color-difference data Cr and Cb can be coded and decoded similarly. Additionally, luminance data "Y" and color-difference data Cr and Cb generally differ in bit width and color-difference data Cr and Cb have smaller height of hierarchical layers.

Although according to this embodiment, hardware has been optimized using three-level BTC encoding, it can be optimized between two-level BTC and three-level BTC also as in the case of decoding.

FIG. 78 is a diagram showing conditions of optimization for two-level BTC and three-level BTC. A mode flag is shown in column M and Phase is shown in column P. The mode flag is set to "0" for two-level BTC, and is set to "1" for three-level BTC. When the mode flag is "0," since there is no need to calculate averages by determining "MAX" and "MIN," "Phase" remains to be "1." When Phase=2, averages should be determined. "S_2" is used for this average calculation. Since 16 pixels do not need to be counted, there is no need to use "C_2" for average calculation: its count 16 is known in advance.

When Phase=3, averages are used as thresholds. The pixels are divided into upper and lower groups and an average is calculated in each group. For this calculation, count values "C_1" and "C_3" and cumulative values "S_1" and "S_3" are calculated.

To implement the operations in FIG. 78 and thereby to perform the above controls, a Mode control signal is added to the circuits in FIGS. 73 to 77 in addition to the Phase control signal.

FIG. 79 is a block diagram showing an internal configuration of the BTC encoding circuit 7 which performs the processing operations described above. The BTC encoding processor 24 has following circuits: an activity amount detector 191, a mode detector 192, a phase detector 193, an initializing section 194, a layer calculating section 195, and a post-calculating section 196.

Additionally, although details of two-level BTC have not been described in the above embodiment, they are generally known and thus description hereof has been omitted.

As described above, according to this embodiment, since image data is encoded by selecting between two-level and three-level BTC algorithms based on the amount of activity, it is possible to compress image data effectively with small degradation of image quality. In particular, this embodiment makes it possible to generate encoded data with small degradation in image quality even from a PC image originally produced on a PC.

Also, when determining representative values used in the two-level and three-level BTC algorithms, since the representative values are determined based on pixels excluding the maximum value and minimum value of pixel values in the pixel block, it is possible to select representative values suitable to the original image, and thus prevent degradation in image quality.

Also, since circuits used for a two-level BTC algorithm and circuits used for three-level BTC algorithm can be integrated, it is possible to deduce hardware size.

Also, when generating an image by rotating an original image, since a rotation process is performed during encoding, there is no need to perform a rotation process when decoding the encoded data. This simplifies the decoding process. By selecting a rotation direction suitable for the aspect ratio of the memory and storing data after rotation, it avoids wasting extra memory areas.

Also, since this embodiment allows any desired area of an original image to be encoded selectively, it is possible to display only a desired area, eliminating useless data transfer and reducing power consumption. Also, since this embodiment has a high compression ratio, there is no need to transfer images at high speed. This again makes it possible to reduce power consumption.

What is claimed is:

1. An image processing circuit, comprising:
   a color information converter configured to convert image data including a plurality of color information into luminance data and color difference data;
   an activity detector whether amount of activity predetermined according to differences between the luminance data in a plurality of pixels in each of pixel blocks and differences between the color difference data in the plurality of pixels exceeds a predetermined first threshold value for each pixel block including a plurality of pixels adjacent to each other; and
   a encoding unit configured to perform a first encoding process by generating m (m is an integer of three or larger) representative values corresponding to the luminance data and the color difference data in the plurality of pixels in the pixel block that the activity detector determines to exceed the first threshold value, and perform a second encoding process by generating n (n is an integer of two or more and the integer larger than m) representative values corresponding to the luminance data and the color difference data in the plurality of pixels in the pixel block that the activity detector determines not to exceed the first threshold value, to generate encoded data,
   wherein at least a portion of the color information converter, the activity detector, or the encoding unit is implemented by a hardware circuit.

2. The image processing circuit according to claim 1,
   wherein the encoding unit sets (m−1) second threshold values, and then generates the m representative values based on results of comparing the (m−1) second threshold values with the luminance data and the color difference data in the plurality of pixels in each pixel block when the first encoding process is performed; and
   the encoding unit sets (n−1) second threshold values, and then generates the n representative values based on results of comparing the (n−1) second threshold values with the luminance data and the color difference data in the plurality of pixels in each pixel block when the second encoding process is performed.

3. The image processing circuit according to claim 1,
   wherein the activity detector calculates the differences between the luminance data and the differences between the color difference data in the pixels adjacent to horizontal and vertical directions, and then sets the amount of activity based on the all the calculated differences.

4. The image processing circuit according to claim 1,
   wherein the encoding unit divides each pixel block into a plurality of sub-pixel blocks, calculates an average value of the color difference data for each sub-pixel block, and treats the calculated average value as common color difference data in the corresponding sub-pixel block when at least the first encoding process is performed.

5. The image processing circuit according to claim 4,
   wherein the encoding unit generates the encoded data including the first encoded data obtained by encoding the luminance data not to be decimated and the second encoded data obtained by encoding the color difference data to bedecimated.

6. The image processing circuit according to claim 5,
   wherein the encoding unit generates the encoded data including identification information for identifying whether either of the first encoding process or the second encoding process is performed.

7. The image processing circuit according to claim 5,
   wherein the first encoded data includes a bit string of the luminance data expressing the m representative values, a bit map data indicative of arrangement of the luminance data expressing the m representative values in the pixel block, a bit string of the color difference expressing the m representative values and bit map data indicative of arrangement of the color difference data expressing the m representative values in the pixel block; and
   the second encoded data includes a bit string of the luminance data expressing the n representative values, a bit map data indicative of arrangement of the luminance data expressing the n representative values in the pixel block, a bit string of the color difference expressing the n representative values and bit map data indicative of arrangement of the color difference data expressing the n representative values in the pixel block.

8. The image processing circuit according to claim 1,
   wherein the encoding unit generates the m representative values among the other pixels except for maximum and minimum values of the luminance data, or among the other pixels except for maximum and minimum values of the color difference data in the plurality of pixels in the pixel block when at least the first encoding process is performed.

9. The image processing circuit according to claim 1,
   wherein the encoding unit sets the (m−1) second threshold values based on the luminance data of the other pixels except for maximum and minimum values of the luminance data in the plurality of pixels in the pixel block, or the color difference data of the other pixels except for maximum and minimum values of the color difference data in the plurality of pixels in the pixel block when at least the first encoding process is performed.

10. The image processing circuit according to claim 1, further comprising:
    a storage unit configured to store the encoded data coded by the encoding unit;
    a storage control unit configured to control data writing into the storage unit in units of the encoded data of a plurality of pixels in the pixel block;
    a decoding unit configured to generate the luminance data and the color difference data by decoding the encoded data stored into the storage unit; and
    a color information restoring unit configured to generate the image data including a plurality of color information based on the luminance data and the color difference data generated by the decoding unit.

11. The image processing circuit according to claim 10,
wherein the storage control unit controls a location for storing the encoded data in the storage unit in conformity to a direction of the display image when a direction of an original image before performing the converting process by the color information converter is different from the direction of the display image generated based on the image data generated by the color information restoring unit.

12. The image processing circuit according to claim 10, further comprising:
a source driver configured to control a display panel; and
a timing controller configured to supply the source driver with image data,
the source driver having the color information converter, the activity detector, the cording unit, the storage unit, the storage control unit, the decoding unit and the color information restoring unit.

13. The image processing circuit according to claim 10, further comprising:
a source driver configured to control a display panel; and
a timing controller configured to supply the source driver with the image data,
the timing controller having the color information converting unit; and
the source driver having the activity detector, the cording unit, the storage unit, the storage control unit, the decoding unit and the color information restoring unit.

14. A liquid crystal display apparatus, comprising:
a liquid crystal panel configured to have signal lines and scanning lines arranged in a matrix form, and a plurality of pixel switches provided corresponding to the respective cross points of the signal lines and the scanning lines; and
a display control unit configured to generate analog pixel voltages to be supplied to the signal lines,
wherein the display control unit includes:
a color information converter configured to convert image data including a plurality of color information into luminance data and color difference data;
an activity detector whether amount of activity predetermined according to differences between the luminance data in a plurality of pixels in each of pixel blocks and differences between the color difference data in the plurality of pixels exceeds a predetermined first threshold value for each pixel block including a plurality of pixels adjacent to each other; and
a encoding unit configured to perform a first encoding process by generating m (m is an integer of three or larger) representative values corresponding to the luminance data and the color difference data in the plurality of pixels in the pixel block that the activity detector determines to exceed the first threshold value, and perform a second encoding process by generating n (n is an integer of two or more and the integer larger than m) representative values corresponding to the luminance data and the color difference data in the plurality of pixels in the pixel block that the activity detector determines not to exceed the first threshold value, to generate encoded data.

15. The liquid crystal display apparatus according to claim 14,
wherein the activity detector calculates the differences between the luminance data and the differences between the color difference data in the pixels adjacent to horizontal and vertical directions, and then sets the amount of activity based on the all the calculated differences.

16. The liquid crystal display apparatus according to claim 14,
wherein the encoding unit divides each pixel block into a plurality of sub-pixel blocks, calculates an average value of the color difference data for each sub-pixel block, and treats the calculated average value as common color difference data in the corresponding sub-pixel block when at least the first encoding process is performed.

17. The liquid crystal display apparatus according to claim 16,
wherein the encoding unit generates the encoded data including identification information for identifying whether either of the first encoding process or the second encoding process is performed.

18. The liquid crystal display apparatus according to claim 14,
wherein the encoding unit generates the m representative values among the other pixels except for maximum and minimum values of the luminance data, or among the other pixels except for maximum and minimum values of the color difference data in the plurality of pixels in the pixel block when at least the first encoding process is performed.

19. The liquid crystal display apparatus according to claim 14,
a storage unit configured to store the encoded data coded by the encoding unit;
a storage control unit configured to control data writing into the storage unit in units of the encoded data of a plurality of pixels in the pixel block;
a decoding unit configured to generate the luminance data and the color difference data by decoding the encoded data stored into the storage unit; and
a color information restoring unit configured to generate the image data including a plurality of color information based on the luminance data and the color difference data generated by the decoding unit.

20. The liquid crystal display apparatus according to claim 19,
wherein the storage control unit controls a location for storing the encoded data in the storage unit in conformity to a direction of the display image when a direction of an original image before performing the converting process by the color information converter is different from the direction of the display image generated based on the image data generated by the color information restoring unit.

* * * * *